(12) United States Patent
Petro et al.

(10) Patent No.: US 7,884,522 B1
(45) Date of Patent: Feb. 8, 2011

(54) STATOR AND ROTOR-STATOR STRUCTURES FOR ELECTRODYNAMIC MACHINES

(75) Inventors: John Petro, Los Altos, CA (US); Ken G. Wasson, Foster City, CA (US); Jeremy F. Mayer, Mountain View, CA (US)

(73) Assignee: NovaTorque, Inc., Sunnyvale, CA (US)

( * ) Notice: Subject to any disclaimer, the term of this patent is extended or adjusted under 35 U.S.C. 154(b) by 429 days.

(21) Appl. No.: 11/925,661

(22) Filed: Oct. 26, 2007

Related U.S. Application Data

(63) Continuation-in-part of application No. 11/255,404, filed on Oct. 20, 2005, now Pat. No. 7,294,948.

(60) Provisional application No. 60/622,258, filed on Oct. 25, 2004.

(51) Int. Cl.
  *H02K 1/12* (2006.01)
(52) U.S. Cl. .............. 310/254.1; 310/216.72; 310/216.73
(58) Field of Classification Search ..........................
  310/216.72–216.74, 216.47, 216.41, 216.103,
  310/216.111, 254.1
  See application file for complete search history.

(56) References Cited

U.S. PATENT DOCUMENTS

| | | | |
|---|---|---|---|
| 414,659 A | 11/1889 | Seafert |
| 422,862 A | 3/1890 | Washburn |
| 439,102 A | 10/1890 | Bradley |
| 754,066 A | 3/1904 | Hoffman |
| 829,975 A | 9/1906 | Lincoln |
| 846,079 A | 3/1907 | Yost |
| 1,039,197 A | 9/1912 | Roth |
| 1,557,213 A | 10/1925 | Lee |
| 1,640,742 A | 8/1927 | Wallace |
| 1,763,104 A | 6/1930 | Shurtleff |
| 1,771,281 A | 7/1930 | Wilsing |
| 1,874,094 A | 8/1932 | Ford et al. |
| 1,962,832 A | 6/1934 | Neureuther |
| 2,025,560 A | 12/1935 | Warren |
| 2,081,993 A | 6/1937 | Gebhardt |
| 2,141,681 A | 12/1938 | Brueck |
| 2,378,668 A | 6/1945 | Vickers |
| 2,480,825 A | 9/1949 | Adolsh |
| 2,484,001 A | 10/1949 | Raymond |
| 2,500,730 A | 3/1950 | Yonkers |

(Continued)

FOREIGN PATENT DOCUMENTS

CH   400323   4/1966

(Continued)

OTHER PUBLICATIONS

Lee W. Young; Notification of Transmittal of the International Search Report and The Written Opinion of the International Searching Authority, or the Declaration; International Application No. PCT/US 08/66072; Date of Mailing Aug. 18, 2008; From PCT/ISA/220; 1 page.

(Continued)

*Primary Examiner*—Thanh Lam
(74) *Attorney, Agent, or Firm*—Kokka & Backus, PC

(57) ABSTRACT

Embodiments of the invention relate generally to electric motors, alternators, generators and the like, and more particularly, to stator structures and rotor-stator structures for motors that can be configured to, for example, reduce detent.

16 Claims, 55 Drawing Sheets

U.S. PATENT DOCUMENTS

| | | |
|---|---|---|
| 2,561,890 A | 7/1951 | Stoddard |
| 2,575,153 A | 11/1951 | Wightman |
| 2,669,687 A | 2/1954 | De Tastes |
| 2,677,256 A | 5/1954 | Donandt |
| 2,677,259 A | 5/1954 | Woodward |
| 2,694,781 A | 11/1954 | Hinz |
| 2,717,969 A | 9/1955 | Buchhold |
| 2,769,106 A | 10/1956 | Dembowski |
| 2,796,542 A | 6/1957 | Bekey |
| 2,802,959 A | 8/1957 | Powers |
| 2,824,272 A | 2/1958 | Delaporte |
| 3,001,093 A | 9/1961 | Wilcox |
| 3,025,445 A | 3/1962 | Welch |
| 3,153,157 A | 10/1964 | Rabe |
| 3,173,042 A | 3/1965 | Fodor |
| 3,175,111 A | 3/1965 | Orr |
| 3,205,384 A | 9/1965 | Sears |
| 3,223,866 A | 12/1965 | Tiltins |
| 3,241,111 A | 3/1966 | Sandstrom |
| 3,241,304 A | 3/1966 | Mattingly |
| 3,309,547 A | 3/1967 | Woodward |
| 3,319,100 A | 5/1967 | Erickson |
| 3,321,652 A | 5/1967 | Opel |
| 3,356,425 A | 12/1967 | Carrierre |
| 3,360,667 A | 12/1967 | Gordon |
| 3,374,376 A | 3/1968 | Kromrey |
| 3,396,291 A | 8/1968 | Somerville |
| 3,399,002 A | 8/1968 | Atkinson |
| 3,428,837 A | 2/1969 | Morreale |
| 3,471,729 A | 10/1969 | Latta |
| 3,490,816 A | 1/1970 | Lyman |
| 3,519,859 A | 7/1970 | Morreale |
| 3,565,495 A | 2/1971 | Lyman |
| 3,603,826 A | 9/1971 | Saretzky |
| 3,619,014 A | 11/1971 | Quick |
| 3,648,090 A | 3/1972 | Voin |
| 3,651,355 A | 3/1972 | Mason |
| 3,689,787 A | 9/1972 | Saretzky |
| 3,717,780 A | 2/1973 | Hohne |
| 3,723,796 A | 3/1973 | Mason |
| 3,787,100 A | 1/1974 | Habermann |
| 3,822,768 A | 7/1974 | Sebulke |
| 3,863,084 A | 1/1975 | Hasebe |
| 3,936,680 A | 2/1976 | Kuwako |
| 3,956,651 A | 5/1976 | Brammerlo |
| 4,031,421 A | 6/1977 | Geiger |
| 4,043,614 A | 8/1977 | Lyman |
| 4,045,696 A | 8/1977 | Lutz |
| 4,047,807 A | 9/1977 | Okano |
| 4,066,922 A | 1/1978 | Hennemann |
| 4,117,359 A | 9/1978 | Wehde |
| 4,152,570 A | 5/1979 | Inoue |
| 4,156,817 A | 5/1979 | Preece |
| D256,351 S | 8/1980 | Schulze |
| 4,221,984 A | 9/1980 | Mason |
| 4,259,603 A | 3/1981 | Uchiyama |
| 4,310,768 A | 1/1982 | Colley |
| 4,328,411 A | 5/1982 | Haller |
| 4,358,693 A | 11/1982 | Palmer |
| 4,378,146 A | 3/1983 | Suzuki |
| 4,390,262 A | 6/1983 | Hirohata |
| 4,395,815 A | 8/1983 | Stanley |
| 4,460,253 A | 7/1984 | Kawai |
| 4,476,395 A | 10/1984 | Cronin |
| 4,480,208 A | 10/1984 | Logie |
| 4,483,570 A | 11/1984 | Inoue |
| 4,491,401 A | 1/1985 | Inaba |
| 4,503,349 A | 3/1985 | Miller |
| 4,543,506 A | 9/1985 | Kawada |
| 4,564,775 A | 1/1986 | Mazzorana |
| 4,577,129 A | 3/1986 | Bertram |
| 4,593,222 A | 6/1986 | Burkel |
| 4,594,539 A | 6/1986 | Michelson |
| 4,601,564 A | 7/1986 | Yamamoto |
| 4,628,220 A | 12/1986 | Flogvall |
| 4,658,228 A | 4/1987 | Leupold |
| 4,663,581 A | 5/1987 | Glennon |
| 4,674,178 A | 6/1987 | Patel |
| 4,713,569 A | 12/1987 | Schwartz |
| 4,731,626 A | 3/1988 | Kawamoto |
| 4,734,604 A | 3/1988 | Sontheimer |
| 4,745,345 A * | 5/1988 | Petersen ................ 318/400.41 |
| 4,748,359 A | 5/1988 | Yahara |
| 4,748,361 A | 5/1988 | Ohnishi et al. |
| 4,757,224 A | 7/1988 | McGee |
| 4,759,186 A | 7/1988 | Sugden |
| 4,760,314 A | 7/1988 | Mohri |
| 4,763,150 A | 8/1988 | Sumi |
| 4,777,397 A | 10/1988 | Parshall |
| 4,788,369 A | 11/1988 | Marsh |
| 4,788,465 A | 11/1988 | Hertrich |
| 4,802,347 A | 2/1989 | Nystuen |
| 4,879,484 A | 11/1989 | Huss |
| 4,883,996 A | 11/1989 | Aoki |
| 4,885,489 A | 12/1989 | Stuhr |
| 4,918,802 A | 4/1990 | Schaefer |
| 4,920,295 A | 4/1990 | Holden |
| 4,939,397 A | 7/1990 | Morrill |
| 4,962,583 A | 10/1990 | Yang |
| 4,984,972 A | 1/1991 | Clausen |
| 5,033,265 A | 7/1991 | Sugden |
| 5,036,235 A | 7/1991 | Kleckner |
| 5,045,741 A | 9/1991 | Dvorsky |
| 5,047,682 A | 9/1991 | Burgbacher |
| 5,049,771 A | 9/1991 | Challita |
| 5,081,387 A | 1/1992 | Nystuen |
| 5,130,592 A | 7/1992 | Bitsch |
| 5,140,212 A | 8/1992 | Iwasaki |
| 5,212,418 A | 5/1993 | Mason |
| 5,216,308 A | 6/1993 | Meeks |
| 5,233,254 A | 8/1993 | Fisher |
| 5,258,677 A | 11/1993 | Mason |
| 5,283,492 A | 2/1994 | Mason |
| 5,300,848 A | 4/1994 | Huss |
| 5,406,157 A | 4/1995 | New |
| 5,436,518 A | 7/1995 | Kawai |
| 5,486,730 A | 1/1996 | Ludwig |
| 5,514,924 A | 5/1996 | McMullen |
| 5,536,985 A | 7/1996 | Ward et al. |
| 5,610,460 A | 3/1997 | Jacobson |
| 5,627,419 A | 5/1997 | Miller |
| 5,674,169 A | 10/1997 | Yang |
| 5,744,887 A | 4/1998 | Itoh |
| 5,751,086 A | 5/1998 | Taghezout |
| 5,767,597 A | 6/1998 | Gondhalekar |
| 5,777,421 A | 7/1998 | Woodward |
| 5,780,950 A | 7/1998 | Yang |
| 5,844,345 A | 12/1998 | Hsu |
| 5,955,806 A | 9/1999 | Devenyi |
| 5,962,948 A | 10/1999 | Hakala |
| 6,013,693 A | 1/2000 | Takahashi |
| 6,025,769 A | 2/2000 | Chu |
| 6,049,148 A | 4/2000 | Nichols |
| 6,057,613 A | 5/2000 | Trago |
| 6,104,115 A | 8/2000 | Offringa |
| 6,157,109 A | 12/2000 | Schiferl |
| 6,188,159 B1 | 2/2001 | Fan |
| 6,194,797 B1 | 2/2001 | Simon |
| 6,236,124 B1 | 5/2001 | Sekiyama |
| 6,246,146 B1 | 6/2001 | Schiller |
| 6,346,755 B1 | 2/2002 | Tong |
| 6,359,357 B1 | 3/2002 | Blumenstock |
| 6,455,975 B1 | 9/2002 | Raad |
| 6,492,753 B2 | 12/2002 | Zepp |

| | | | | | | |
|---|---|---|---|---|---|---|
| 6,700,280 | B1 | 3/2004 | Geiger | EP | 0251350 A2 | 1/1988 |
| 6,707,221 | B2 | 3/2004 | Carl | GB | 960879 | 6/1964 |
| 6,720,688 | B1 | 4/2004 | Schiller | JP | 60066658 | 4/1985 |
| 6,745,972 | B2 * | 6/2004 | Takano et al. ............ 242/432.2 | JP | 61-289889 | 7/1988 |
| 6,897,596 | B2 | 5/2005 | Laing | JP | 04-026350 | 1/1992 |
| 6,952,064 | B2 * | 10/2005 | Hiwaki et al. ................ 310/214 | JP | 06-014521 | 1/1994 |
| 7,061,152 | B2 | 6/2006 | Petro et al. | JP | 06-141527 | 5/1994 |
| 7,105,974 | B2 * | 9/2006 | Nashiki ...................... 310/185 | JP | 06-351212 | 12/1994 |
| 7,135,800 | B2 * | 11/2006 | Yamada et al. ........ 310/216.028 | JP | 08-080019 | 3/1996 |
| 7,205,693 | B2 | 4/2007 | Petro et al. | JP | 10-174399 | 6/1998 |
| 7,239,058 | B2 | 7/2007 | Petro et al. | JP | 10-174400 | 6/1998 |
| 7,294,948 | B2 | 11/2007 | Wasson et al. | JP | 11-222025 | 6/2000 |
| 2006/0131976 | A1 | 6/2006 | Kikuchi et al. | WO | WO-00/48297 A1 | 8/2000 |
| 2006/0152099 | A1 | 7/2006 | Petro et al. | | | |
| 2007/0205675 | A1 | 9/2007 | Petro et al. | | | |

FOREIGN PATENT DOCUMENTS

| | | |
|---|---|---|
| DE | 2433809 | 2/1978 |
| DE | 37 42 502 A1 | 6/1989 |
| DE | 199 54 196 A1 | 6/2000 |
| DE | 101 40 362 A1 | 3/2003 |
| EP | 0208124 A2 | 1/1987 |

OTHER PUBLICATIONS

Lee W. Young; International Search Report; International Application No. PCT/US 08/66072; Date of Mailing Aug. 18, 2008; Form PCT/ISA/210; 2 pages.

Lee W. Young; Written Opinion of the International Searching Authority; International Application No. PCT/US 08/66072 Date of Mailing Aug. 18, 2008; Form PCT/ISA/237; 4 pages.

* cited by examiner

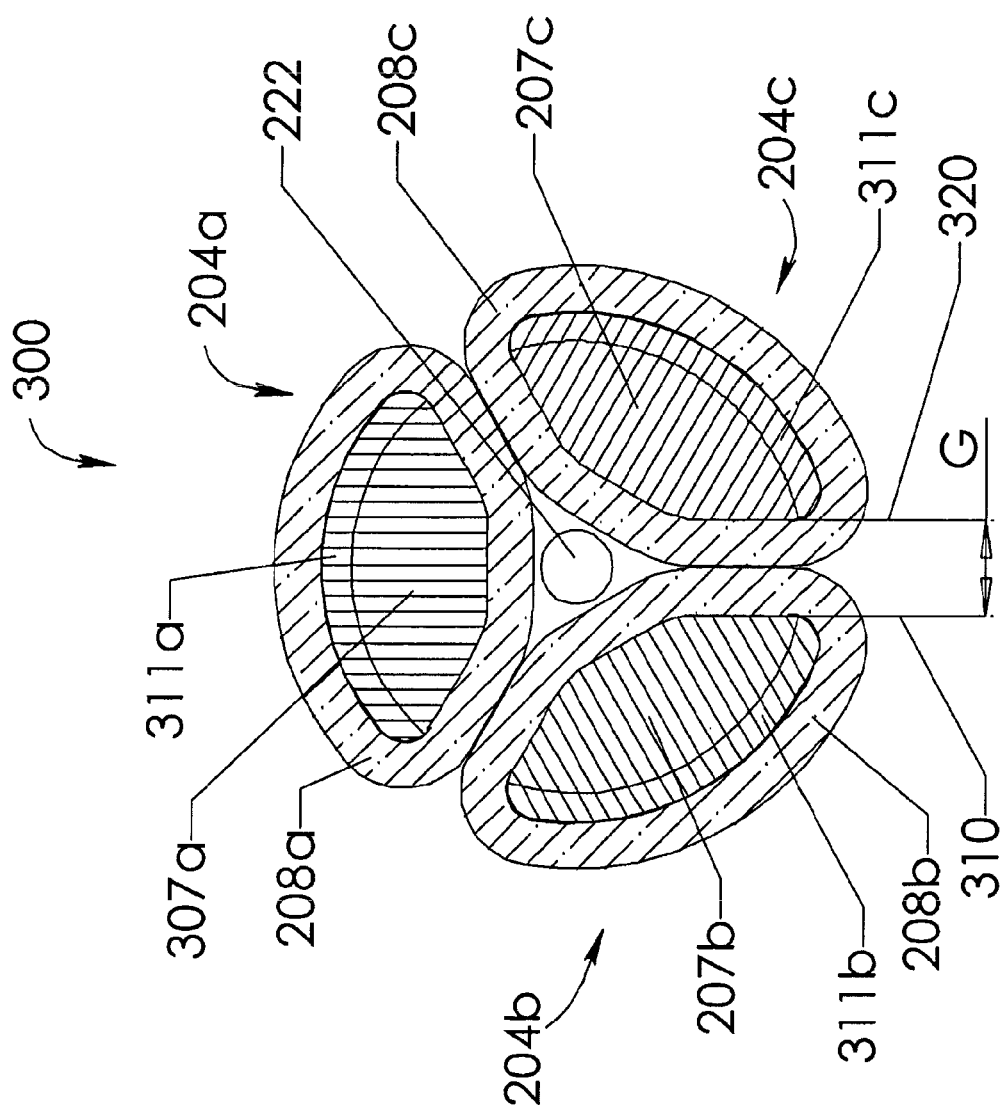

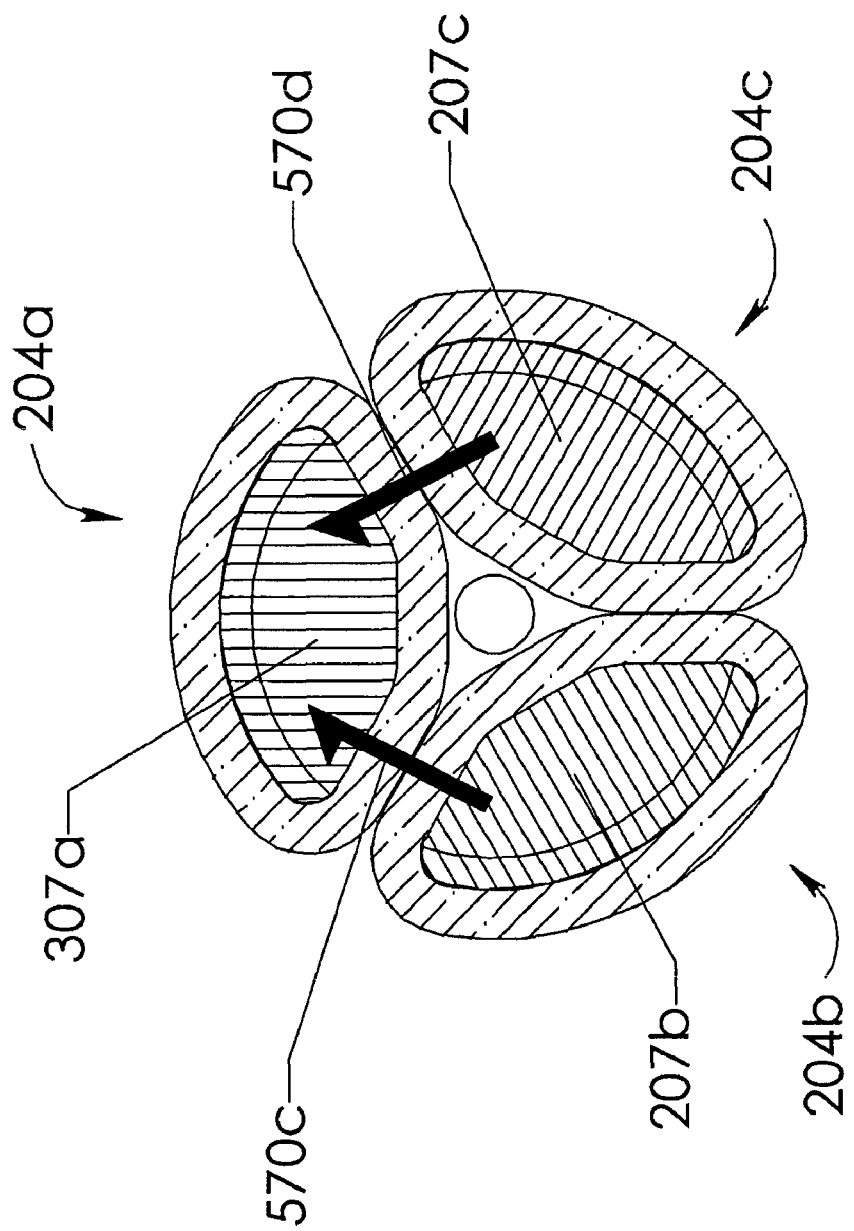

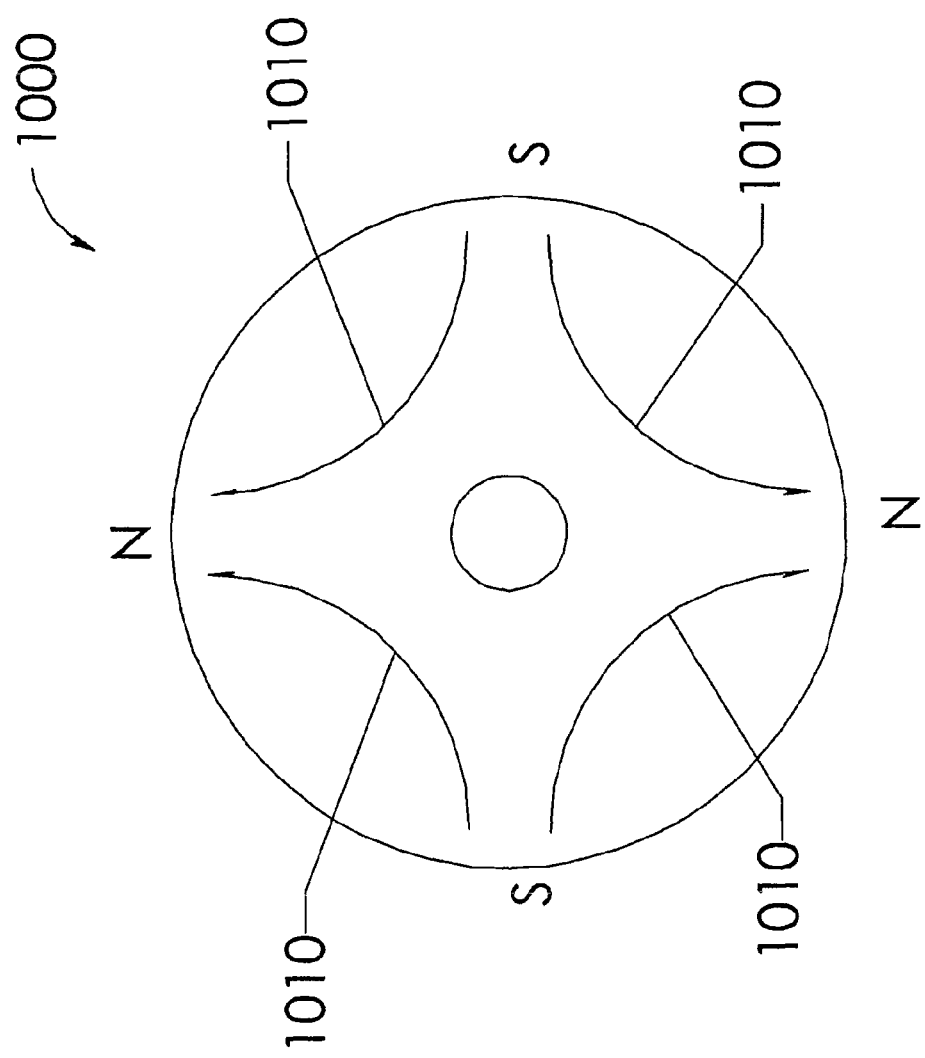

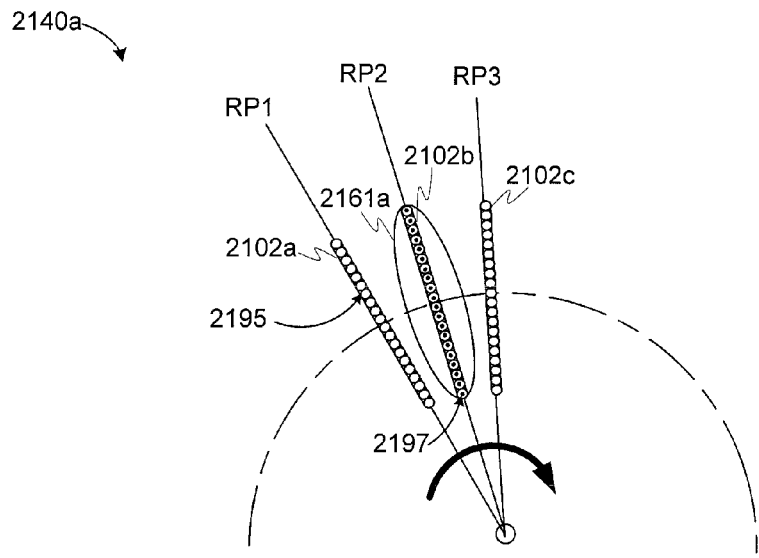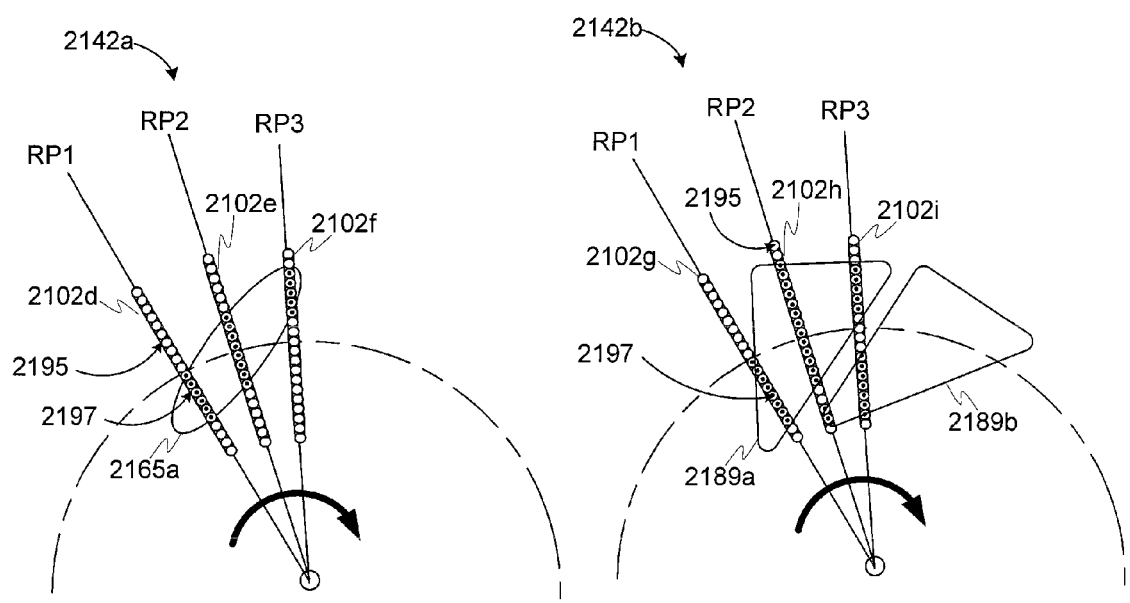
FIG. 21D

STATOR AND ROTOR-STATOR STRUCTURES FOR ELECTRODYNAMIC MACHINES

CROSS REFERENCE TO RELATED APPLICATIONS

This application is a Continuation-in-Part and claims the benefit of U.S. Nonprovisional application Ser. No. 11/255,404, filed on Oct. 20, 2005, which claims the benefit of U.S. Provisional Application No. 60/622,258, filed on Oct. 25, 2004, all of which are hereby incorporated by reference. Further, this application hereby incorporates by reference the following: U.S. Nonprovisional application Ser. No. 11/707,817, entitled "Field Pole Members and Methods of Forming Same for Electrodynamic Machines," published on Sep. 6, 2007 as U.S. Publication No. 20070205675 A1.

BRIEF DESCRIPTION OF THE INVENTION

Embodiments of the invention relate generally to electric motors, alternators, generators and the like, and more particularly, to stator structures and rotor-stator structures for motors that can be configured to, for example, reduce detent.

BACKGROUND OF THE INVENTION

Detent, which is also known as "cogging torque" or "detent torque," is a periodic torque created in an electro-dynamic structure that co-axially integrates high permeability elements, such as field poles, into a stator structure, which, in turn, is formed with permanent magnets in a rotor structure. When either structure is rotated with respect to the other, a periodic varying torque can be created because the magnet structure prefers to align centered on the high permeability elements rather than at the intervening field pole gaps of air between the field pole elements. This detent torque can be created by the portion of the area of the magnet that is not immediately facing the field pole shoe. Each incremental area of the face of the magnet that is facing an gap between the field pole shoes is then attracted to the nearest surface of an adjacent field pole of high permeability, thus creating an incremental torque in that direction. The resulting detent torque can be viewed as the summation of the incremental torques over all the areas not facing a high permeability region in the entire interface region between the stator and rotor structure. The magnitude of this varying detent torque increases as the gap between field pole elements can increase because a greater portion of the magnet area is in the gap between field poles. While it is desirable to minimize detent torque, decreasing the field pole gap between field pole elements has limitations because flux leakage between field poles increases.

In view of the foregoing, it would be desirable to provide stator and rotor-stator structures that minimize the drawbacks of conventional motors and generators to reduce detent, among other things.

SUMMARY OF THE INVENTION

Embodiments of the invention relate generally to electric motors, alternators, generators and the like, and more particularly, to stator structures and rotor-stator structures for motors that can be configured to, for example, reduce detent. In one example, a stator structure for electrodynamic machines can include field pole members that are arranged coaxial to an axis of rotation, which, in turn, can include a first field pole member and a second field pole member. In at least one instance, the second field pole member can be oriented with respect to the first field pole member to form an overlap portion. In one embodiment, the overlap portion can be configured to include a plane that includes the axis of rotation. In another embodiment, the second field pole member can be positioned to modify the effects of detent.

BRIEF DESCRIPTION OF THE FIGURES

The various embodiments of the invention are more fully appreciated in connection with the following detailed description taken in conjunction with the accompanying drawings, in which:

FIG. 3 depicts an end view for the rotor-stator structure of FIG. 2B without a magnet to illustrate the orientation of the pole faces that are configured to interact via an air gap with a confronting magnetic surface of a conical magnet, according to one embodiment of the present invention;

FIG. 5D depicts an example of a second flux path(s) entering a pole face of an active field pole member that originally generated the ampere-turn magnetic flux of FIG. 5C, according to one embodiment of the present invention;

FIG. 10 shows a multiple pole magnet, according to an embodiment of the present invention;

FIG. 21D illustrates an example of a field pole arrangement that can facilitate the distribution of incremental magnet elements over additional rotation angles, according to at least one embodiment of the invention;

Like reference numerals refer to corresponding parts throughout the several views of the drawings. Note that most of the reference numerals include one or two left-most digits that generally identify the figure that first introduces that reference number.

DETAILED DESCRIPTION

Definitions

Figure 1:
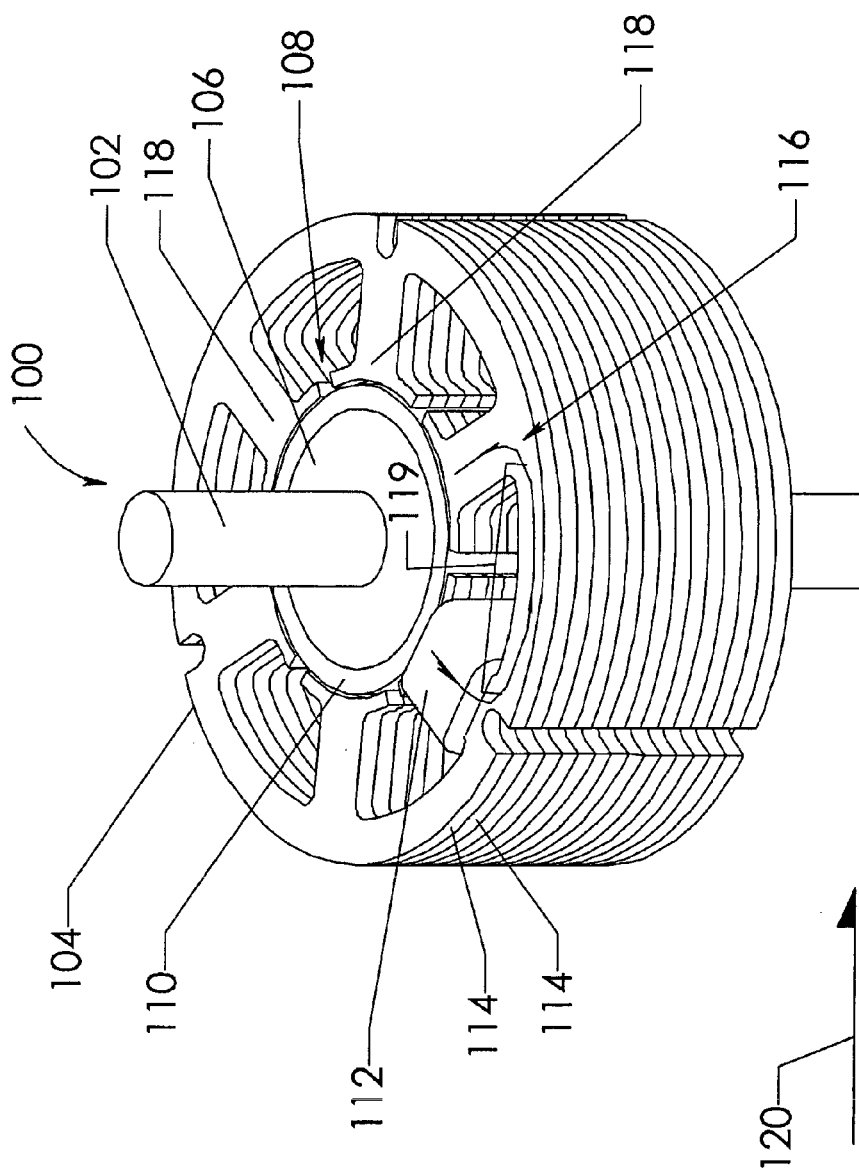
FIG. 1 exemplifies commonly-used stator and rotor structures implemented in a traditional electric motor.

The following definitions apply to some of the elements described with respect to some embodiments of the invention. These definitions may likewise be expanded upon herein.

As used herein, the term "air gap" refers to a space, or a gap, between a magnet surface and a confronting pole face. Such a space can be physically described as a volume bounded at least by the areas of the magnet surface and the pole face. An air gap functions to enable relative motion between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers to an assemblage of successive convolutions of a conductor arranged to inductively couple to a magnetically permeable material to produce magnetic flux. In some embodiments, the term "coil" can be described as a "winding" or a "coil winding." The term "coil" also includes foil coils (i.e., planar-shaped conductors that are relatively flat).

As used herein, the term "coil region" refers generally to a portion of a field pole member around which a coil is wound.

As used herein, the term "core" refers to a portion of a field pole member where a coil is normally disposed between pole shoes and is generally composed of a magnetically permeable material for providing a part of a magnetic flux path.

As used herein, the term "field pole member" refers generally to an element composed of a magnetically permeable material and being configured to provide a structure around which a coil can be wound (i.e., the element is configured to receive a coil for purposes of generating magnetic flux). In particular, a field pole member includes a core (i.e., core region) and at least one pole shoe, each of which is generally located near a respective end of the core. Without more, a field pole member is not configured to generate ampere-turn flux. In some embodiments, the term "field pole member" can be described generally as a "stator-core."

As used herein, the term "active field pole member" refers to an assemblage of a core, one or more coils, and at least two pole shoes. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers to a body that produces a magnetic field externally unto itself. As such, the term magnet includes permanent magnets, electromagnets, and the like. The term magnet can also refer to internal permanent magnets ("IPMs"), surface mounted permanent magnets ("SPMs"), and the like.

As used herein, the term "motor" generally refers to an electrodynamic machine that is configured to convert electrical energy into mechanical energy.

As used herein, the term "magnetically permeable" is a descriptive term that generally refers to those materials having a magnetically definable relationship between flux density ("B") and applied magnetic field ("H"). Further, "magnetically permeable" is intended to be a broad term that includes, without limitation, ferromagnetic materials such as common lamination steels, cold-rolled-grain-oriented (CRGO) steels, powder metals, soft magnetic composites ("SMCs"), and the like.

As used herein, the term "pole face" refers to a surface of a pole shoe that faces at least a portion of the flux interaction region (as well as the air gap), thereby forming one boundary of the flux interaction region (as well as the air gap). In some embodiments, the term "pole face" can be described generally as including a "flux interaction surface." In one embodiment, the term "pole face" can refer to a "stator surface."

As used herein, the term "pole shoe" refers to that portion of a field pole member that facilitates positioning a pole face so that it confronts a rotor (or a portion thereof), thereby serving to shape the air gap and control its reluctance. The pole shoes of a field pole member are generally located near one or more ends of the core starting at or near a coil region and terminating at the pole face. In some embodiments, the term "pole shoe" can be described generally as a "stator region."

As used herein, the term "soft magnetic composites" ("SMCs") refers to those materials that are comprised, in part, of insulated magnetic particles, such as insulation-coated ferrous powder metal materials that can be molded to form an element of the stator structure of the present invention.

As used herein, the term "transition region" refers to an optional portion of a pole shoe that facilitates offsetting or diverting a segment of a flux path (e.g., within a core region) to another segment of the flux path (e.g., within a pole shoe). One or more pole shoes can implement transition regions to improve motor volumetric utilization (e.g., by placing coils in a compact configuration nearer to an axis of rotation). Specifically, the transition region keeps the reluctance of the field pole member relatively low while facilitating compaction of the elements constituting an electrodynamic machine. Such elements include shafts, field pole members, magnets and the like.

Discussion

Figure 2A:
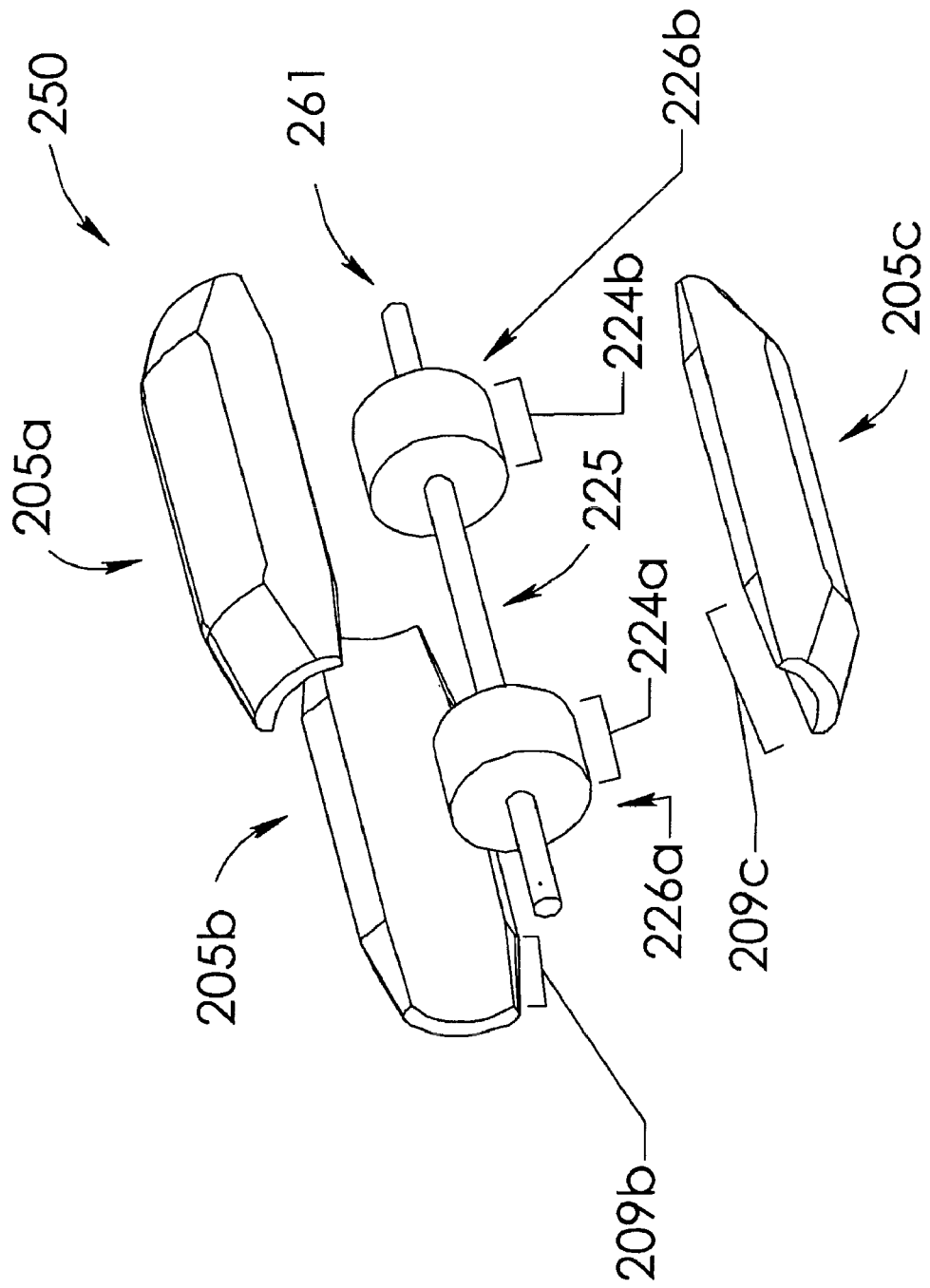
FIG. 2A is an exploded view of exemplary rotor-stator structure implementing cylindrical magnets, according to one embodiment of the present invention.

FIG. 2A is an exploded view of an exemplary rotor-stator structure in accordance with a specific embodiment of the present invention. FIG. 2A depicts a rotor assembly 261 including at least two cylindrical magnets 226a and 226b mounted on or affixed to a shaft 225, each of cylindrical magnets 226a and 226b having magnet surfaces (or at least portions thereof) 224a and 224b, respectively, that are cylindrical. In various embodiments of the present invention, shapes other than cylinders, such as cones, can be implemented to practice rotor-stator structure 250. FIG. 2A also depicts field pole member 205a, 205b, and 205c respectively having pole faces 209a, 209b, and 209c for confronting portions of magnet surface 224a. Note that not all pole faces are shown or identified.

In various embodiments, each of field pole members 205 is configured to increase torque generated per unit size (or per unit weight) for electric motor implementations by at least minimizing the length of magnetic flux paths through field pole members. Further, field pole members 205 provide straight or substantially straight flux paths (or segments thereof) to minimize linear deviations of the magnetic flux. Typically, the path segments are generally parallel to the axis of rotation. So by implementing straight or substantially straight paths, each of those field pole members provide a relatively low reluctance flux path as compared to conventional magnetic return path designs that require magnetic flux to turn sharply about the periphery, such as at an angle of ninety-degrees (or thereabout), between field pole regions. As such, rotor-stator structures in some embodiments can implement straight or substantially straight paths to enable electrodynamic machines to operate with reduced magnetic losses and increased efficiency. Various alternate embodiments and features of the rotor-stator structure of the present invention are described next. The following description is applicable to magnets having other shapes than or equivalents to conical and/or cylindrical magnet shapes.

Figure 2B:
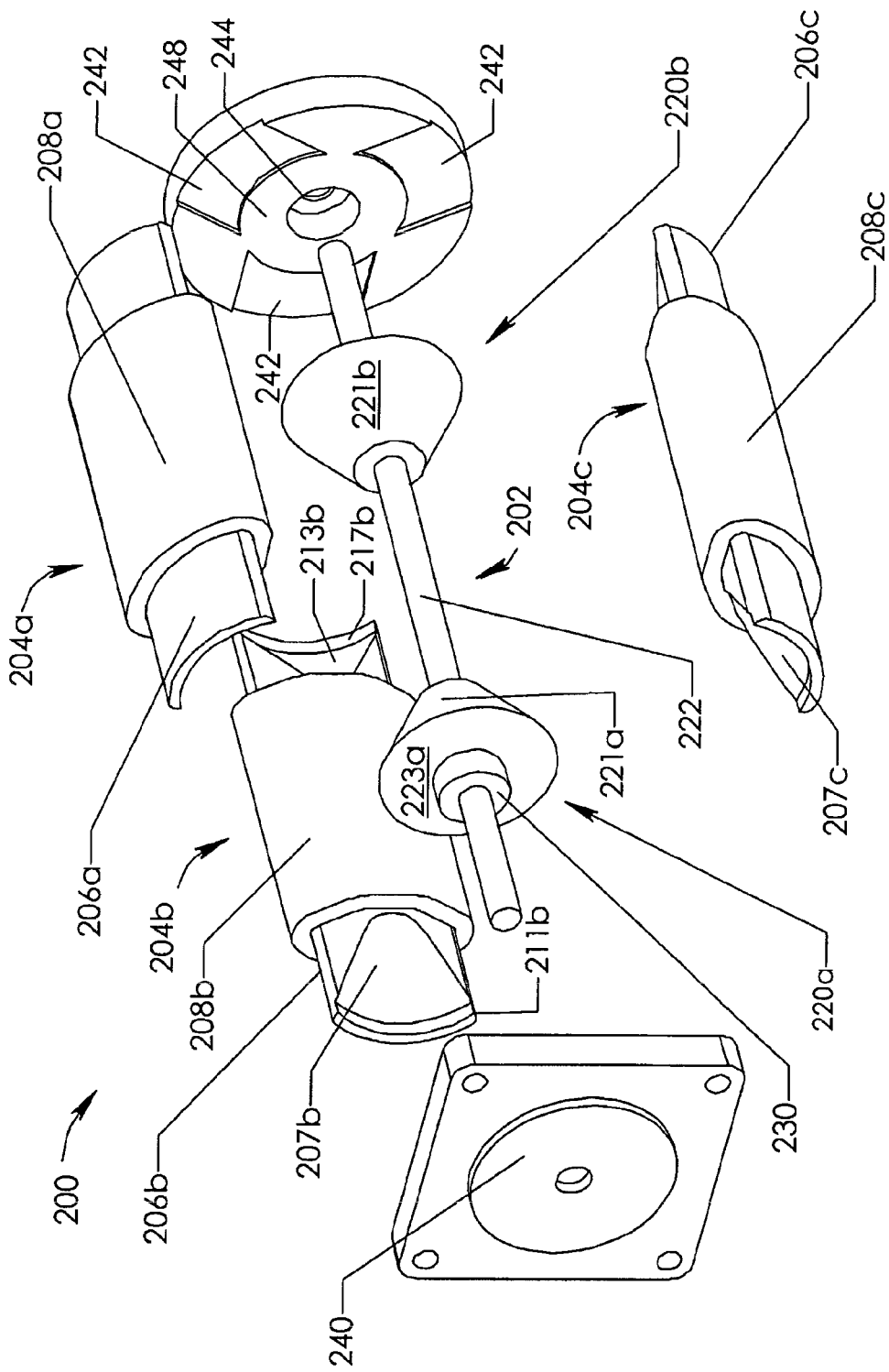
FIG. 2B is an exploded view of an exemplary rotor-stator structure in which the magnets are conical in shape, according to one embodiment of the present invention.

FIG. 2B is an exploded view of an exemplary rotor-stator structure in accordance with a specific embodiment of the present invention. In this example, rotor-stator structure 200 includes a rotor assembly 202 and a number of active field pole members 204 (i.e., active field pole members 204a, 204b, and 204c), whereby active field pole members 204 are configured to magnetically couple to and drive magnets of rotor assembly 202. Rotor assembly 202 includes two conical magnets 220a and 220b mounted on or affixed to a shaft 222 such that at least a portion of a conical magnet surface 221a on conical magnet 220a faces at least a portion of a conical magnet surface 221b on conical magnet 220b. In particular, the smaller-diameter ends (i.e., nearest the cones' vertices, if present, or nearest the cones' conceptual vertices if otherwise not present due to, for example, truncation of the cone) of the conical magnets 220a and 220b face each other. Further, conical magnets 220a and 220b are each positioned adjacent to one group of ends of active field pole members 204. In various embodiments of the present invention, conical magnet surfaces 221a and 221b each have an angle of inclination with respect to the axis of rotation, where the angle is from about 5 degrees to about 85 degrees. In a specific embodiment, the angle of inclination can be from about 10 degrees to about 80 degrees. In at least one embodiment, the angle of inclination is about 30 degrees with respect to the axis of rotation, for example, when conical magnets 220a and 220b are composed of relatively high performing magnet material (e.g., magnets having relatively high values of maximum energy product and "Br," and high coercivity, as is discussed below). In various embodiments, shaft 222 can be composed of magnetically permeable material, while in other embodiments it can be made of non-magnetic and/or non-electrically conductive materials. As such, rotor-stator structure 200 does not require shaft 222 to form flux paths; active field pole members 204 and conical magnets 220a and 220b are sufficient to form flux paths in accordance with at least one embodiment of the invention.

Each of active field pole members 204 includes a field pole member 206 and an insulated coil 208 wrapped around a respective field pole member 206. Field pole members 206 are positioned coaxial about an axis of rotation, which can be defined by the axis of shaft 222. Coils 208a, 208b and 208c are generally wound about the central portions of field pole members 206a, 206b and 206c, respectively, to produce ampere turn-generated magnetic flux in field pole members 206 when the coils 208 are energized with current. In at least one embodiment, one or more active field pole members 204 constitute, at least in part, a stator assembly (not shown). At each end region of active field pole members 204 are pole faces 207, each of which is located adjacent to and confronting at least a portion of the conical magnet surfaces of the conical magnets 220a and 220b, thereby defining functional air gaps between magnet surfaces (or portions thereof) and pole faces. According to a specific embodiment of the present invention, pole faces 207 are contoured to mimic the surfaces of a magnet, such as that of conical magnet 220a. For example, pole face 207b is a concave surface resembling the curvature of that of a convex surface of conical magnet 220a. In one embodiment of the present invention, an optional extended end, such as an extended end 211b, extends longitudinally from field pole members 206 to extend over and/or past outer surfaces of conical magnets 220a and 220b. As another example, extended end 217b is configured to extend past the outer surface of conical magnet 220b for insertion into one of grooves 242 to construct rotor-stator structure 200. But note that in some embodiments, extended end 211b as well as other extended ends of field pole members 206 are absent, thereby permitting pole faces 207 to confront conical magnets 220a and 220b that have their larger diameter ends (one of which coincides with or is nearest outer magnet surface 223a) extending to or beyond a radial distance associated with the outer surfaces of field pole members 206.

As either rotor assembly 202 or the number of active field pole members 204 can be configured to rotate in relation to the other, rotor-stator structure 200 can optionally include bearings 230 and both a front mounting plate 240 and a rear mounting plate 248. In a specific embodiment, mounting plates 240 and 248 can be made of non-magnetic and/or non-electrically conductive materials. Cavities 244 in mounting plates 240 and 248 are designed to receive bearings 230, and grooves 242 are designed to receive at least a portion of an extended end, such as extended end 217b, of an active field pole member. In some cases, grooves 242 confine the movement of active field pole members 204 to maintain a proper position with respect to rotor assembly 202. A protective housing (not shown) can be added to protect both rotor assembly 202 and field pole members 204 and can also serve as a heat sink for one or more coils 208. While useful to implement the exemplary rotor-stator structure 200, various embodiments of the invention are not limited to including mounting plates 240 and 248 as well as bearings 230 and grooves 242, especially when generating a flux path in accordance with embodiments of the present invention.

Note that although each field pole member 206 is shown to be wrapped by insulated coil 208, fewer than all of field pole members 206 can be wrapped by coil 208, according to a specific embodiment. For example, coils 208b and 208c can be omitted from active field pole members 204b and 204c, respectively, to form an electrodynamic machine that, for example, costs less to manufacture than if coils 208b and 208c were included. Without coils 208b and 208c, members 204b and 204c constitute field pole members rather than active field pole members. Also note that although field pole members 206a, 206b and 206c are shown as straight field pole members, there is no requirement that field pole members 206a, 206b and 206c be straight or substantially straight. In some embodiments, one or more of field pole members 206a, 206b and 206c can be shaped to implement transition regions, such as described below, in field pole members to convey flux in other than a straight flux path. For example, field pole members 206a, 206b and 206c can be shaped to position coils 208 closer to shaft 222, thereby decreasing the volume of an electrodynamic machine implementing rotor-stator structure 200.

In at least one specific embodiment, each of one or more active field pole members 204 include only one or more coils 208 and a field pole member, such as any of 206a, 206b and 206c. In some cases, active field pole members 204 can include tape, paper, and/or paint, or the like that do not add substantial support for coil windings that are wound about a field pole member. Generally, the windings of one or more coils 208 are wound directly on the field pole member itself. The conductors of one or more coils 208 can generally include insulation. But in this specific embodiment, each of active field pole members 204 does not include any other intermediate structure, such as a coil carrier structure, which requires additional material cost and labor during a manufacturing process.

FIG. 3 depicts an end view 300 of rotor-stator 200 illustrating orientation of the pole faces that are configured to interact via an air gap with a confronting magnetic surface of conical magnet 220a, according to one embodiment of the present invention. Absent from FIG. 3 is front mounting plate 240, bearings 230 and conical magnet 220a, all of which are omitted to depict the end views of both the active field pole member and coil shapes, as well as the field pole gaps ("G") between the field poles. As shown, coils 208a, 208b, and 208c respectively encompass field pole members 206a, 206b and 206c to form active field pole members 204a, 204b and 204c, all of which are compactly positioned to increase the packing density of a motor or generator implementing rotor-stator structure 200 (as compared to conventional motors using coil windings that typically are wound using slots 108 of FIG. 1). FIG. 3 also depicts edges of extended ends 311a, 311b, and 311c, and pole faces 307a, 207b, and 207c of respective active field pole members 204a, 204b and 204c. Pole faces 307a, 207b, and 207c are positioned to form magnetic air gaps between each of those pole faces, or surfaces, and at least a portion of the conical magnet surface of conical magnet 220a. Further, field pole gaps are defined by the sides (or edges) of the field pole members that constitute active field pole members 204a, 204b and 204c. For example, gap "G" represents any of the field pole gaps as defined, for example, by planes 310 and 320 extending from sides of respective field pole members 206b and 206c (FIG. 2B). In at least one specific embodiment, a surface area associated with each of pole faces 307a, 207b, and 207c is dimensioned to generate maximum torque output in an optimal configuration. An example of such a configuration is one where magnetic coupling between conical magnet 220a and field pole members 206a, 206b and 206c is at or near a maximum amount while leakage across gap "G" between the field pole members is at or near a minimal amount. Note that by increasing the surface area of any of pole faces 307a, 207b, and 207c, magnetic coupling is increased.

Figure 4:
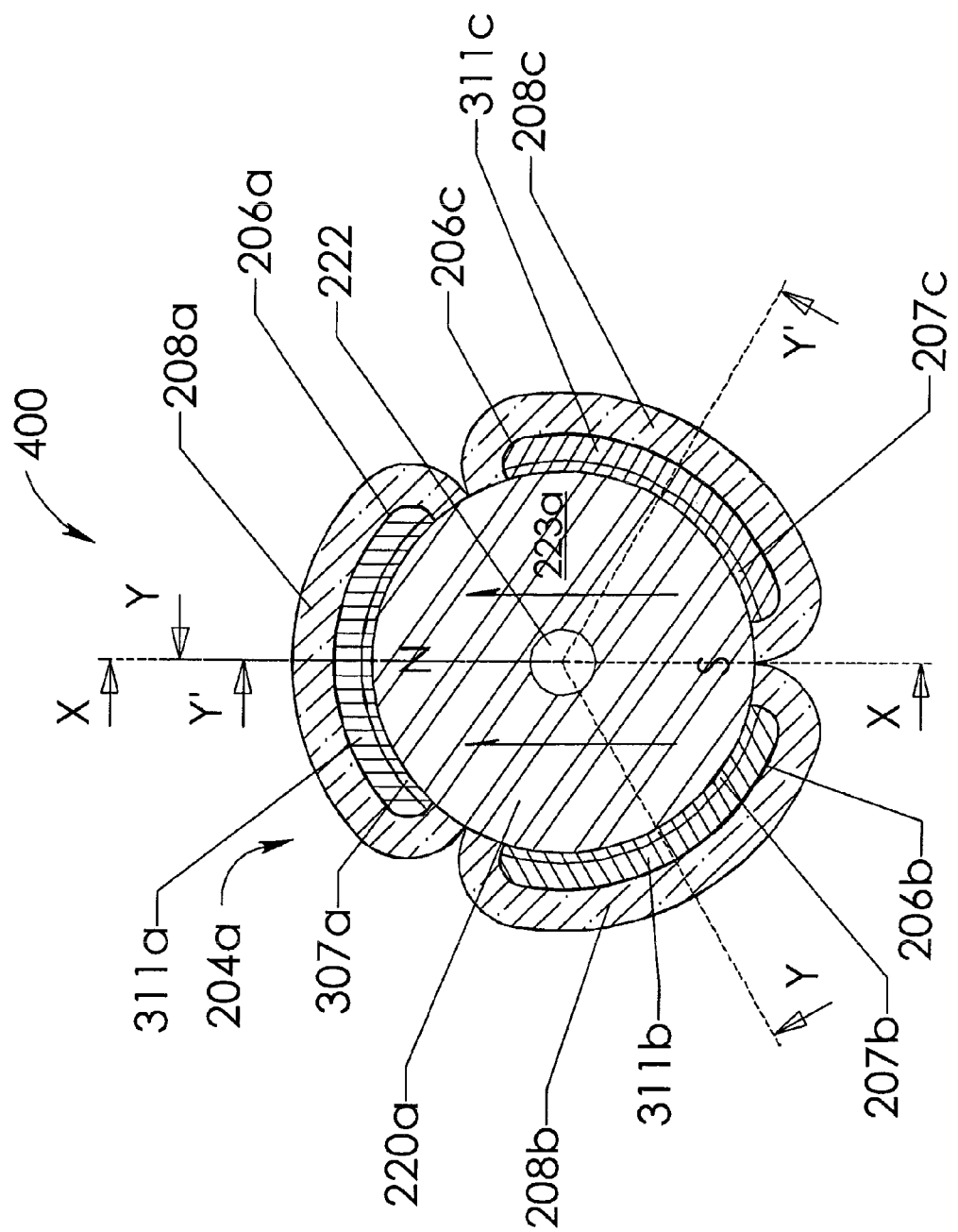
FIG. 4 depicts another end view for the rotor-stator structure of FIG. 2B illustrating a conical magnet positioned adjacent to pole faces in accordance with an embodiment of the present invention.

FIG. 4 depicts another end view 400 of rotor-stator 200 and conical magnet 220a positioned adjacent to pole faces 307a, 207b, and 207c (FIG. 3) in accordance with an embodiment of the present invention. As shown, outer magnet surface 223a of conical magnet 220a is visible, as are the protruding edges of extended ends 311a, 311b, and 311c and coils 208. Note that while this example shows conical magnet 220a as a dipole magnet (e.g., a permanent magnet) having a north pole ("N") and a south pole ("S"), conical magnet 220a can have any number of north poles and south poles. Note that in some embodiments, conical magnets 220a and 220b can be implemented using electro-magnets. Also, FIG. 4 defines three sectional views. The first sectional view, X-X, cuts straight through as a centerline bisecting field pole member 206a and coil 208a and then passes via magnet 220a through a field pole gap between other field pole members 206b and 206c. A second section view, Y-Y, bisects field pole member 206a and coil 208a and then passes via magnet 220a through field pole member 206b and coil 208b. A third view section view, Y'-Y', which is similar to the second section view, Y-Y, bisects field pole member 206a and coil 208a and then passes via magnet 220a through field pole member 206c and coil 208c. Section view X-X is shown in FIG. 5A, whereas views Y-Y and Y'-Y' produce similar drawings, both of which are depicted in FIG. 5B.

Figure 5A:
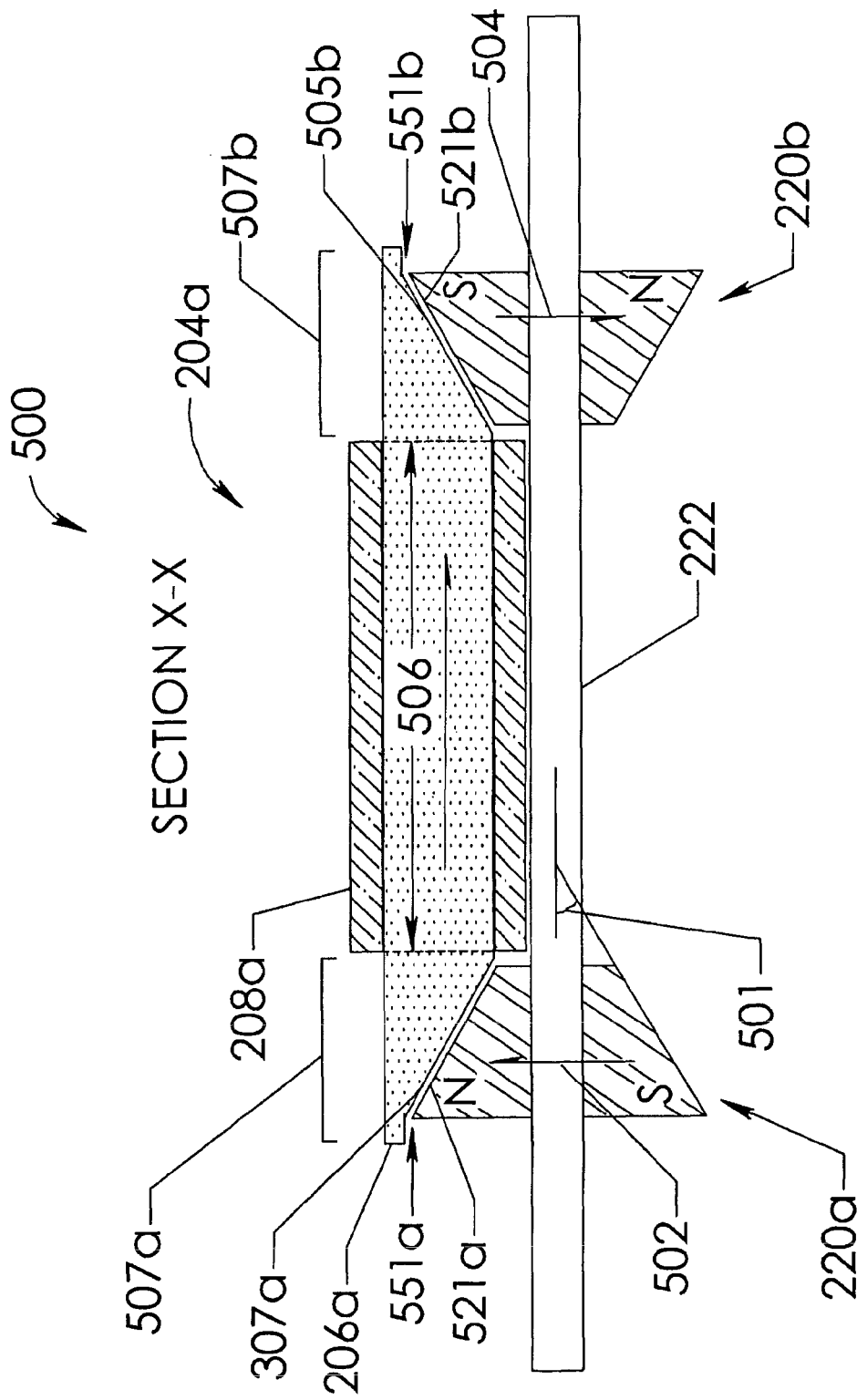
FIGS. 5A and 5B depict sectional views illustrating an exemplary magnetic flux path, according to at least one embodiment of the present invention.
Figure 5B:
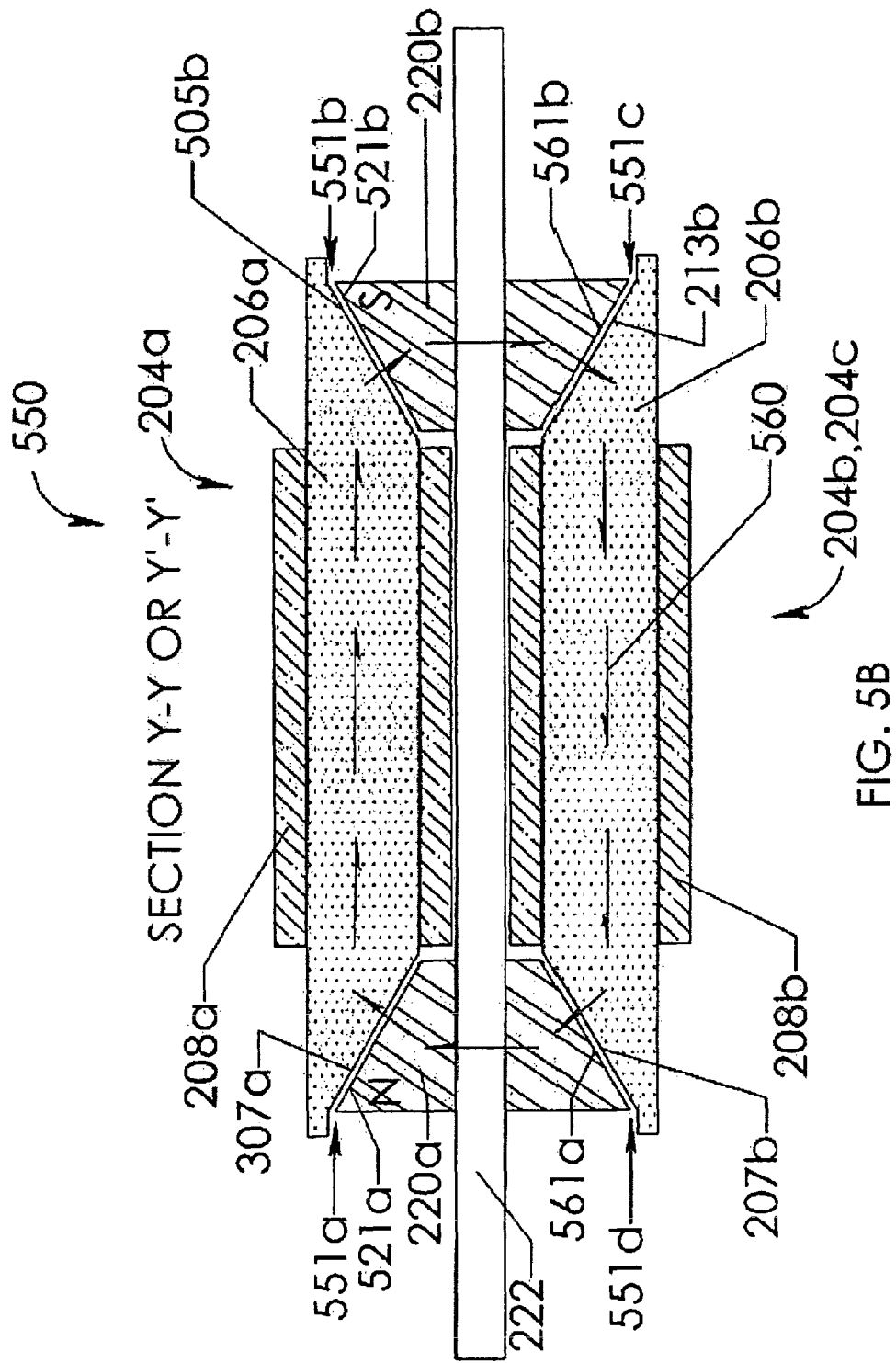

FIGS. 5A and 5B depict sectional views illustrating an exemplary magnetic flux path, according to at least one embodiment of the present invention. FIG. 5A depicts a cross section of active field pole member 204a of rotor-stator structure 500, the cross section showing a sectional view X-X of coil 208a and field pole member 206a. In this example, active field pole member 204a includes pole faces 307a and 505b, pole shoes 507a and 507b, a coil region 506 and coil 208a. In view X-X of FIG. 5A, conical magnets 220a and 220b are diametrically magnetized in opposite directions and are positioned adjacent to respective pole shoes 507a and 507b of field pole member 206a. Correspondingly, pole face 307a of pole shoe 507a forms a magnetic air gap 551a with at least a portion 521a of magnet surface 221a of FIG. 2B, with portion 521a confronting pole face 307a and shown as a cross-section. Similarly, pole face 505b of pole shoe 507b forms a magnetic air gap 551b with at least a portion 521b of magnet surface 221b of FIG. 2B, with portion 521b confronting pole face 505b and shown as a cross-section. Note that portions 521a and 521b need not extend the axial length of conical magnets 220a and 220b, respectively. For example, portions 521a and 521b can be defined by regions that are bounded between the largest and smallest cross-sectional diameters of conical magnets 220a and 220b, but can be of any size. Accordingly, portions 521a and 521b need only form air gaps with a pole face, with other surface portions of conical magnets 220a and 220b being configured not to form air gaps, according to at least one embodiment. Further, coil 208a encloses a coil region 506 of field pole member 206a, whereby coil region 506 is defined approximately by the axial length of coil 208a surrounding a portion of field pole member 206a. Absent in FIG. 5A is a depiction of one or more field interaction regions, which can encompass a space larger than an air gap, such as air gap 551a, and can extend into, for example, conical magnet 220a.

In at least one embodiment of the present invention, at least one of magnet portions 521a and 521b of surfaces on respective conical magnets 220a and 220b can be defined as being bounded by an angle of inclination (".theta.") 501, which is an angle with respect to an axis of rotation. In the example shown, the axis of rotation is coterminous with shaft 222. In a specific embodiment, angle of inclination (".theta.") 501 is 30 degrees from shaft 222. But note that angle 501 can be any angle.

With opposite polarizations, conical magnet 220a is polarized with its north pole ("N") pointing in direction 502, and conical magnet 220b is polarized with its north pole ("N") pointing in direction 504. In some embodiments, conical magnets 220a and 220b are diametrically magnetized in exactly opposite directions (i.e., 180 degrees between directions 502 and 504). But in other embodiments, directions 502 and 504 can be offset to any angle between those directions other than 180 degrees, for example, to reduce detent torque ("cogging"). In a specific embodiment, directions 502 and 504 are offset to an angle between from about 150 degrees to about 180 degrees. In various embodiments, conical magnets 220a and 220b (or other types of magnets) are each polarized to have a direction of polarization in one or more planes that are substantially perpendicular to the axis of rotation.

FIG. 5B depicts cross sections of active field pole member 204a and either active field pole member 204b or active field pole member 204c of FIG. 3, and depicts a magnetic flux path, according to one embodiment of the present invention. For ease of discussion, only view Y-Y will be discussed. View Y-Y is a sectional view of coil 208a and field pole 206a passing though coil 208b and field pole member 206b. Magnetic flux path 560 passes through both field pole members 206a and 206b and through both conical magnets 220a and 220b. For purposes of illustration, magnetic flux path 560 (or flux path) may be described as comprising two flux paths that are combined by the principle of superposition. Conical magnets 220a and 220b form the first flux path (i.e., permanent magnet-generated flux), whereas flux developed by amp-turns of the coil form the second flux path (i.e., ampere turn-generated flux). In this example, magnet flux as the first flux path exits the north pole ("N") of conical magnet 220a and crosses air gap 551a to enter pole face 307a (FIG. 3), the north pole coinciding with surface portion 521a, which confronts pole face 307a. The first flux path then traverses longitudinally through field pole member 206a and then exits pole face 505b at the end of field pole member 206a adjacent to conical magnet 220b. The first flux path continues by crossing air gap 551b and enters the south pole ("S") of conical magnet 220b, the south pole generally coinciding with a surface portion 521b of magnet surface 221b and confronts pole face 505b. The first flux path passes through conical magnet 220b to its north pole, which generally coincides with a surface portion 561b of magnet surface 221b that confronts pole face 213b. Next, the first flux path crosses air gap 551c and enters pole face 213b (FIG. 2B). From there, the first flux path returns through field pole member 206b to pole face 207b from which it exits, crosses air gap 551d, and then enters the south pole of conical magnet 220a, thereby completing the first flux path. Generally, the south pole of conical magnet 220a coincides with a surface portion 561a of magnet surface 221a (FIG. 2B) that is confronting pole face 207b. Note that in the case shown, the flux exiting pole face 207b is equivalent to that flux exiting pole face 207c. Note that no supplemental structure or material need be required to form any portion of magnetic flux path 560. As such, rotor-stator structure 550 does not include back-iron.

In a specific embodiment, the diameters of conical magnets 220a and 220b are set so that the length of the flux path in each of conical magnets 220a and 220b is relatively large with respect to the four air gaps 551a to 551d, thereby establishing a favorable magnet load line. Note that each of the four air gaps 551a to 551d provides for a flux interaction region to facilitate magnetic flux interaction between (or through) pole faces and the magnet. Note further that a flux path in either conical magnet 220a or 220b is shown to align along the axis of magnetization (i.e., from the south pole to the north pole), which can contribute to low magnet manufacturing costs and to magnets that can generate a relatively high output torque per unit volume (or size). The coercivity of the magnet, which is the property of the magnet that determines how well a magnet will keep its internal flux alignment in the influence of strong external magnetic fields, can be optimally selected by using appropriate magnet materials for a specific application.

In at least one embodiment, rotor-stator structure 550 (FIG. 5B) generates at least a portion of magnetic flux path 560 that extends substantially linearly from about surface portion 521a of the magnet surface of first conical magnet 220a to about surface portion 521b of the magnet surface of second conical magnet 220b. In one instance, the portion of the magnetic flux path consists essentially of surface portion 521a of first conical magnet 220a, surface portion 521b of the second conical magnet 220b, at least one of the field pole members, such as field pole member 206a, and two or more air gaps, such as air gaps 551a and 551b.

In at least one embodiment of the present invention, conical magnets 220a and 220b can have at least the following two magnetic properties. First, conical magnet 220a and 220b are able to produce magnetic flux, such as measured in terms of flux density, "B," with CGS units of Gauss. "CGS" refers to units described in terms of the centimeter, the gram, and the second. Second, the magnet materials of conical magnet 220a and 220b are such that the magnets resist demagnetization. Materials that have an ability to highly resist demagnetization are often described as having "high coercivity," as is well known in the art. Suitable values of demagnetizing fields can be used to drive a specific magnet material flux density output to zero. As such, magnet materials that have relatively high values of coercivity generally indicate that a magnet material is capable of withstanding large values of adverse external magnetic field intensities without suffering demagnetization effects. In a specific embodiment, conical magnet 220a and 220b are composed of magnet materials having a recoil permeability value relatively close to 1.00 and sufficient coercivity, Hd, under operating conditions as to be reliable in reasonably expected conditions of operation.

Magnet materials are often characterized in part by a maximum energy product of such materials. In addition, magnet materials may be characterized by "Br," which is the magnetic flux density output from a magnet material when measured in a closed circuit and no measured external magnetic fields are being applied to that magnetic material. That maximum flux density value is frequently denoted as "Br." A high value of Br indicates that a magnet material is capable of large magnetic flux production per pole area (i.e., a high flux density). In at least one embodiment, conical magnets 220a and 220b use magnets having high flux production capability (e.g., having high values of "Br") in configurations where relatively high torque is desired in relatively small device volumes.

In various embodiments, conical magnets 220a and 220b (or other magnets) use high-valued Br magnets that can be relatively short in the axial direction and use a cone angle of about 30 degrees, for example, from the axis of rotation. But in some embodiments, conical magnets 220a and 220b (or other magnets suitable for practicing the present invention) use magnet materials having lower cost and lower values of Br. In this case, the magnets generally are implemented with an air gap having a relatively larger area than those associated with higher values of Br. In particular, an increased area for an air gap is formed by increasing the axial length of a magnet, thereby increasing the surface area of a magnetic surface confronting a respective pole face. As such, lesser cone angles (e.g., less than 30 degrees) in a same outer diameter device (e.g., motor housing) can be used, albeit longer in the axial direction. Although the output torque performance, and Km, can remain the same over many embodiments, the manufacturing cost can be less in the low-valued Br version even though there can be an increase in axial length.

While various embodiments of the present invention cover a multitude of design motor and/or generator designs using any of known available magnet materials, at least one embodiment uses magnet materials with low ratios of values of B to values of adverse applied field intensity, H, such ratios, as is typically specified in many magnet material data sheets, being measured at the respective material's Br point, those ratios defining the "recoil permeability at Br" of such materials. While in some cases magnet materials need not only be limited to high values of coercivity, the magnet materials should exhibit predictable output flux densities when subjected to expected adverse magnetic field or thermal conditions. As such, the value of "recoil permeability" can be at least one factor when designing motors and/or generators using a rotor-stator structure of the present invention.

Recoil permeability is generally an expression of the relationship between values of B and the values of adverse applied field intensity. The values of recoil permeability are typically evaluated in terms of CGS units (because the permeability of air is 1.0 in CGS units) and can be determined by dividing a value of B (e.g., expressed in Gauss), near or at Br, by a value of adverse applied field intensity (e.g., H, near or at He, expressed in Oerstead). For some magnet materials, an average recoil permeability value can be determined and may be useful in magnet material selection. In one embodiment, recoil permeability can be defined for various magnetic materials by Magnetic Materials Producers Association ("MMPA") Standard 0100-00, as maintained by the International Magnetics Association ("IMA"). Note that recoil permeability can also be described in terms of MKS units (i.e., meter, kilogram, and second).

Generally, values of recoil permeability are not less than one when expressed in CGS units. The closer that a recoil permeability value is to 1.0, however, the higher the coercivity can be for a specific measured material. In most embodiments of the present invention, a value of recoil permeability is typically less than 1.3. Typical high-coercivity magnet materials, such as magnets composed of neodymium-iron ("NdFe") and variants thereof, can have a recoil permeability value of about 1.04 in CGS units. Examples of recoil permeability values from various suppliers are as follows: 1.036 for grade 32H (as manufactured by Hitachi, Ltd.); 1.028 for grade 35H (as manufactured by Magnetic Component Engineering, Inc. or "MCE"); and 1.02 for grades 22H through 33H as well as 1.05 for grades 35SA through N52 (as manufactured by Shin-Etsu Magnetics Inc.). An example of such a variant is Neodymium-Iron-Boron, or "NdFeB." Common low-cost ceramic magnets, such as those composed of ferrite ceramic, can have a ratio value of about 1.25, which permits ceramic magnets to perform adequately in most applications. Note that the average recoil permeability of typical high performance ceramic magnets is usually within a range of 1.06 to 1.2 in CGS units, more or less. Example values from one supplier, Hitachi, Ltd., are as follows: 1.2 for isotropic grade YBM 3 and 1.06 for anisotropic grades YBM 1 and 2. Permanent magnets in various embodiments of the present invention can comprise any magnetic material known to those ordinarily skilled in the art. Examples of such magnet materials include one or more rare-earth magnet materials that are known in the art, such as Neodymium Iron Boron ("NdFeB"), Samarium Cobalt ("SmCo") and variants of both, as well as ceramic magnets.

Coils 208 wound around each of field pole members 206 form the second flux path. In this example, the flux generated by the ampere-turns in coils 208a and 208b of FIG. 5B travels in a similar path to the permanent magnet flux, with the exception that conical magnets 220a and 220b (FIG. 2B) and cylindrical magnets 226a and 226b (FIG. 2A) have effective properties similar to that of air as viewed by the ampere turn-generated flux. As such, the ampere-turn flux generated within field pole member 206a (e.g., within coil region 506) is present at the pole faces adjacent to conical magnets 220a and 220b of FIGS. 5A and 5B and cylindrical magnets 226 of FIG. 2A. Note that coils 208, as conductors, can be wires having a circular cross-section or any other shape, such as square or rectangular.

In at lease one specific embodiment, coils 208 can include foil conductors that are conductors having a rectangular cross-section with a relatively large width and a relatively small height. Foil conductors with insulation between layers can be used in place of wire to decrease winding resistance and increase current handling capacity in the same available winding volume. Use of a foil conductor can also decrease the inductance of the winding. In one embodiment, the insulation is affixed to one side of the foil to isolate the foil conductor in subsequent windings around the core. That is, only one side of the foil conductors need be insulated since that one side insulates a non-insulated side of a previous wound portion of the foil conductor (or foil coil). Advantageously, this reduces the amount of insulation required for coils 208, thereby saving resources, increasing packing density and increasing the number of ampere turns (while decreasing the number of conductor turns) in a space otherwise filled by fully insulated conductors (i.e., insulated on all sides, such as an insulated wire). As the foil conductor also provides for relatively smaller bending radii, it can thereby decrease the winding resistances usually common in conductors having sharper bends. By decreasing the resistance, this type of conductor can also conserve power in generating amp-turn flux, especially in battery-powered motor applications.

Figure 5C:
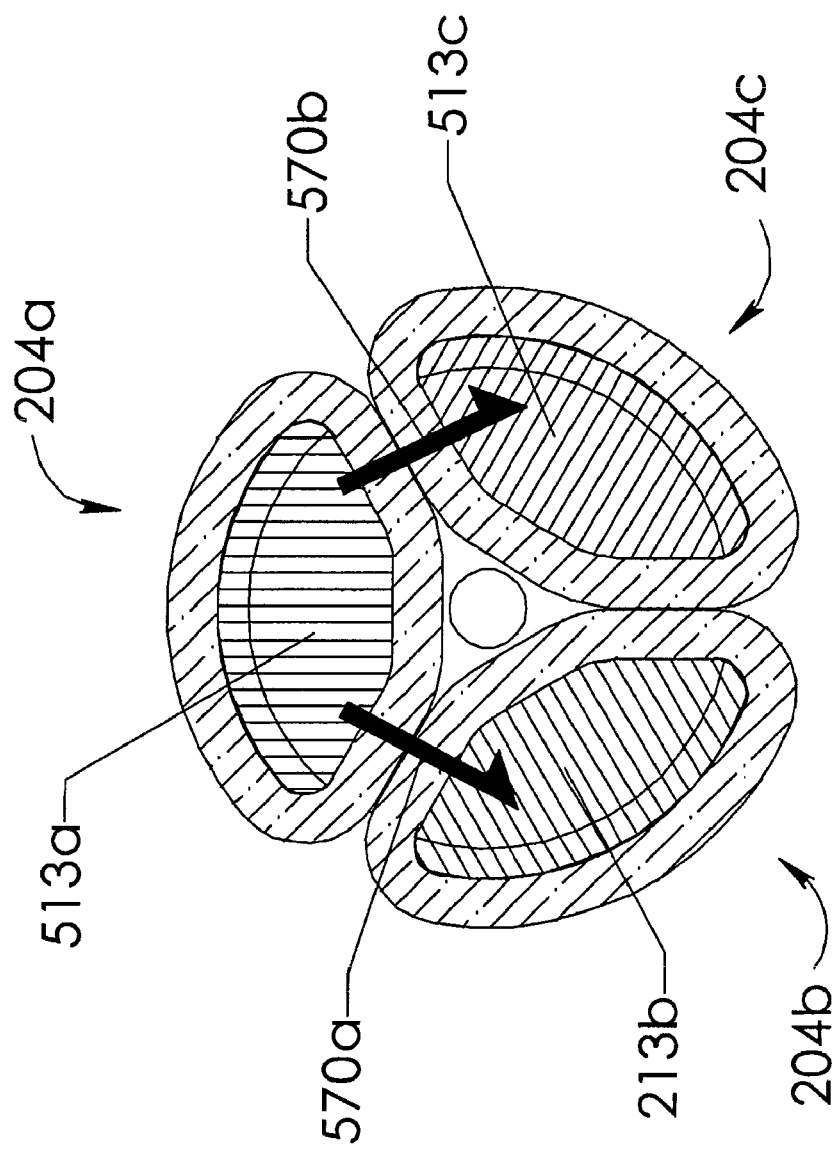
FIG. 5C depicts an example of a second flux path exiting a pole face of a stator member generating an ampere-turn magnetic flux, according to one embodiment of the present invention.

FIG. 5C depicts an example of a second flux path exiting a pole face of the active field pole member that generates that ampere-turn magnetic flux, according to one embodiment of the present invention. In this figure, ampere-turn ("AT")-generated flux is generated in active field pole member 204a and then exits from pole face 513a of FIG. 5C (or as shown as pole face 505b in FIG. 5B) while dividing approximately in half to form flux 570a and 570b. Then, ampere-turn flux 570a enters pole face 213b, and ampere-turn flux 570b enters pole face 513c. Then, respective portions of the second flux path then travel longitudinally through the other field pole members (e.g., field pole members 206b and 206c) to the other ends of those other field pole members to return to active field pole member 204a, which initially generated the second flux path.

FIG. 5D depicts an example of the second flux path(s) returning to a pole face of the active field pole member that generated the ampere-turn magnetic flux, according to one embodiment of the present invention. As shown, ampere-turn magnetic flux 570c and 570d exit respective pole faces 207b and 207c to enter pole face 307a, thereby completing the magnetic circuit of the second flux path (i.e., the ampere-turn magnetic flux path).

Conceptually, the magnetic fields generated by the ampere-turns in each field pole member of active field pole members 204a, 204b, and 204c in FIG. 5D can be viewed as regions of magnetic potential at each of the pole faces at the end regions or pole shoes of the active field pole members. In the air gaps between the confronting surfaces of the conical magnets and their adjacent pole faces, the flux of the first flux path and the flux of the second flux path interact in a manner familiar to those skilled in the art, where such an interaction is useful to generate torque by an electric motor implementing rotor-stator structure 200, according to at least one embodiment of the present invention. The first and the second flux paths of rotor-stator structure 200 are efficient, at least in part, because the flux is contained within the core regions 506 (FIG. 5A) of field pole members 206 by the currents running through coils 208. The magnet flux generated by each of the conical magnets 220a and 220b interacts in a flux interaction region with the magnetic flux from pole faces of active field pole members 204. As such, flux leakage paths are generally limited to relatively very small regions at pole shoes 507a and 507b (FIG. 5A), both of which include the sides and the backs of field pole members 206. As the first and second flux paths are also mostly straight in the magnetically permeable material of field pole members 206, these field pole members are well suited to be implemented with anisotropic (e.g., grain-oriented), magnetic materials in an efficient manner. As such, field pole members 206 can be composed of any anisotropic, magnetic materials capable of carrying higher flux densities and lowering magnetic losses in the direction of magnetic orientation, such as along the grains of grain-oriented materials, as compared to the use of isotropic, non-grain oriented, magnetic materials.

To illustrate, consider that an exemplary anisotropic (e.g., grain-oriented) material can have a magnetic saturation value of at least 20,300 Gauss, whereas a typical isotropic lamination material can have a saturation value of 19,800 Gauss. An example of a suitable anisotropic material for practicing at least one embodiment of the invention is grade M6 material, as defined by the American Iron and Steel Institute ("AISI"). An example of an isotropic material is M19 material, as designated by AISI. Moreover, the anisotropic material requires only 126 Oerstead of applied field to reach saturation compared to the isotropic material, which requires 460 Oerstead. Core losses for the anisotropic grain-oriented material (e.g., laminations of 0.014 inch thick) can be about 0.66 Watts per pound at 60 Hz with 15,000 Gauss induction for Flat-Rolled, Grain-Oriented, Silicon-Iron Steel. By contrast, a typical isotropic material such as AISI lamination material M19 can have core losses of about 1.72 to 1.86 Watts per pound under similar conditions (e.g., at thicknesses of 0.0185 inches). In view of the foregoing, the use of anisotropic materials in forming field pole members 206 is advantageous over the use of isotropic materials. According to at least one embodiment, a relatively straight shape for field pole members 206 enables effective use of anisotropic materials, unlike magnetic flux paths of traditional motors.

Unlike output torque generation of conventional motors, the output torque generated by rotor-stator structures 200 of various embodiments of the present invention need not be proportional to the radius from the axis of rotation of shaft 222 to the active air gaps 551a to 551d (FIG. 5B). All other factors being the same, increasing the radial distance of the pole faces and air gaps from shaft 222 does not change the output torque in the way that traditional motor design formulas indicate. For example, traditional motor design concepts teach that the regions carrying ampere-turn flux should be designed to have low reluctance paths, including the part of the ampere-turn magnetic flux path that is the air gap. According to various embodiments of the present invention, the ampere-turn flux path has a relatively high reluctance path through the space occupied by permanent magnets, such as conical magnets 220, yet peak torque production is relatively high in comparison to that of most traditional motors of the same size or weight (again, with other factors being equal). In a specific embodiment, the magnet materials that constitute conical magnets 220a and 220b of FIG. 2B and/or cylindrical magnets 226 of FIG. 2A, have a magnet permeability value similar to that of air, and as such, the volume of each conical magnet 220a and 220b or cylindrical magnet 226 appears as an additional air gap to the ampere-turn magnetic circuit. In at least one embodiment, the output torque generated by an electrodynamic machine is proportional, in whole or in part, to the volumes of conical magnets 220a and 220b or to the volumes of cylindrical magnets 226.

In operation of rotor-stator structure 200, coils 208 are sequentially energized to cause rotation of rotor assembly 202. The energized coils generate magnetic potentials at the pole faces. These magnetic potentials tend to re-orient the internal field directions of the magnets (e.g., conical magnets 220) to the direction of the applied external field. The external field, in effect, presents an angularly-directed demagnetizing field to conical magnets 220a and 220b such that the demagnetizing field is capable of reaching relatively large amplitudes when a motor implementing rotor-stator structure 200 is under high torque loads. The intense demagnetizing field can detrimentally re-magnetize magnet materials of conical magnets 220a and 220b that have insufficient coercivity. For this reason, at least one embodiment of the present invention uses magnet materials suited for high torque loading and have: (1) a low B-to-adverse-applied-field intensity ratio, and (2) a relatively low recoil permeability, such as less than 1.3 in CGS units, for example.

In an embodiment of the present invention, the produced torque is through the natural inclination of the magnets, such as conical magnets 220, to seek the lowest energy position. Accordingly, the magnet poles of conical magnets 220, which can be permanent magnets, tend to rotate toward regions of greatest magnetic attraction and away from regions of magnetic repulsion, whereby such regions of "magnetic potential" are created at the air gaps at both ends of energized active field pole members 204 by the ampere-turn generated magnetic fields. Since a magnet having a relatively high coercivity will resist attempts to angularly displace the direction of its internal magnetic field, this resistance to angular displacement is manifested as mechanical torque on the body of the permanent magnet, thereby transferring torque to the shaft. As such, the magnets (e.g., conical magnets 220) can develop and then transfer torque to the shaft as useful output torque applied to a load.

Figure 5E:
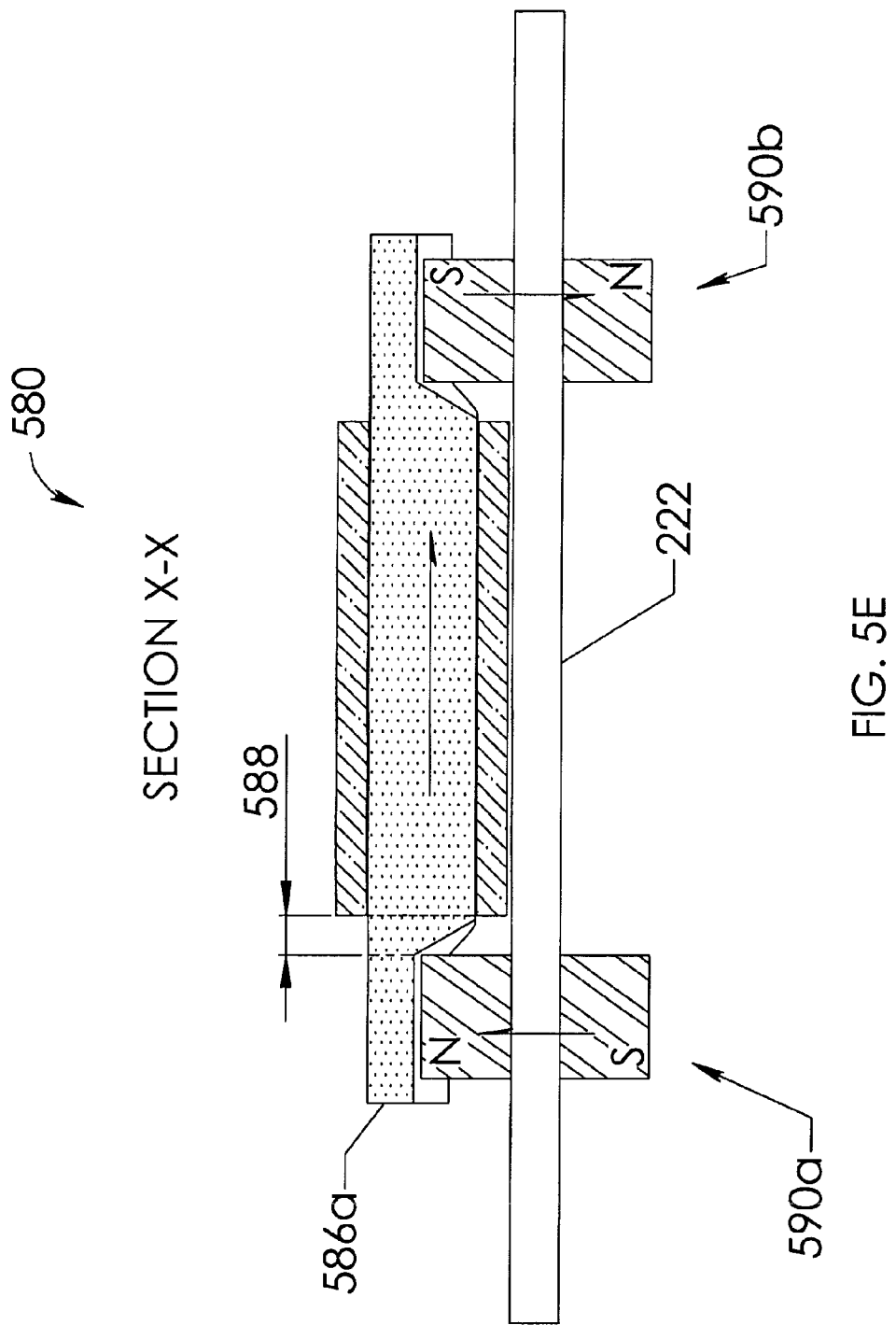
FIGS. 5E and 5F depict sectional views illustrating an exemplary magnetic flux path in another rotor-stator structure, according to an embodiment of the present invention.
Figure 5F:
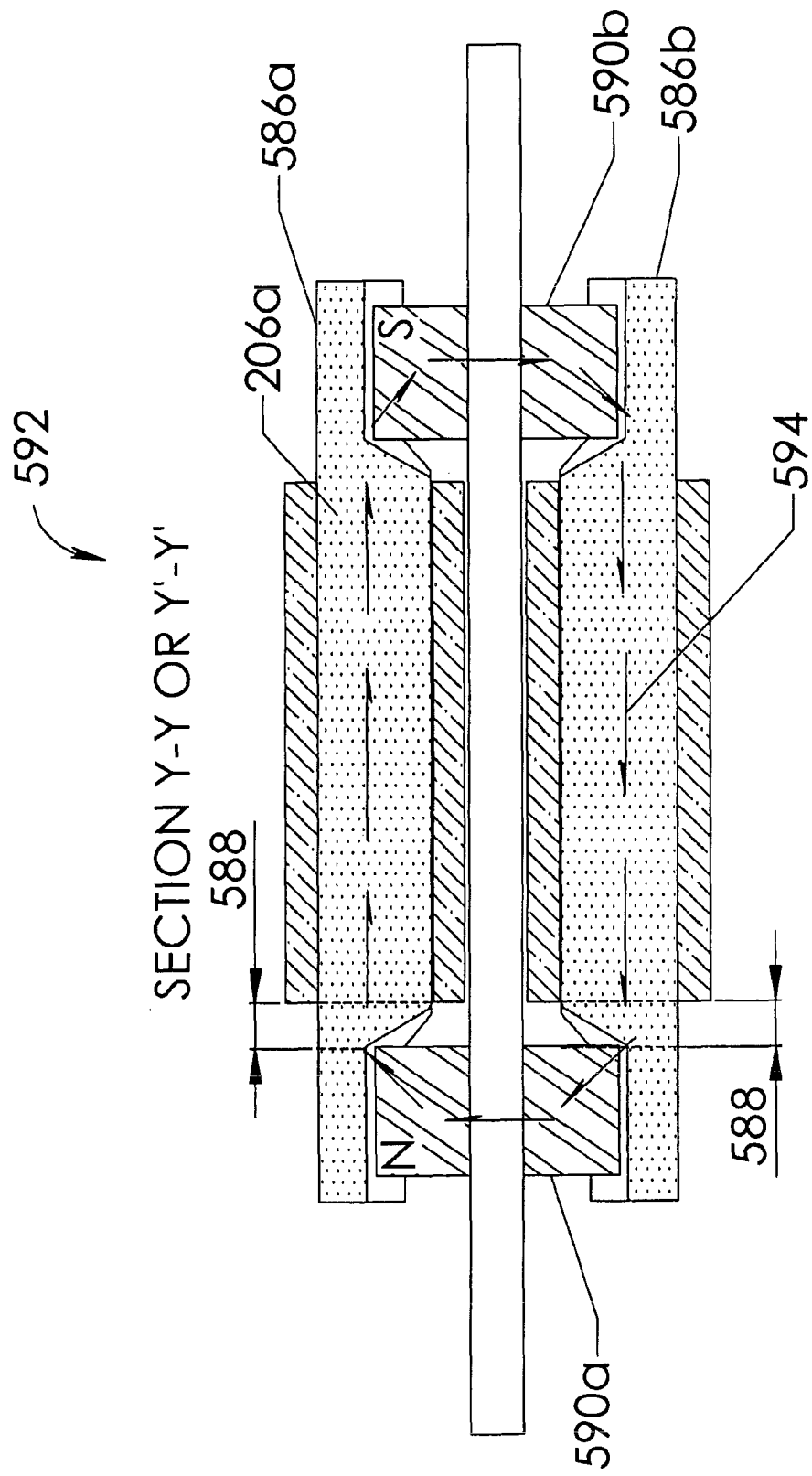

FIGS. 5E and 5F depict sectional views illustrating an exemplary magnetic flux path for another rotor-stator structure that includes cylindrical magnets, according to at least one embodiment of the present invention. FIG. 5E depicts a cross section of active field pole member 586a of rotor-stator structure 580, the cross section showing a sectional view X-X of field pole member 586a and cylindrical magnets 590a and 590b. While the pole faces, pole shoes, a coil region and coil are similar in functionality to similarly-named elements of FIG. 5A, field pole member 586a includes an additional structural and/or functional element. Namely, field pole member 586a includes a transition region 588, the function and structure of which are described below, such as in one or more of FIGS. 17A to 20. FIG. 5F depicts a sectional view of at least two active field pole members similar to FIG. 5B, and depicts a magnetic flux path, according to one embodiment of the present invention. Similar to sectional view Y-Y, as defined in FIG. 5B, rotor-stator structure 592 is a sectional view of field pole 586a and field pole member 586b. Magnetic flux path 594 passes through both field pole members 586a and 586b and through both cylindrical magnets 590a and 590b. Also shown are transition regions 588. Note that the shaft, pole faces, pole shoes, coil regions and coils are similar in functionality to similarly-named elements of FIG. 5B.

Figure 6A:
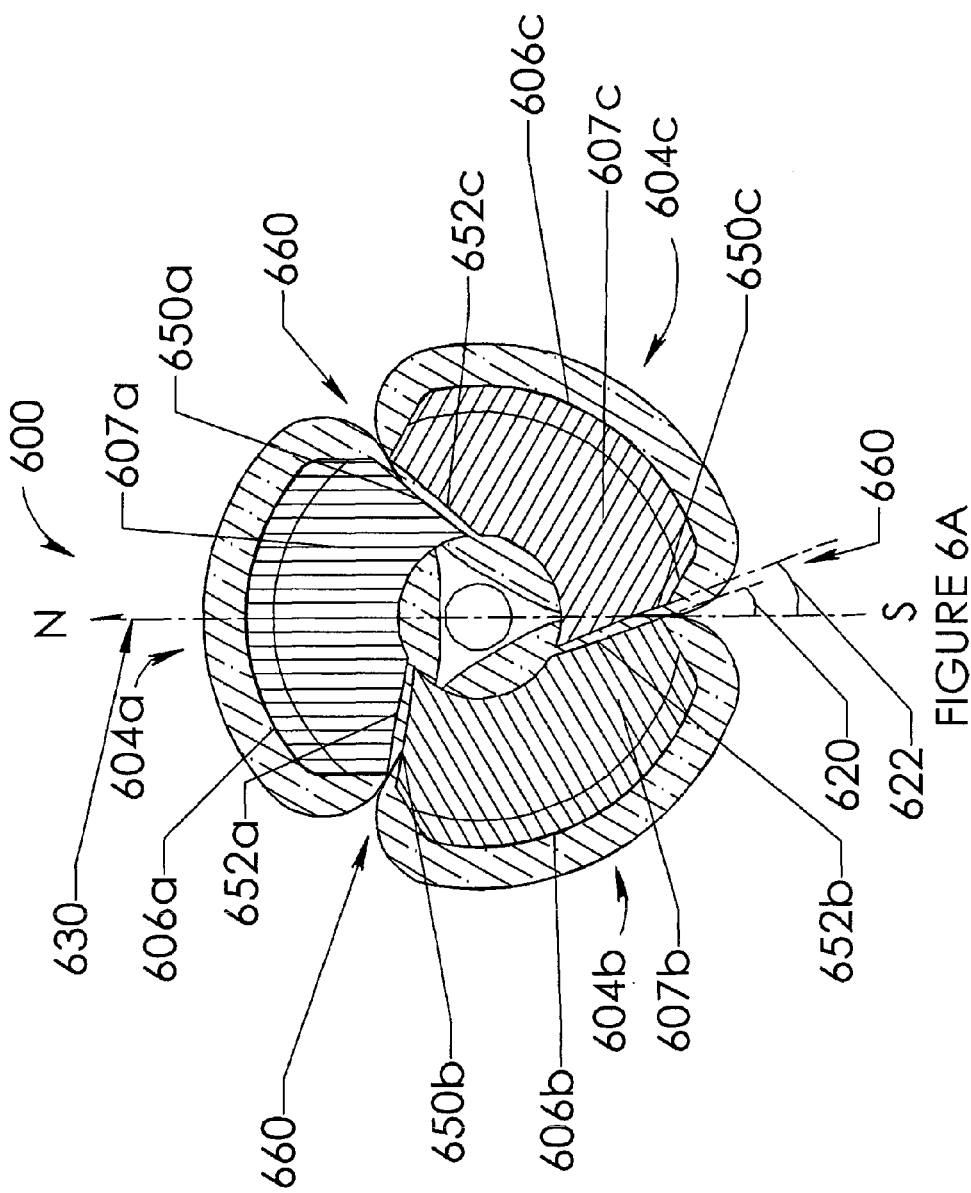
FIGS. 6A and 6B illustrate an end view of another exemplary rotor-stator structure, according to another embodiment of the present invention.
Figure 6B:
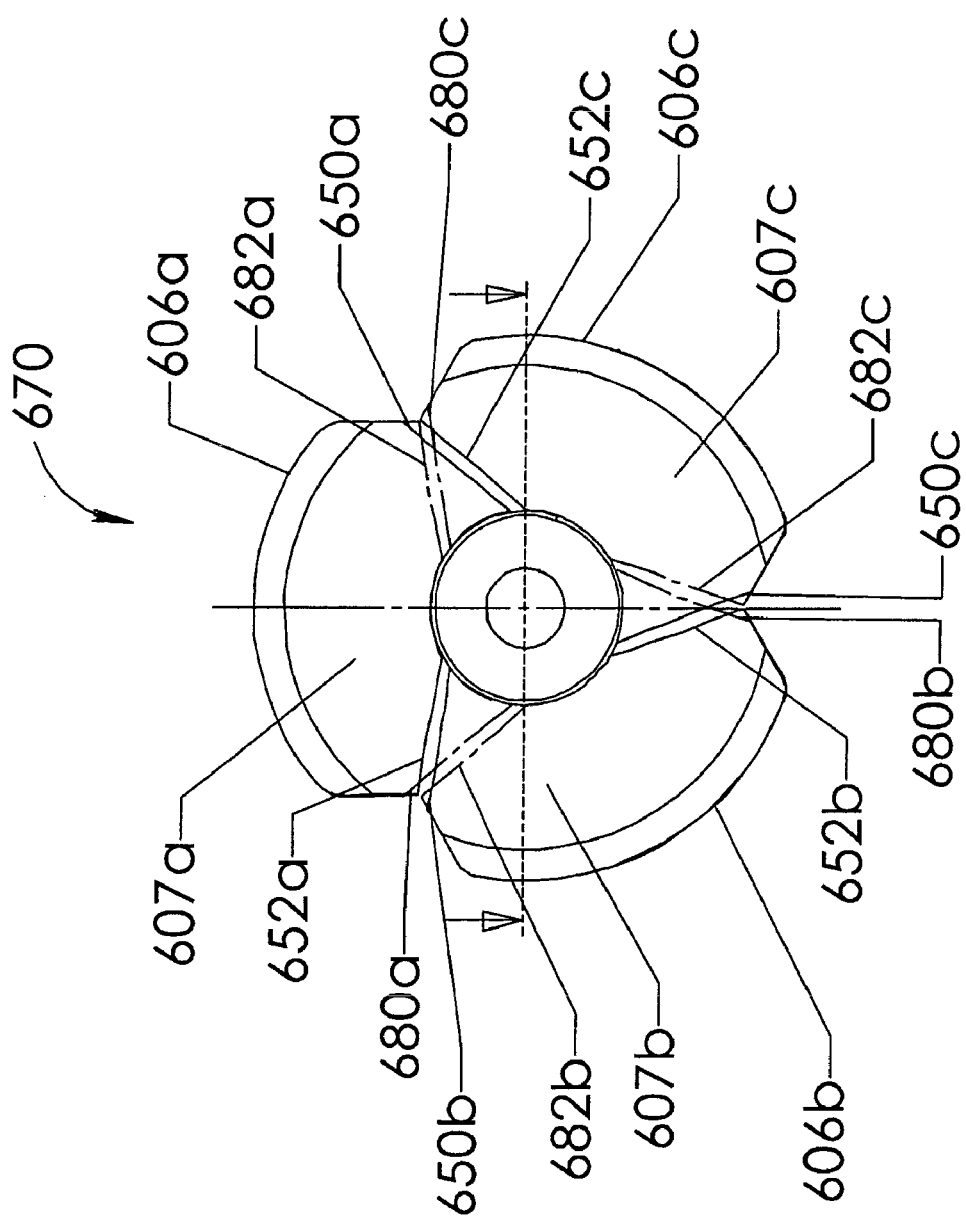
Figure 6C:
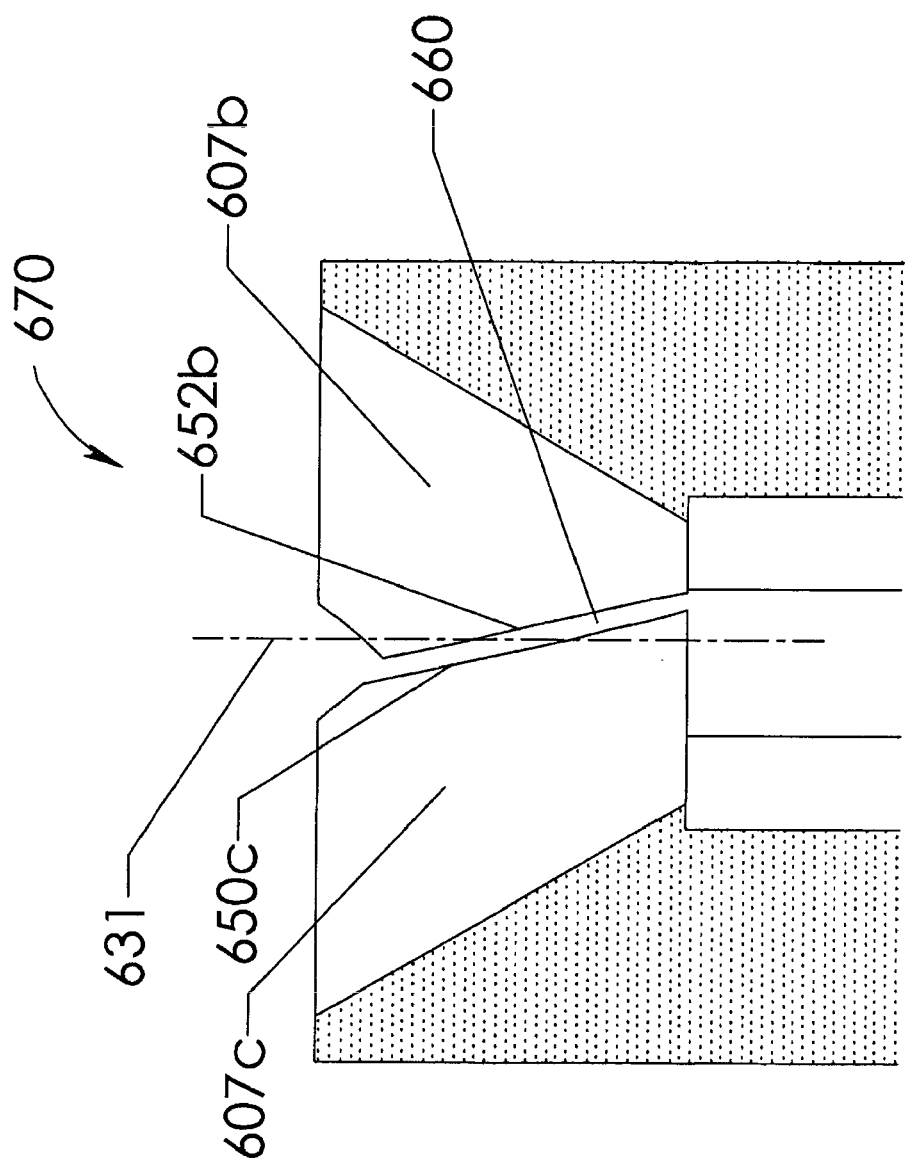
FIG. 6C depicts a partial sectional view of the rotor-stator structure of FIGS. 6A and 6B, according to one embodiment of the present invention.

FIGS. 6A, 6B and 6C illustrate an end view 600 of another exemplary rotor-stator structure, according to another embodiment of the present invention. FIGS. 6A and 6B show end views 600 of a rotor-stator structure while FIG. 6C is a partial sectional view A-A of FIG. 6B. FIG. 6A shows active field pole members 604 each having a skewed pole face 607 at an end of a respective field pole member 606. Each skewed pole face 607 has a contoured surface that generally tracks the surface characteristics of that of a confronting surface portion of an adjacent magnet, such as conical magnet 220a, to form an air gap having, for example, a relatively constant air gap thickness. Air gap thickness generally refers to the orthogonal distance between a point on a pole face and a point on a confronting surface of a magnet. The skewed pole faces 607 are, at least in part, defined by surface edges and/or sides of field pole members 606 that are slightly angled or skewed with respect to the magnetization direction, (e.g., direction of polarization), of an adjacent magnet. Skewed edges and/or sides are shown in FIG. 6A as first skewed edges 650 and second skewed edges 652, both of which are configured as edges of field pole members 606 to form skewed field pole gaps 660 when active field pole members 604 are arranged in a rotor-stator structure. As an example, consider that first skewed edge 650c is configured to form an angle 622 with respect to at least one direction of polarization 630 of a magnet (not shown). Consider further that second skewed edge 652b is configured to form an angle 620 with respect to direction of polarization 630. Angles 620, 622 can be the same angle or can be any other angle that is suitable for forming field pole gaps 660 that are skewed in relation to the directions of polarization of one or more magnets. Note that FIG. 6C is a partial sectional view showing skewed edges being configured so that the plane of magnetic polarization 631 does not align with either of field pole edge 650 or field pole edge 652. In particular, field pole edge 650c and field pole edge 652b both do not align (i.e., are skewed) relative to plane of magnetization 631. In at least one embodiment, field pole edge 650a and field pole edge 652 are each parallel to a first plane that is at an angle with a second plane that includes or is parallel to plane of magnetization 631.

FIG. 6B is an end view 670 showing skewed pole face edges at both ends of field pole members 606. By implementing skewed field pole gaps 660 of FIG. 6A in a rotor-stator structure, detent torque ("cogging") is reduced. In at least one embodiment, skewed field pole gaps 660 are adapted for use with permanent magnets that are diametrically polarized, such as conical magnets 220. In this instance, end view 670 of FIG. 6B is an end view showing pole faces 607 that are configured to have surface contours similar to that of an adjacent conical magnet 220a, pole faces 607 being similar to those shown in FIG. 6A. Also shown in FIG. 6B are first skewed edges 680 and second skewed edges 682, which are associated with pole faces at the other end of field pole members 606 (e.g., at the other pole shoe opposite than that associated with first skewed edges 650 and second skewed edges 652 as indicated by the broken lines). First skewed edges 680 and second skewed edges 682 in this case have angles similar to those of first skewed edges 650 and second skewed edges 652, respectively, but face a magnet surface associated with conical magnet 220b, for example. As such, the angular directions of the field pole gaps formed by edges 650 and 652 are opposite in the angular direction of the field pole gaps formed by edges 680 and 682. Consequently, the diametrically polarized magnets will generally not align with a field pole gap having pole face sides similar to those that form field pole gap "G" between planes 310 and 320 (FIG. 3), which can be a source of cogging torque in an electric motor. Note that distance between edges 650 and 652, as well as between edges 680 and 682, can be configured to be as narrow as necessary to minimize the cogging effects of the field pole gaps. In at least one embodiment, first skewed edges 680 and second skewed edges 682 can have angles similar to those of first skewed edges 650 and second skewed edges 652. But edges 680 and 682 lie in the same respective planes as edges 650 and 652. Advantageously, this helps to balance torque that tends to twist the shaft, and also to balance axial forces that derive from the direction of magnet polarization relative to the skewed edges of field pole members 606.

Figure 7A:
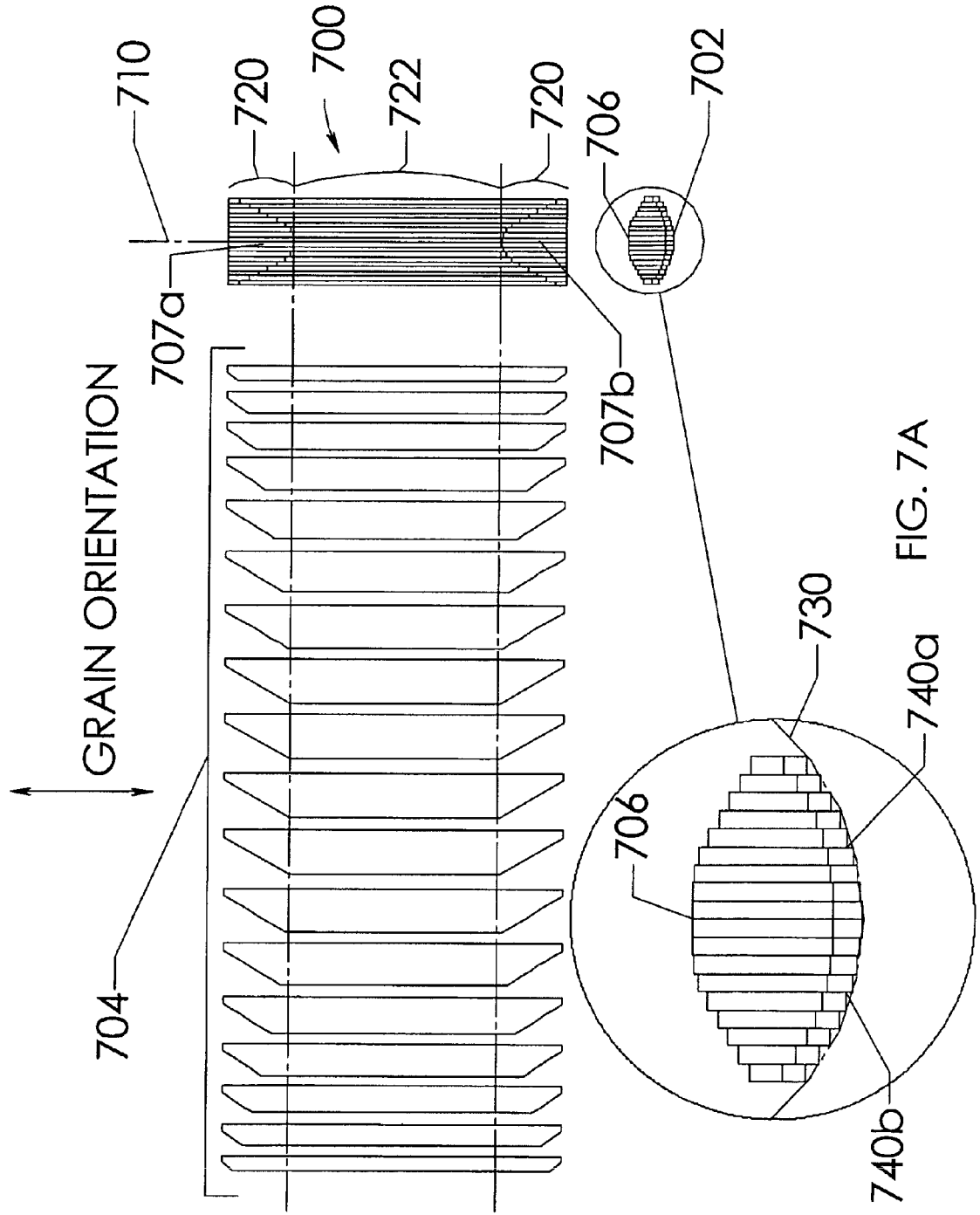
FIGS. 7A to 7E illustrate examples of implementations of field pole members, according to various embodiments of the present invention.
Figure 7B:
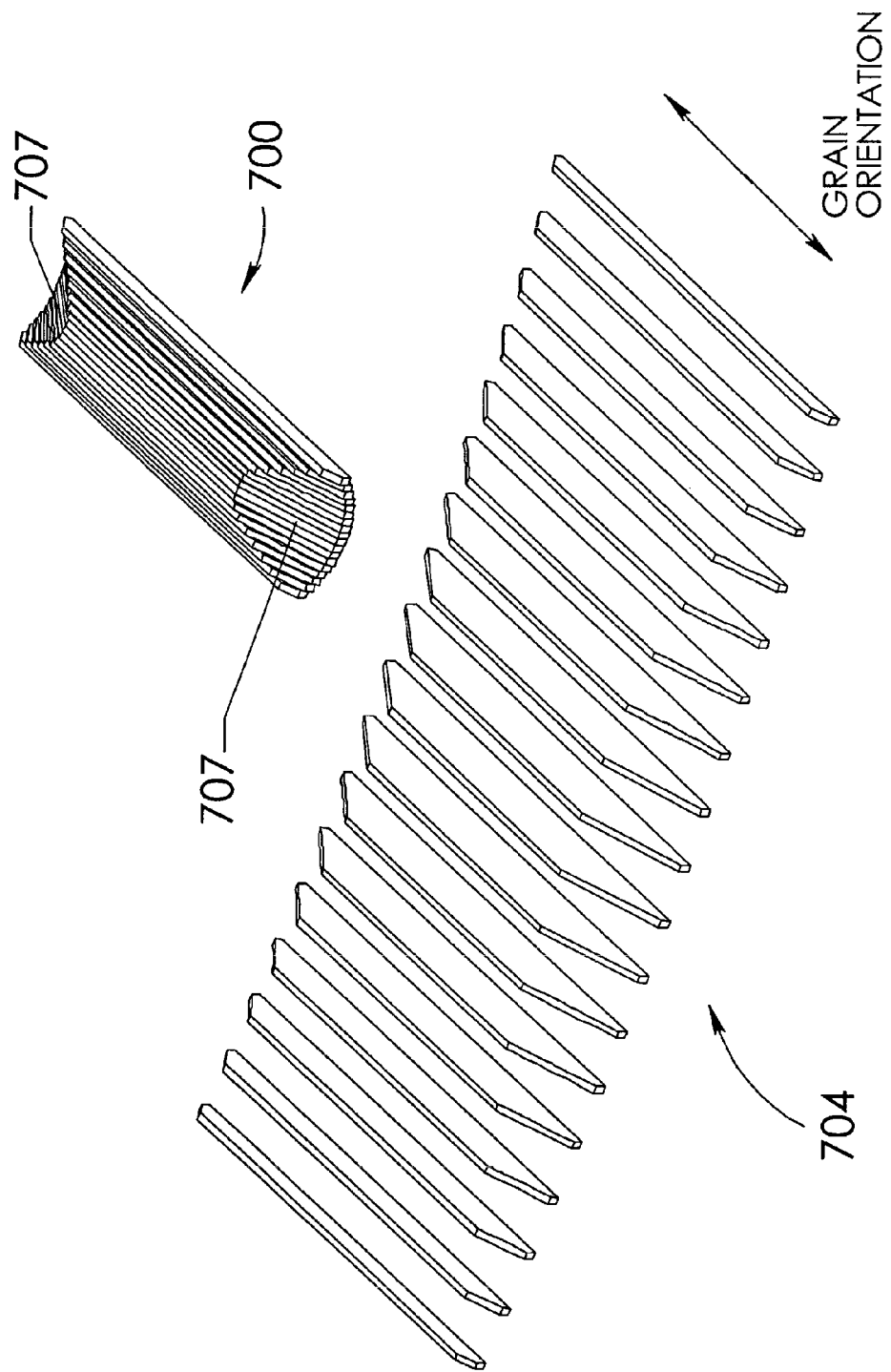

FIGS. 7A and 7B illustrate an exemplary field pole member, according to one embodiment of the present invention. Although each of field pole members 206a, 206b, and 206c can be composed of a single piece of magnetically permeable material (e.g., a piece formed by a metal injection molding process, forging, casting or any other method of manufacture), these field pole members can also be composed of multiple pieces, as is shown in FIGS. 7A and 7B. FIG. 7A depicts one of field pole members 206 as a stacked field pole member 700 composed of a number of laminations 704 integrated together. In this instance, stacked field pole member 700 has an outer surface 702 having a cylindrical outside diameter with an arc and a relatively straight inner surface 706 to increase the coil packing density while still leaving room for the rotating shaft. Field pole member end regions 720 generally include pole faces 707 for interacting with the flux of permanent magnets at each end of field pole member 700, whereas a central portion 722 (i.e., a central field pole member portion) generally includes a core region between pole faces 707, such as coil region 506 (FIG. 5A). A coil (not shown) can be wound more or less about central portion 722. FIG. 7B is a perspective view of stacked field pole member 700 and laminations 704, which can be composed of an anisotropic material. In this example, the anisotropic material includes grain-oriented material.

In at least one embodiment, a field pole member 700 includes a central field pole member portion 722 having an outer peripheral surface, such as outer surface 702. The outer peripheral surface is generally coextensive with a portion of a circle 730 about the axis of rotation, regardless of whether the field pole is composed of laminates. By forming the outer peripheral surface of a field pole member to fit within a circle or an equivalent shape, a more compact rotor-stator structure provides an electrodynamic machine with a smaller volume than if the outer peripheral surface coincided with a portion of a square, for example. As depicted in FIG. 7A, a field pole member 700 includes laminations and a central field pole member portion 722 between a first flux interaction surface (e.g., a pole face 707) and a second flux interaction surface (e.g., the other pole face 707). In this example, outer surface 702 is circumscribed by at least a portion of a circle 730, whereby one or more points (e.g., points 740a and 740b) intersect or touch circle 730. In at least one embodiment, the structure of field pole member 700 can be described in reference to a conceptual median plane, which appears as medial line 710. Medial line 710 extends in an axial direction and divides a quantity of laminations constituting field pole member 700 approximately in half (e.g., includes percentages from 50/50 to 60/40). With respect to one side of medial line 710, the laminations generally decrease in at least one dimension as the laminations are positioned farther from medial line 710. Note that although not required, the laminations can be formed from a substrate composed of a magnetically permeable material in configurations that help reduce wastage of the magnetically permeable material. But again, wastage need not necessarily be a required factor in the design of each embodiment of laminated field pole of the present invention.

Figure 7C:
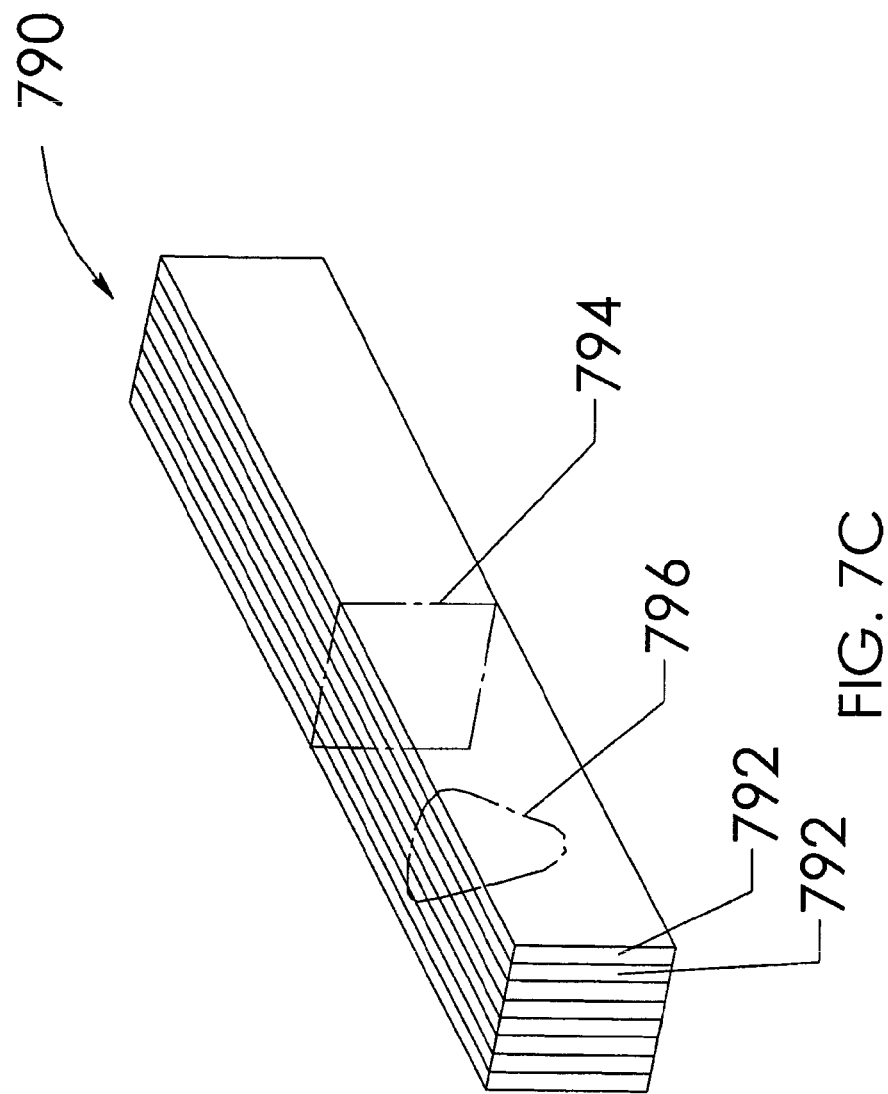

FIG. 7C shows an example of at least a central portion of a field pole member, according to at least one specific embodiment of the present invention. Note that pole shoes having contoured pole faces are omitted so as not to obscure the depiction of cross-sections for at least the central portion of a field pole member. Field pole member 790 is formed from laminations 792 and is configured to have a square-shaped form factor to increase field pole cross-sectional area, which in turn increases an amount of magnetic flux can pass through field pole member 790. For example, square cross-sectional area 794 can carry more magnetic flux than the oval-like shaped cross-sectional area of field pole member 700 of FIG. 7A. FIG. 7C also shows a tear-drop cross-sectional area 796 that can be implemented in at least one embodiment. In particular, tear-drop cross-sectional area 796 lies in a plane having a substantially radial direction. This orientation facilitates the accommodation of field pole members 790 as the quantity of field pole members 790 increases. Tear-drop cross-sectional area 796 can be configured to optimize the ratio of a winding (e.g., copper conductor) to the material (e.g., iron) constituting field pole members 790 within a specific set of magnetic flux requirements and the envelope constraints of the motor.

Note also that various winding patterns can be implemented in any of the field poles in FIGS. 7A to 7C to enhance performance. For example, a cantered or full-coverage winding can cover substantially all of the sides and/or the back of field pole member 700, at both ends of the structure, to reduce the flux that might leak from one field pole member to another. As such, the wire of a coil need not be wound in planes generally perpendicular to the long axis of the field pole member, but at an oblique angle. With coils being placed close to the magnetic air gap, those coils can be more effective in reducing flux leakage, for example, in pole shoe regions. Note that the above-described winding patterns are applicable to any of the field pole members described herein.

Figure 7D:
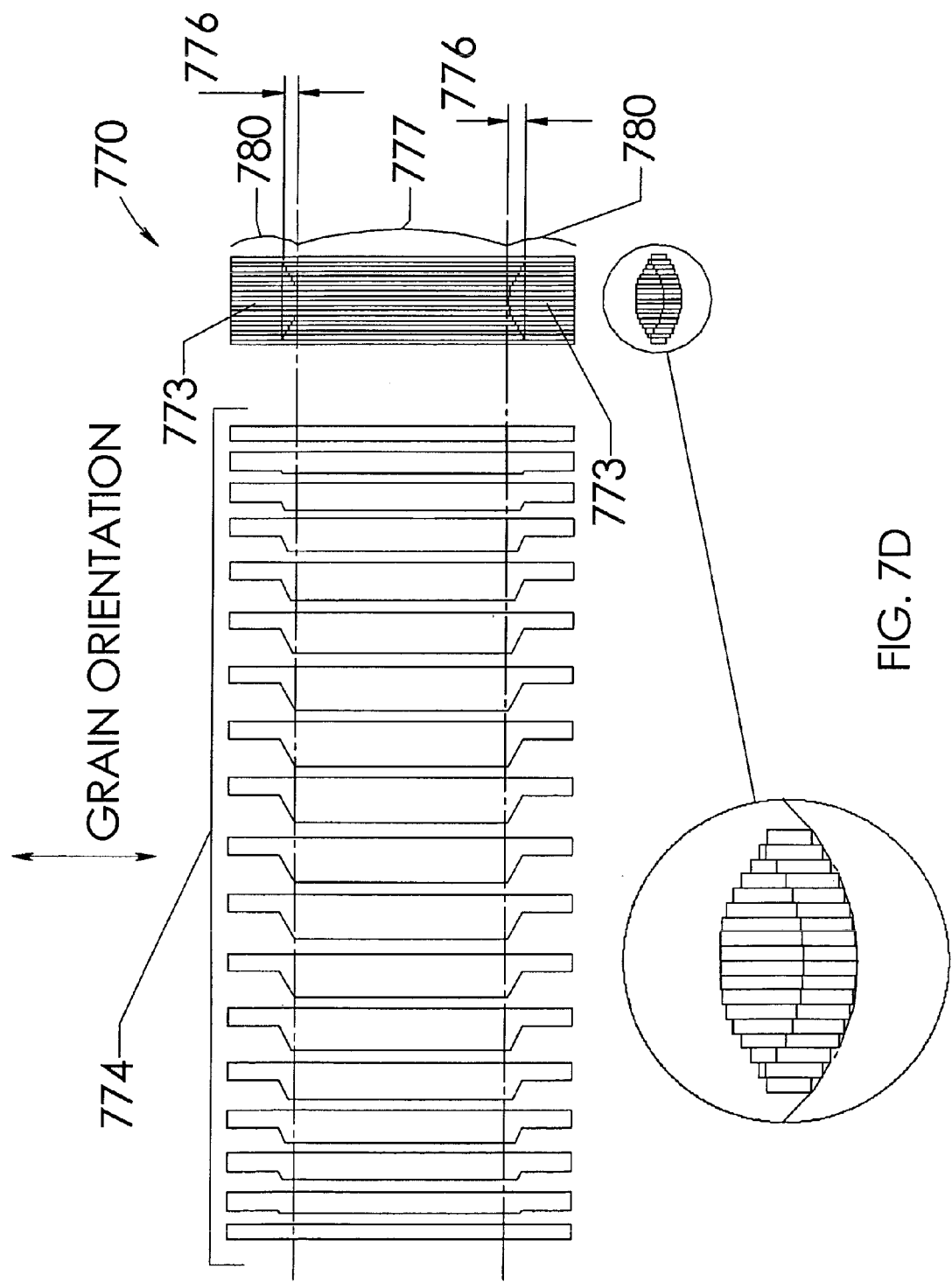
Figure 7E:
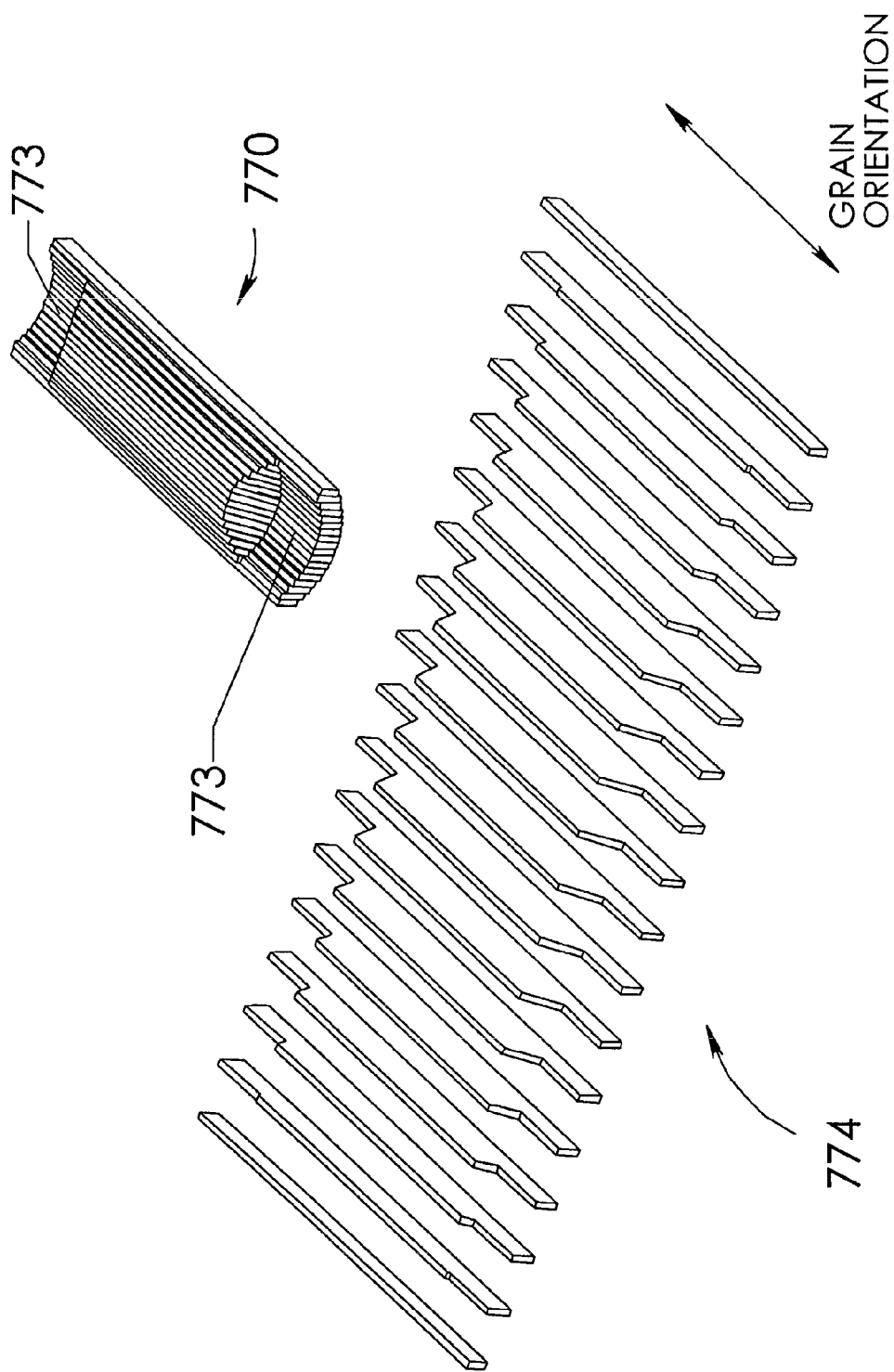

FIGS. 7D and 7E illustrate another exemplary field pole member, according to another embodiment of the present invention. Although similar to FIG. 7A, FIG. 7D depicts one of field pole members 586a and 586b (FIG. 5F) as a stacked field pole member 770. As shown, field pole member 770 is composed of a number of laminations 774 integrated together. Field pole member end regions 780 generally include pole faces 773 for interacting with the flux of permanent magnets at each end of field pole member 770, whereas a central portion 777 (i.e., a central field pole member portion) generally includes a core region between pole faces of field pole members 586a (FIG. 5E). At ends 780, which can be synonymous with pole shoes in some embodiments, field pole member 770 includes transition regions 776. These transitions regions are described below in more detail. FIG. 7E is a perspective view of stacked field pole member 770 and laminations 774, which can be composed of an anisotropic material. In this example, the anisotropic material includes grain-oriented material.

Figure 8:
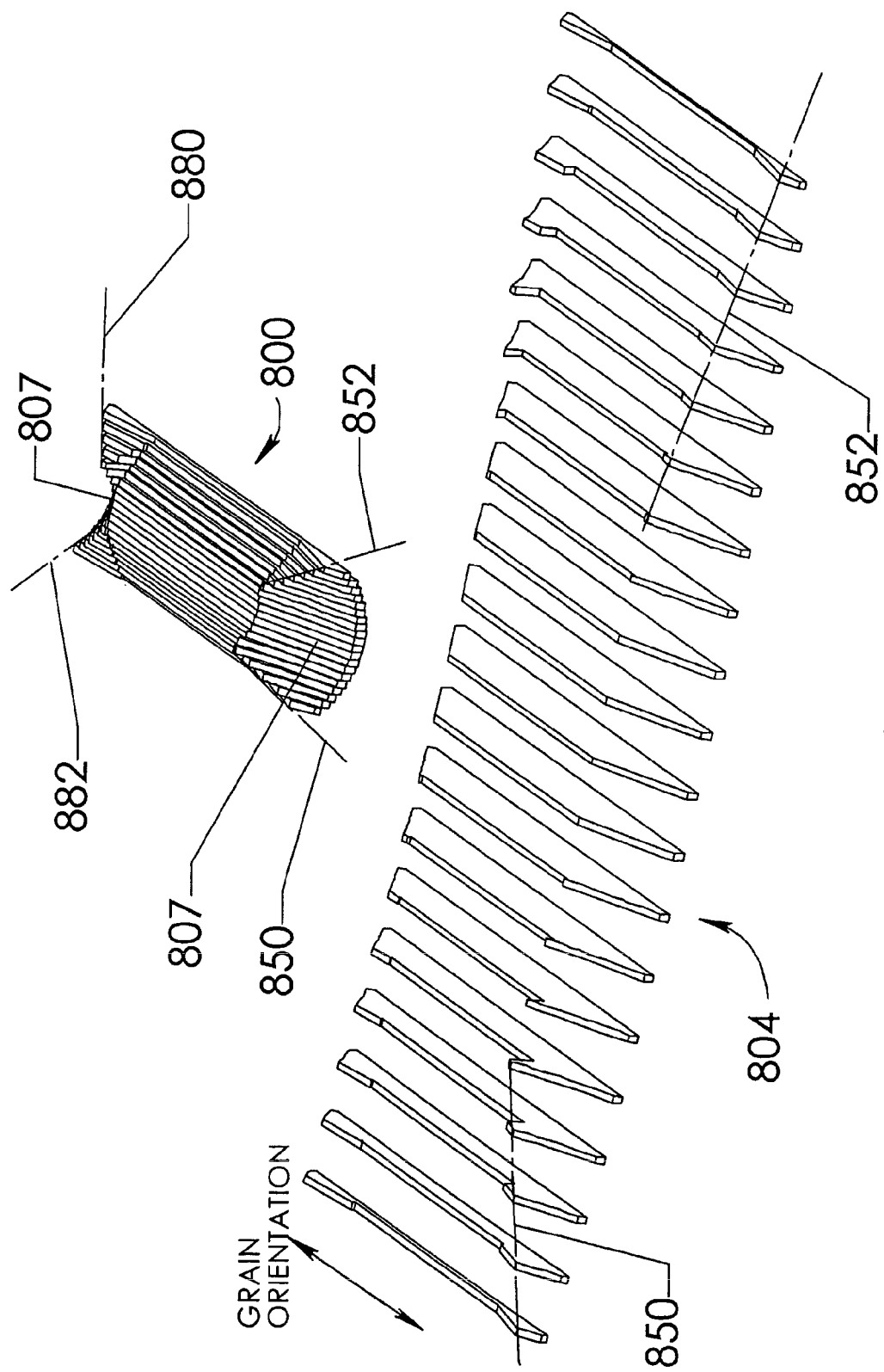
FIG. 8 illustrates another exemplary field pole member having skewed pole faces, according to a specific embodiment of the present invention.

FIG. 8 illustrates another exemplary field pole member having skewed pole faces, according to a specific embodiment of the present invention. As shown, stacked field pole member 800 is constructed from a number of laminations 804, similar to stacked field pole member 700. Laminations 804 are patterned to provide skewed pole faces 807. Pole face 807 is bound by both a first skewed edge 850 and a second skewed edge 852, whereas the other pole face 807 at the other pole shoe is bound by a first skewed edge 880 and a second skewed edge 882. Note that edges 850, 852, 880 and 882 can respectively correspond to edges 650, 652, 680, and 682 of FIG. 6B. Also note that edges 850 and 882 can be formed to lie in the same planes as edges 880 and 852, respectively, to balance torque that might twist the shaft and also to balance axial forces that derive from the direction of magnet polarization relative to the skewed edges of field pole members 800. In some cases, laminations 804 (as well as laminations 704) advantageously can be formed (e.g., stamped out) in a series of either similarly or differently patterned shapes from a single substrate (e.g., a sheet of metal or the like) or from different substrates in a manner that minimizes waste during manufacturing. A substrate can either be a single sheet or an elongated strip of material that, for example, can be rolled from a spool. Note that the manufacture of laminations 704 (FIG. 7B) and 804 (FIG. 8), for example, does not waste materials typically jettisoned to create circular holes in circular stator structures.

In some embodiments, laminations 704 and 804 can be assembled from laminated anisotropic (e.g., grain-oriented) sheet stock with the direction of magnetic orientation being oriented longitudinally, such as parallel to an axis of rotation. This is so that flux can be easily conducted axially from one end of the motor to the other. The laminations can be electrically insulated from each other, which can reduce eddy current losses. In one embodiment, laminations 704 and 804 are composed of grain-oriented steel and provide various field pole members with high permeability, low loss and/or high saturation levels in a relatively low cost material. One type of anisotropic material suitable for implementing laminations 704 and 804 is cold-rolled-grain-oriented steel, or "CRGO lamination steel." To illustrate the advantages of using grain-oriented lamination in accordance with at least one embodiment, cold rolled grain oriented steel, such as grade M6 lamination (as designated by AISI) having a thickness of 0.014 inches, can have a typical permeability of 50,000 while subjected to an applied field of 10,000 Gauss. By contrast, an isotropic laminate steel (e.g., "M19" laminates of 0.0185 inches thick) can have a typical permeability of about 3700, under similar conditions. Note that permeability, as described above, is in terms of direct current ("DC") permeability. Field pole members can be made from many different magnetically permeable materials, such as silicon iron alloys, steel alloys, iron alloys, nickel iron alloys, cobalt nickel alloys, magnetic powdered alloys, soft magnetic composites, and the like, according to various embodiments of the present invention. Soft magnetic composite materials, which are also known as "SMC materials," are composed of compacted, electrically insulated particles that are also magnetically permeable. As such, SMC materials exhibit relatively low eddy current losses when compared to traditional SiFe lamination materials at relatively high frequencies. Another significant advantage of SMC materials is its ability to be formed in three dimensions through use of properly designed compaction molds and dies.

Figure 9A:
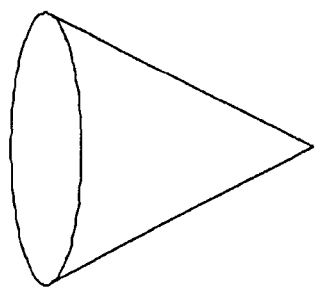
FIGS. 9A to 9P illustrate examples of other-shaped permanent magnets that can be implemented in an exemplary rotor-stator structure, according to various embodiments of the present invention.
Figure 9B:
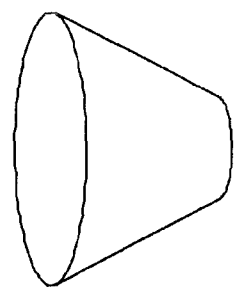
Figure 9C:
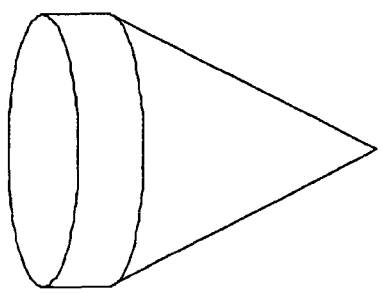
Figure 9D:
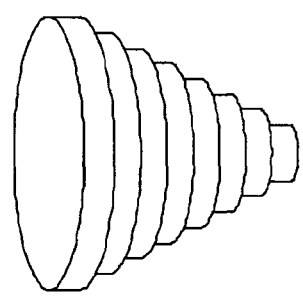
Figure 9E:
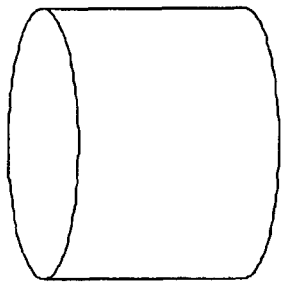
Figure 9F:
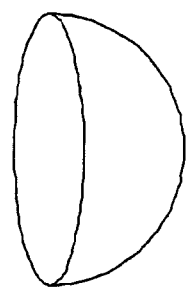
Figure 9G:
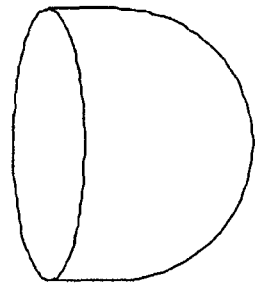
Figure 9H:
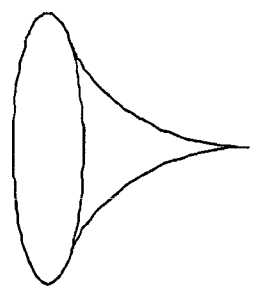
Figure 9I:
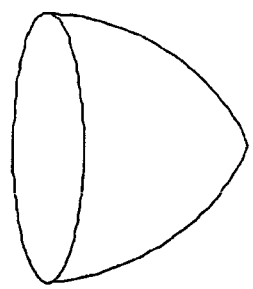
Figure 9J:
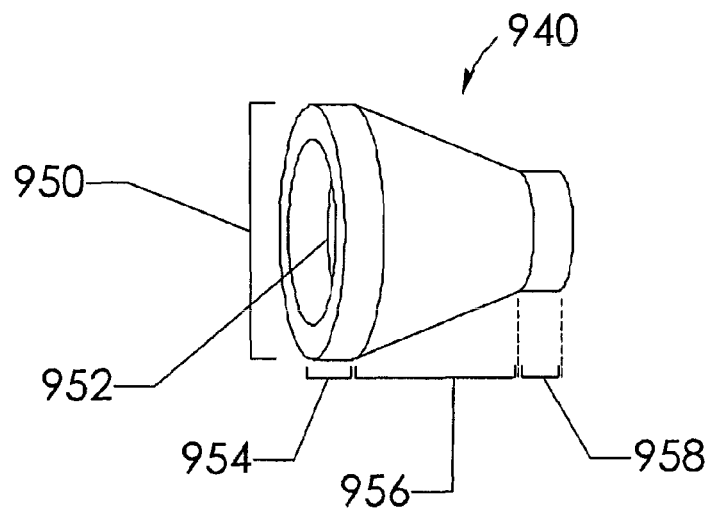
Figure 9K:
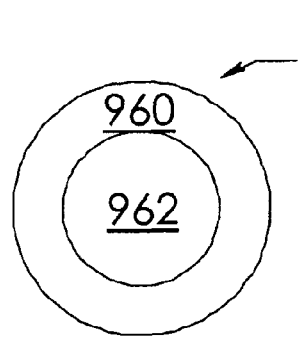
Figure 9L:
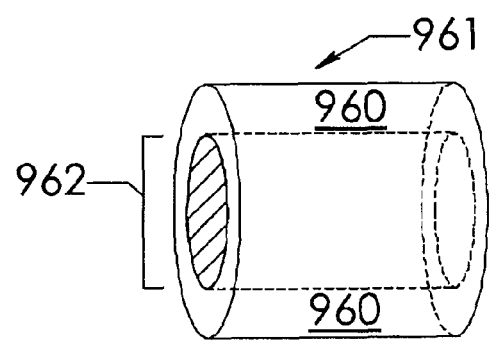
Figure 9M:
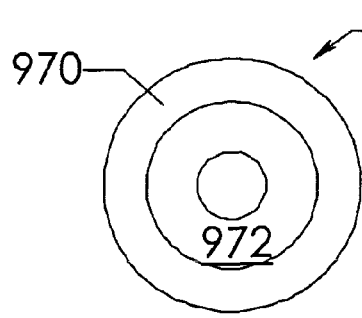
Figure 9N:
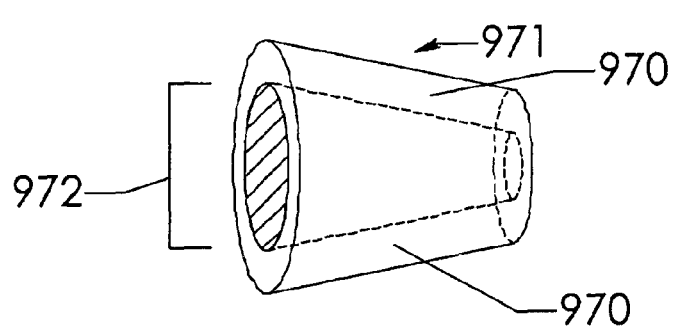
Figure 9O:
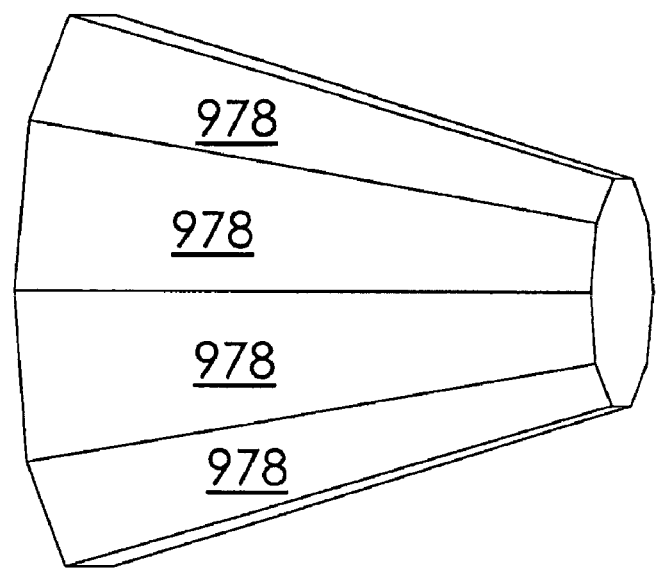
Figure 9P:
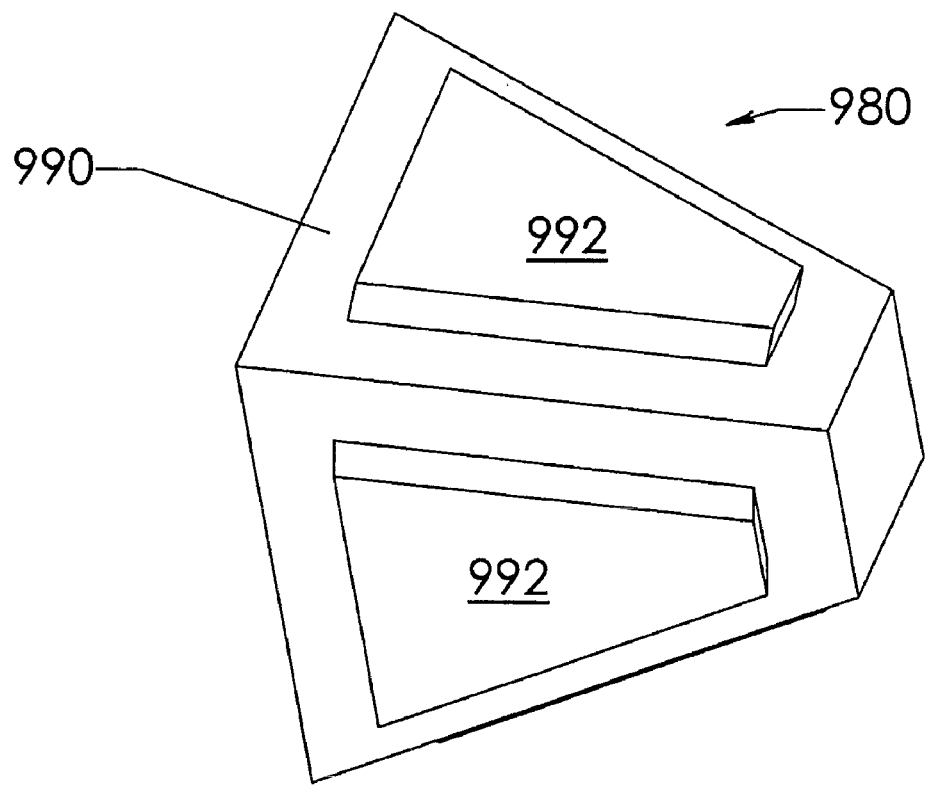

FIGS. 9A to 9P illustrate examples of other-shaped permanent magnets that can be implemented in a rotor-stator structure, according to various embodiments of the present invention. Although the magnets shown in FIG. 2B are conical in shape, the term "conical" is intended to be construed broadly to include one or more shapes that form one or more surfaces, or portions thereof, that when coaxially mounted on a shaft, are at an angle to the shaft such that at least one surface, when extended, would intersect an axis of rotation. So, the term "conical magnet" is meant to cover any configuration of magnet that has at least a portion of a surface that is conical or tapered toward a point coaxial with, or on, an axis of rotation. For example, at least one type of conical magnet has one or more surfaces whereby the cross-sections of the magnet at each of those surfaces generally (or on average) either increase or decrease progressively along the axial length of the magnet. In at least one specific embodiment, a relevant dimension for describing a portion of conical magnet surface is a surface boundary, such as a contoured surface area that can be oriented in space with respect to a line. Note that FIGS. 9E, 9K and 9L depict cylindrically-shaped magnets that do not include at least a portion of a confronting surface (i.e., a surface configured to confront a pole face) that is other than cylindrical. As such, these types of shapes are generally not considered within the definition of what is deemed a conical magnet.

FIG. 9A shows a full cone-shaped magnet as an example of a conical magnet, whereas FIG. 9B depicts a conical magnet being a truncated cone magnet described as a "frustum of a right circular cone," which is a frustum created by slicing the top off a right circular cone (e.g., the slice forming an upper base parallel to the lower base, or outer surface, of the right circular conical magnet). Note that other cone angles other than that shown in FIG. 9A are within the scope of the present invention. FIG. 9C shows that a conical magnet can include cylindrical portions added to the large diameter end (or, in some cases, to the small diameter end, such as shown in FIG. 9J) to optimize magnetic flux in the circuit. FIG. 9D illustrates a conical magnet being of a "stepped" or graduated form. FIGS. 9F and 9G show examples of alternative shapes suitable for implementing a magnet in accordance with embodiments of the present invention, where a conical magnet can be a hemispherically-shaped magnet. FIGS. 9H and 9I are general representations showing that conical magnets of various embodiments can have any type of concave surface and/or any type of convex surface, respectively.

FIG. 9J shows an exemplary conical magnet in accordance with one embodiment of the present invention. Here, conical magnet 940 includes an outer surface 950 in which a cavity 952 is formed. Cavity 952 is optional and can be used to house hearings or the like. In some embodiments, cavity 952 extends inside one or more of surfaces 954, 956 and 958. Note that cavity 952 can have differing inside dimensions along its axial length. Conical magnet 940 includes three surfaces: a first cylindrical surface 954, a conical surface 956 and a second cylindrical surface 958. In various embodiments, conical magnet 940 can include: fewer or more surfaces, cylindrical surfaces having larger or small diameters, steeper or shallower angles of inclination for conical surface 956, etc.

FIGS. 9K and 9L show an end view and a side view, respectively, of an exemplary cylindrical magnet, according to one embodiment of the present invention. Cylindrical magnet 961 is composed of two cylindrical magnets 960 and 962. In this example, cylindrical magnet 962 is disposed (e.g., inserted) within cylindrical magnet 960. In one embodiment, cylindrical magnet 962 is composed of NdFe magnetic material (or a variant thereof) and cylindrical magnet 960 is composed of a ceramic magnetic material. In some embodiments, cylindrical magnet 962 is absent, thereby forming a ring magnet composed of cylindrical magnet 960 (mounting fixtures not shown). In at least one specific embodiment, cylindrical magnet 962 can be composed of a magnetically permeable material rather than a magnet material. In one embodiment, cylindrical magnet 962 need not extend through cylindrical magnet 960, but rather can extend from one end to any axial length within cylindrical magnet 960. FIGS. 9M and 9N show an end view and a side view, respectively, of an exemplary conical magnet, according to one embodiment of the present invention. Conical magnet 971 is composed of two conical magnets 970 and 972. In this example, conical magnet 972 is disposed (e.g., inserted) within conical magnet 970. In one embodiment, conical magnet 970 is composed of NdFe magnetic material (or a variant thereof) and conical magnet 972 is composed of a ceramic magnetic material. In some embodiments conical magnet 972 can be composed of a magnetically permeable material instead of magnet material. In some embodiments, conical magnet 972 is absent, thereby forming a hollowed conical magnet composed of conical magnet 970 (mounting fixtures not shown). In one embodiment, conical magnet 972 need not extend through conical magnet 970, but rather can extend from one end to any axial length within conical magnet 970.

FIGS. 9O and 9P illustrate yet other conical magnets in accordance with yet other embodiments of the present invention. FIG. 9O illustrates a pyramidal-shaped magnet as a conical magnet, albeit truncated, formed with any number of truncated triangular surfaces 978. FIG. 9P illustrates a conical magnet 980 of at least one embodiment, where conical magnet 980 includes a truncated pyramidal magnet 990 including magnetic regions 992 formed either therein or thereon. Magnetic regions 992 include magnet material that is different from that of truncated pyramidal magnet 990. Each of those magnetic regions 992 can be selected to have any predetermined polarity. In one embodiment, truncated pyramidal magnet 990 is four-sided and is composed of a ceramic material (e.g., magnet material), and each magnetic region 992 (two of which are hidden from view) is composed of NdFe magnet material that is formed upon truncated pyramidal magnet 990. In other embodiments, pyramidal magnet 990 can have any number of sides. In various embodiments, pyramidal magnet 990 is a magnet support and need not be composed of a magnet material, but rather can be composed of magnetically permeable material. In some embodiments, a magnet support 990 can be formed as having any shape as those shown in FIGS. 9A to 9I, with any number of magnetic regions 992 being disposed on magnet support 990. In that case, magnetic regions 992 can be of any shape suitable to be disposed on specific shapes of magnet support 990. For example, while the FIGS. 9O and 9P depict conical magnets, the magnet in FIG. 9O can be cylindrical in nature (i.e., with numerous flat surfaces 978 constituting the cylindrical magnet surface, with the end views appearing like a hexagon or some other polygon). As another example, the magnet in FIG. 9P can include a cylindrically-shaped magnet support 990 rather than pyramidal-like shape. Again, other than FIGS. 9E, 9K and 9L, the conical magnets that are illustrated in the foregoing are merely examples of conical magnets of the present invention.

In a specific embodiment of the present invention, conical magnets are anisotropic, diametrically magnetized, and shaped as a truncated cone with about 30 degrees of cone angle relative to an axis of rotation. The conical and cylindrical magnets, according to some embodiments, are diametrically magnetized in directions that are generally in a plane that is substantially perpendicular to the axis. At least one advantage of these types of magnet configurations is that such diametric conical magnets can be magnetized in the same direction as the original magnetic orientation of the magnet material, which provides a higher energy product for the magnet (i.e., a more powerful magnet). Anisotropic magnets are also relatively easy to manufacture and have relatively high magnetic efficiency per unit magnet volume. Another advantage of a diametric (i.e., 2 pole) magnet is that in a motor having three active field pole members and three phases, there is only one electrical revolution for each mechanical revolution of the motor. Accordingly, the diametric magnet, in whole or in part, reduces eddy current losses, hysteresis ("core" or "iron") losses and electrical switching losses in a motor drive circuit. In some embodiments, a conical magnet can: (1) include a steel core instead of being solid magnet material, (2) be constructed from ring magnets exhibiting good coercivity, (3) be constructed from arc-segment magnets, (4) be molded directly onto the shaft, (5) be radially polarized, (6) include a hollow core instead of being solid magnet material, or can include any other similar characteristics.

FIG. 10 shows a multiple pole magnet, according to one embodiment of the present invention. In this example, permanent magnet 1000 is a four-pole magnet being magnetically oriented to have arcuate magnetic paths 1010 from south poles ("S") to north poles ("N"). Other numbers of poles and magnet orientations are within the scope and spirit of the present invention. Further, a multiple pole magnet, such as permanent magnet 1000, can be either a monolithic magnet or a non-monolithic magnet according to some embodiments. As used herein, the term "monolithic," as applied to a permanent magnet, suggests that the permanent magnet is composed of integrated magnetic poles, such that the permanent magnet is non-discrete and is substantially homogenous in structure. As such, a monolithic permanent magnet lacks any physical interfaces between the magnetic poles. A monolithic magnet therefore is composed of continuous magnet material. By contrast, permanent magnet 1000 can be a non-monolithic magnet composed of separate magnets, with each separate magnet contributing an outward facing north or south pole, whereby physical interfaces exist between the separate subcomponents. As such, a non-monolithic magnet therefore can be composed of contiguous, but noncontinuous magnet material. In particular, each separate subcomponent includes continuous magnet material, but the physical interfaces give rise to discontinuities in the magnet material that constitutes the magnet as a whole. Note that the term "monolithic" can also apply to field pole members and other elements of the various rotor-stator structures of the present invention. Note that in at least one embodiment, non-monolithic magnets can include those magnets where separate subcomponents are arranged at a distance from each other such that they do not contact each other.

Figure 11A:
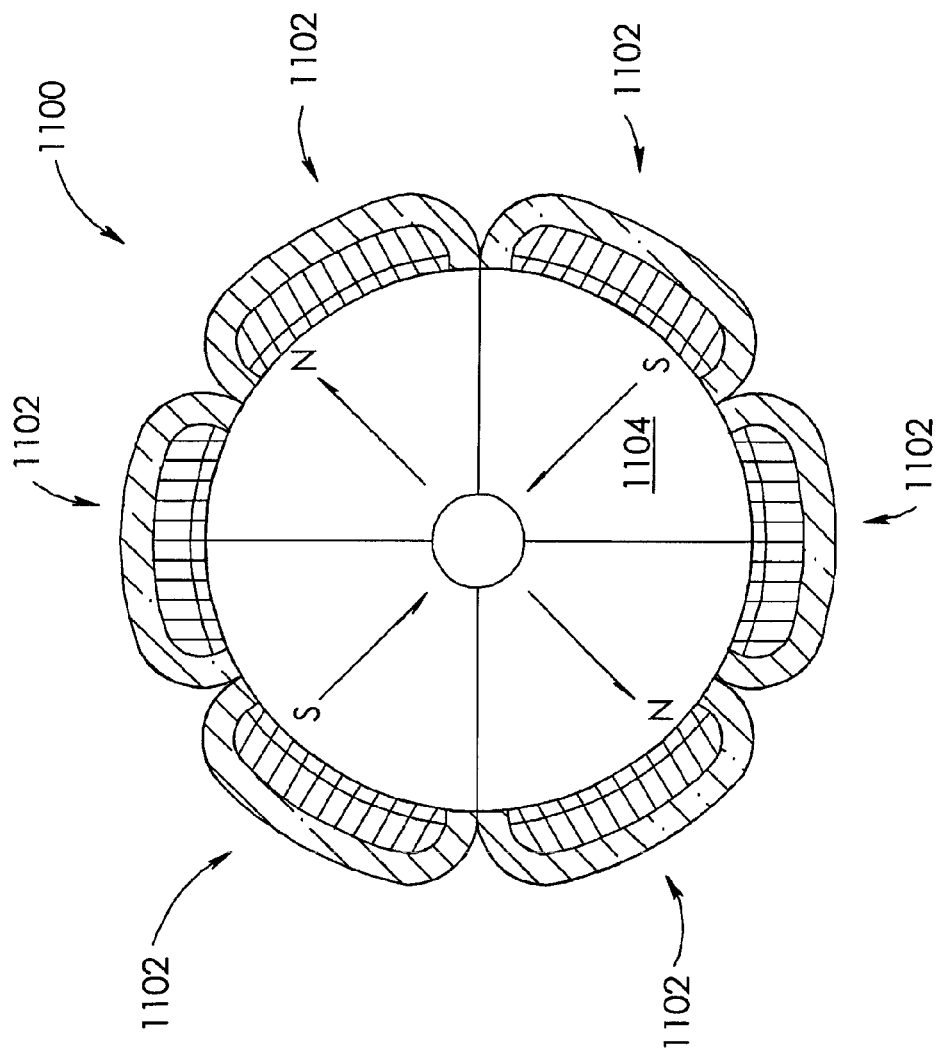
FIGS. 11A to 11C depict other examples rotor-stator structures in accordance with various embodiments of the present invention.

FIG. 11A shows a side view of a rotor-stator structure 1100 as an alternate embodiment of the present invention. Generally, a quantity of three active field pole members efficiently uses a cylindrical volume or space that is typically available inside the motor or generator. As such, "three" active field pole members are generally used to provide a relatively high packing density. But to provide more balanced operation, more than three active field pole members can be used. As shown, six active field pole members 1102 are arranged coaxially to and positioned equidistantly about an axis of rotation. Also, a four-pole magnet 1104 is positioned adjacent to the pole faces of active field pole members 1102. In this instance, four-pole magnet 1104 is a composite of individual magnet arc-segments. Rotor-stator structure 1100 can provide more balance magnetically relative to rotor-stator structures that include three active field pole members, because coils of opposing active field pole members 1102 can generally be excited at the same time. Other numbers of active field pole members and other even numbers of magnet poles can suitably be combined to implement rotor-stator structures of the present invention.

Figure 11B:
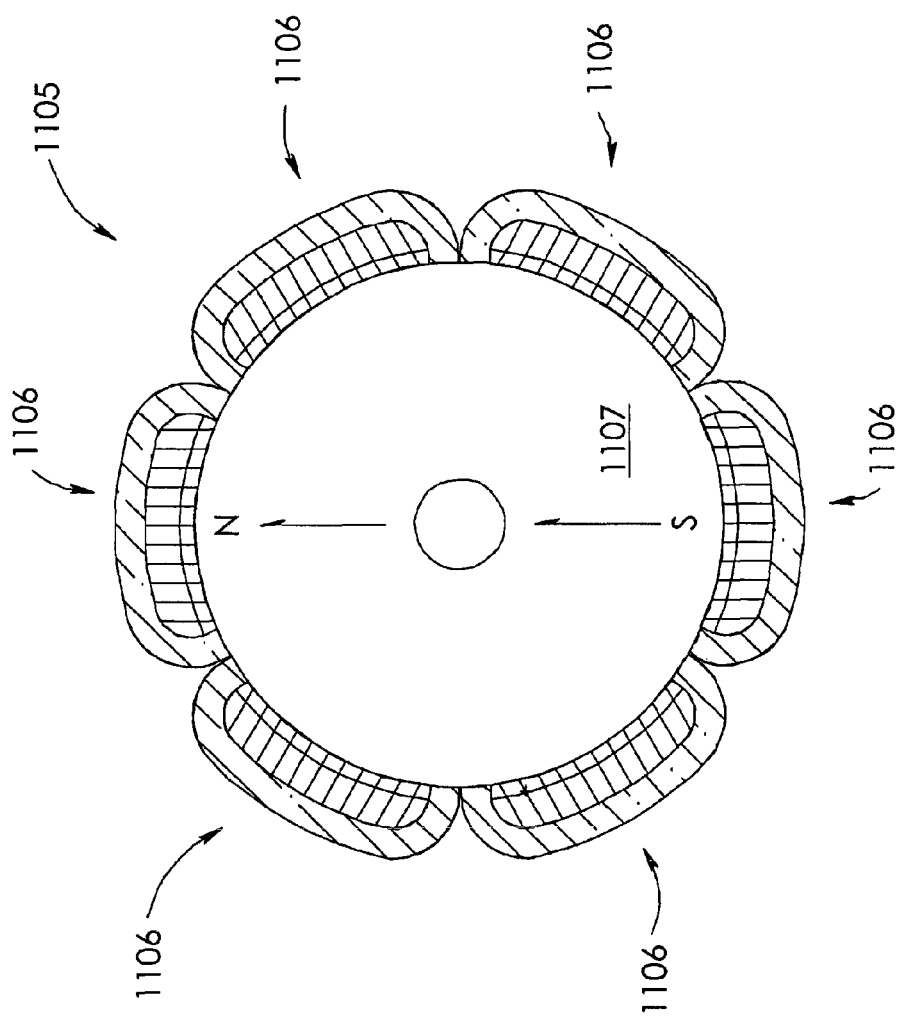
Figure 11C:
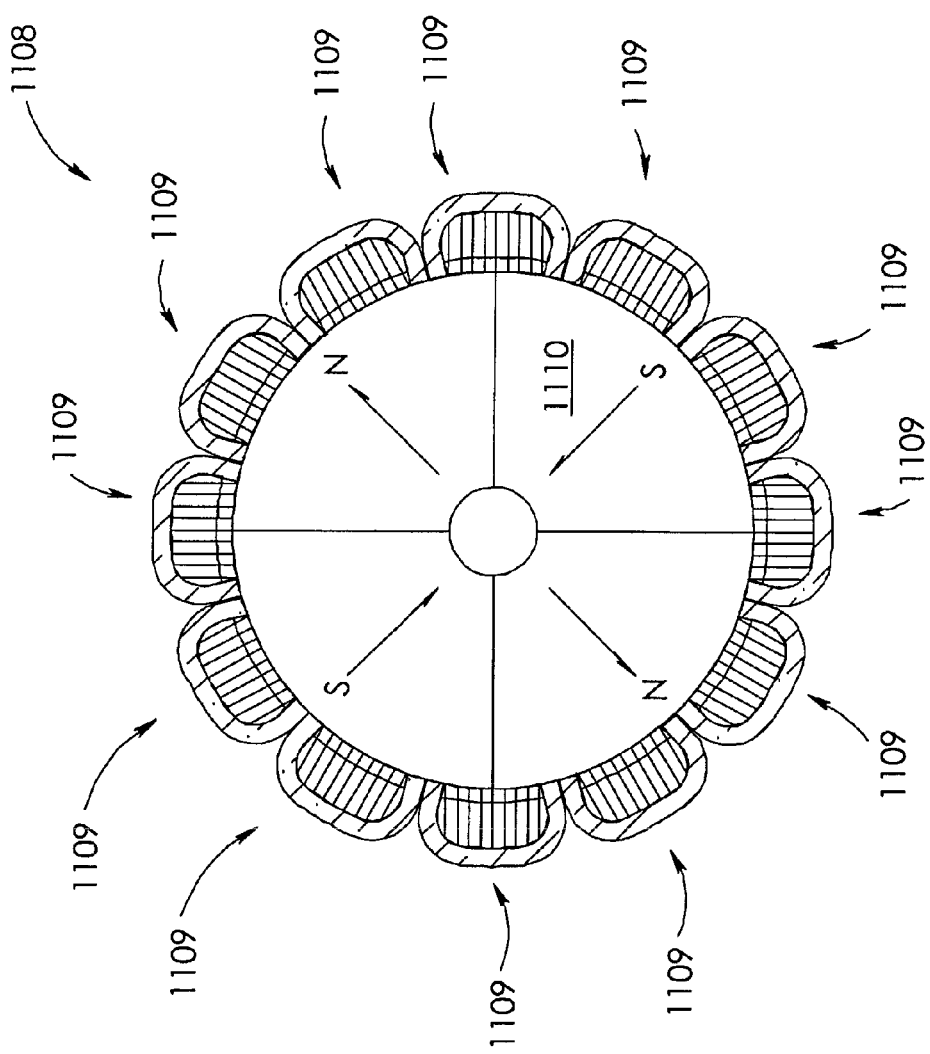

FIGS. 11B to 11C illustrate a subset of the variations in the number of field pole members and/or magnet poles, according to various embodiments of the present invention. FIG. 11B shows a side view of a rotor-stator structure 1105 having six field pole members 1106 and a two-pole magnet 1107, according to one embodiment of the invention. FIG. 11C depicts a side view of a rotor-stator structure 1108 that includes twelve field pole members 1109 and a four-pole magnet 1110, according to another embodiment of the present invention. Again, rotor-stator structures 1100, 1105 and 1108 depict only a few of the many field pole member-magnet pole combinations in accordance with various embodiments of the present invention.

In at least one specific embodiment of the present invention, an exemplary rotor-stator structure is disposed in an electrical motor to generate a torque amplitude that depends on at least one or more of the following: the volume of the magnets, the vector directions of the interacting fields in the flux interaction regions, the flux density in flux interaction regions, the area of the air gaps, and the area of the pole faces. So, the higher the flux density produced by the permanent magnets and the higher the flux density produced by the active field pole members, the higher the torque that will be developed until significant saturation is reached in the field pole members. The magnet materials of such a rotor-stator structure should have sufficient coercivity to prevent partial or total demagnetization in an intended application.

Figure 12A:
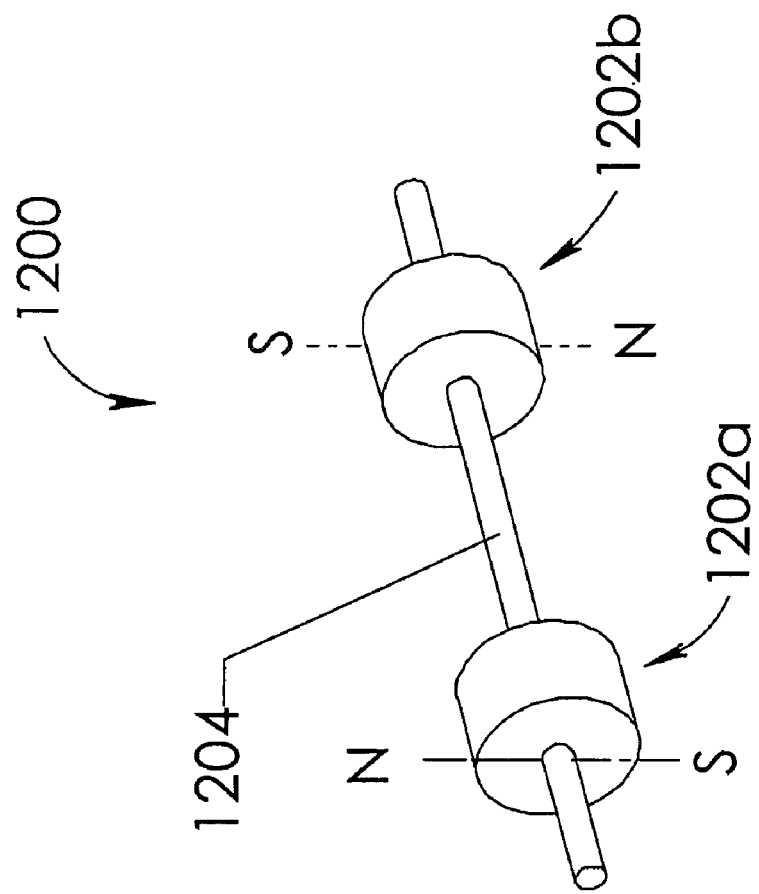
FIGS. 12A to 12D illustrate another rotor-stator structure that implements cylindrical magnets in accordance with various embodiments of the present invention.
Figure 12B:
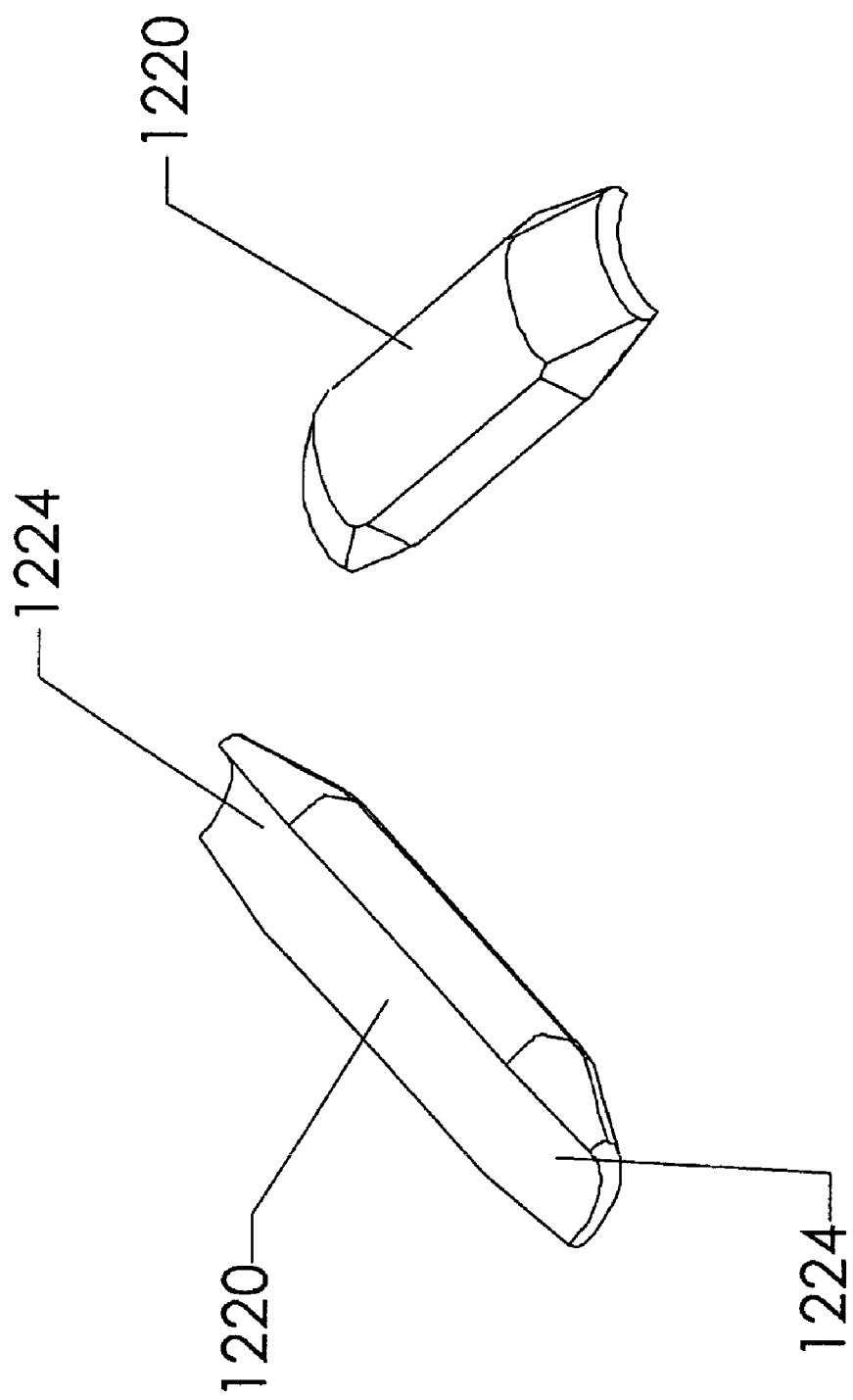
Figure 12C:
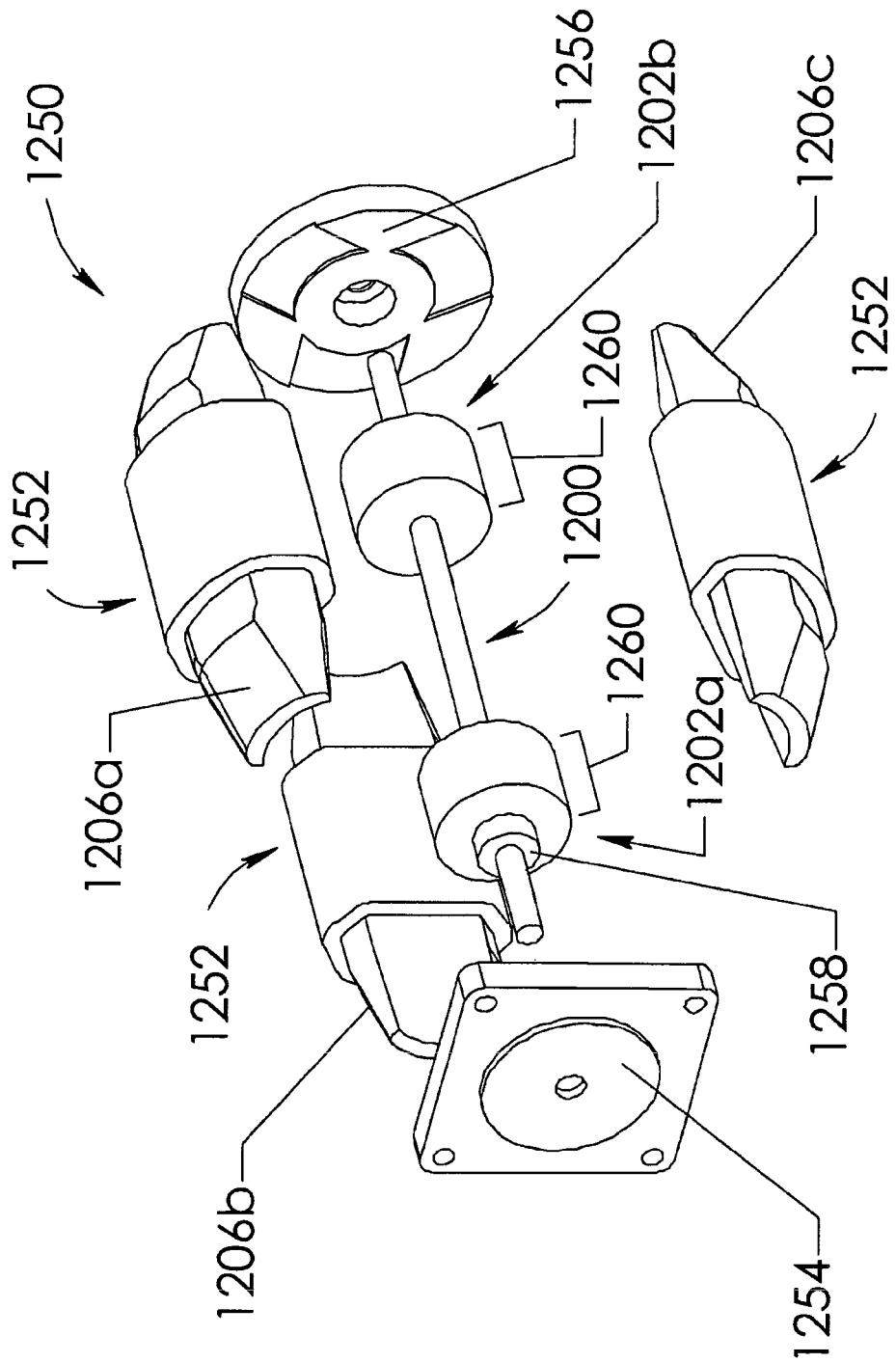

FIGS. 12A to 12D illustrate another rotor-stator structure in accordance with the present invention. FIG. 12A depicts a rotor assembly 1200 including at least two cylindrical permanent magnets 1202a and 1202b mounted on or affixed to a shaft 1204. As shown, cylindrical magnets 1202a and 1202b are diametrically magnetized and positioned to have their north poles ("N") pointing in substantially opposite directions. FIG. 12B shows two views of a field pole member 1220 including two pole faces 1224. Note that pole faces 1224 in this example are contoured or shaped so as to mimic the contours of the cylindrical surfaces of cylindrical permanent magnets 1202a and 1202b, thereby providing a relatively uniform air gap thickness for either portions of the cylindrical surfaces or the entire cylindrical surfaces. In various embodiments, field pole member 1220 can be composed of laminations (not shown) and can have functionality and/or structure as described with respect to other embodiments. FIG. 12C is an exploded view of an exemplary rotor-stator structure in accordance with a specific embodiment of the present invention. In this example, rotor-stator structure 1250 is configured to increase torque generated per unit size (or per unit weight) for electric motor implementations by at least minimizing the length of magnetic flux paths through field pole members. As field pole members 1206 provide substantially straight flux path segments therein, linear deviations of magnetic flux can be minimized. Typically, the path segments are generally parallel to the axis of rotation. Further, rotor-stator structure 1250 can implement field pole members 1206 that are straight or substantially straight to minimize reluctance of those field pole members. As reluctance is minimized, so too are magnetic losses. In the example shown in FIG. 12C, rotor-stator structure 1250 includes rotor assembly 1200, three active field pole members 1252 (each of which implements field pole member 1206 and a coil), end plates 1254 and 1256, and bearings 1258. Note that cylindrical surfaces 1260 (also referred to as magnet surfaces) of cylindrical magnets 1202a and 1202b are used to confront pole faces 1224 (FIG. 12B). Such magnet surfaces can be described as being interfacial as magnetic flux passes through those surfaces when the flux enters or exits pole faces 1224. The magnet surfaces, in whole or in part (i.e., cylindrical portions thereof), define air gaps between cylindrical surfaces 1260 and pole faces 1224. In at least one embodiment, pole faces 1224 are contoured to maintain a uniform thickness for each of the air gaps to increase flux interaction between cylindrical magnets 1202a and 1202b (FIG. 12C) and field pole members 1206a, 1206b, and 1206c, thereby increasing output torque in a predictable manner. In cases where field pole members 1206a, 1206b, and 1206c are composed of laminates, pole faces 1224 are contoured to maintain at least a substantially uniform thickness for each of the air gaps.

Figure 12D:
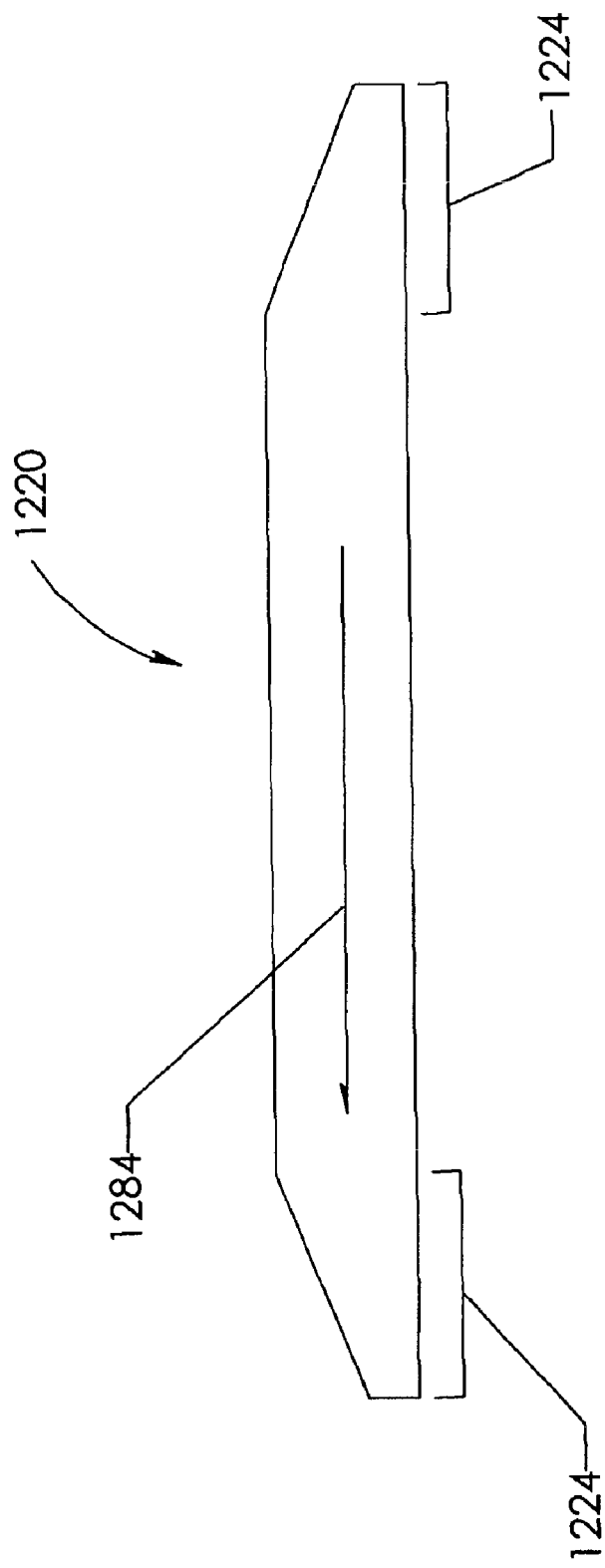

FIG. 12D shows a side view of a cross-section for field pole member 1220 (FIG. 12B) depicting a straight line 1284 that is indicative of a straight flux path segment in field pole member 1220 regardless of whether the magnetic flux path passes from either a permanent magnet or an Ampere Turn ("AT")-generated flux. In various embodiments of the present invention, the path over which flux passes is a function, in whole or in part, of the shape of field pole member 1220. Note that straight line 1284 is representative of straight flux paths between pole faces 1224 of field pole member 1220.

Figure 13A:
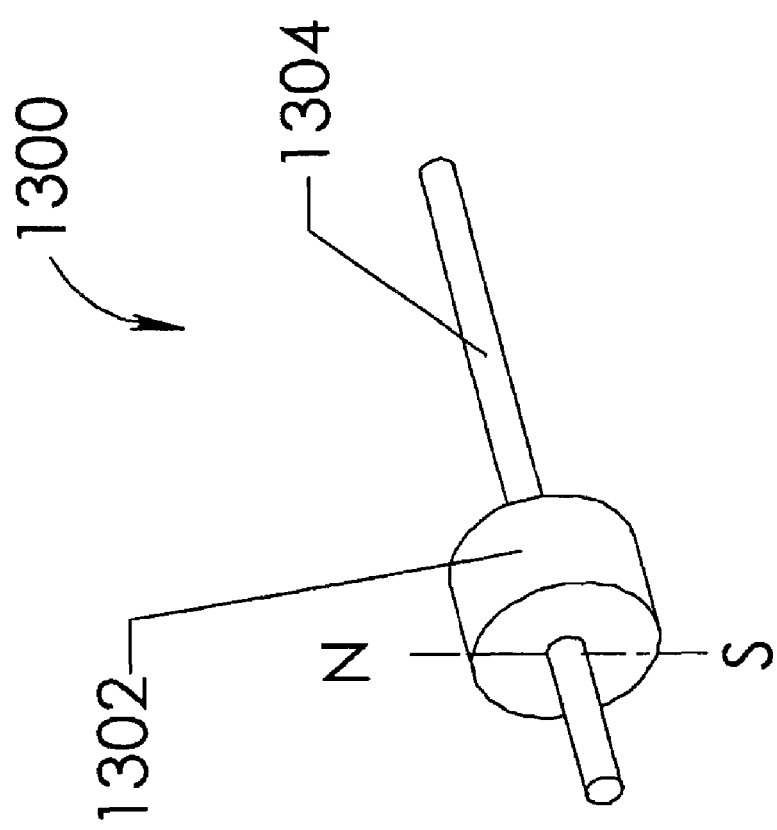
FIGS. 13A to 13D illustrate examples of other rotor-stator structures that implement only one magnet in accordance with various embodiments of the present invention.
Figure 13B:
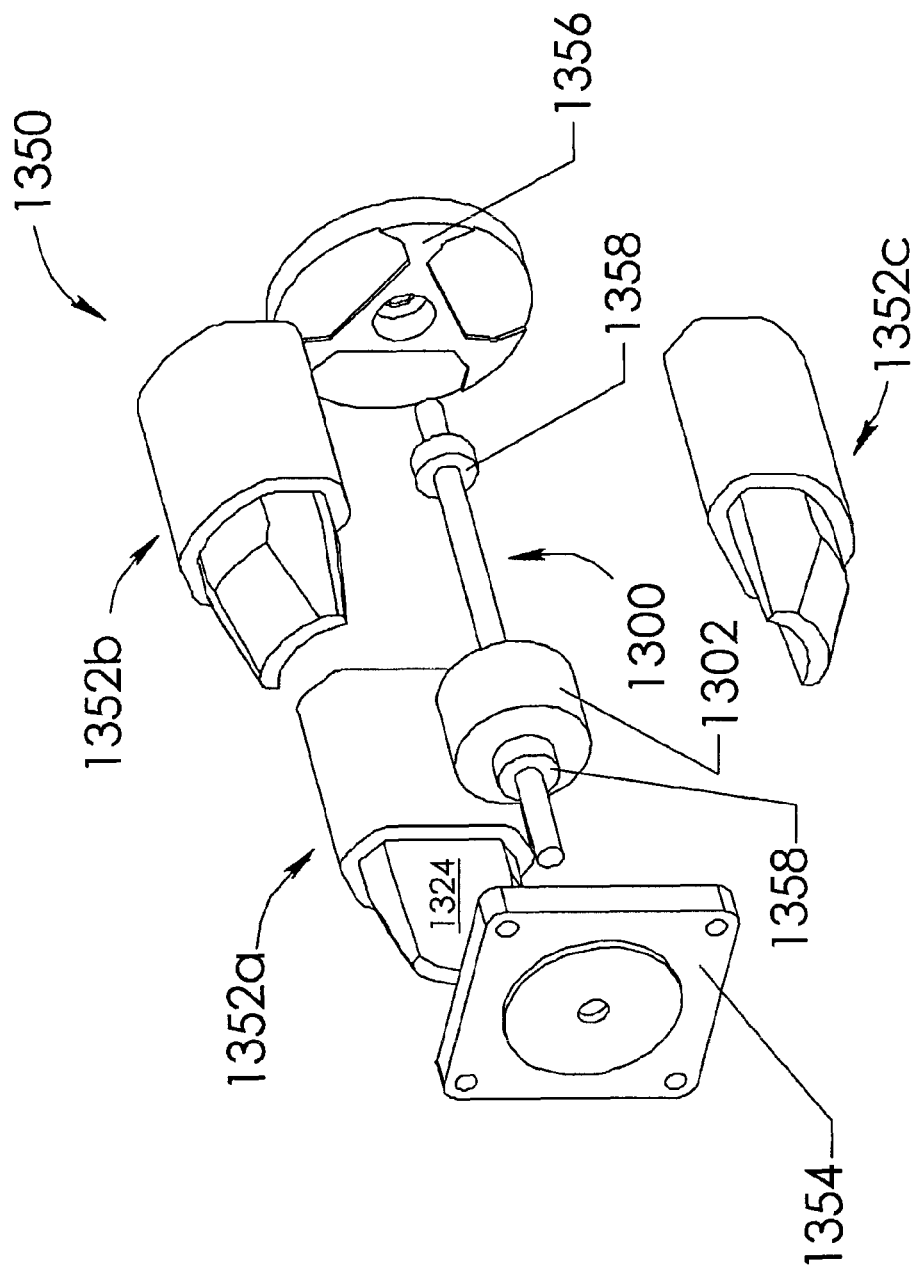

FIGS. 13A and 13B illustrate yet another rotor-stator structure in accordance with at least one embodiment with the present invention. FIG. 13A depicts a rotor assembly 1300 including only one magnet, which in this example, is a cylindrical magnet 1302 mounted on a shaft 1304. As shown, FIG. 13B is an exploded view of an exemplary rotor-stator structure in accordance with a specific embodiment of the present invention. In this instance, rotor-stator structure 1350 includes rotor assembly 1300, three active field pole members 1352 (i.e., 1352a, 1352b, and 1352c), end plates 1354 and 1356, and bearings 1358. In one embodiment, plate 1354 is a non-magnetic end plate and end plate 1356 is a magnetically permeable end plate for transferring flux between active field pole members 1352. In some embodiments, end plate 1356 is a non-magnetic end plate and rotor-stator structure 1350 includes a flux-carrying member (not shown) that is magnetically permeable to complete the magnet circuit through cylindrical magnet 1302. The flux-carrying member magnetically couples the other ends of active field pole members 1352 at which there are not pole faces. The field pole member implemented as part of active field pole members 1352 is similar in some respects to field pole member 1220 of FIG. 12B and to any one of field pole members 1206a, 1206b, and 1206c of FIG. 12C. But in this instance, each of the field pole members of active field pole members 1352 includes only one pole face as there is only one permanent magnet with which to interact. One example of a single pole face is pole face 1324. In alternate embodiments, other-shaped magnets can be substituted for cylindrical magnet 1302 to implement other configurations of rotor-stator structure 1350. Further, rotor-stator structure 1350 can additionally include other features of the various embodiments described herein.

Figure 13C:
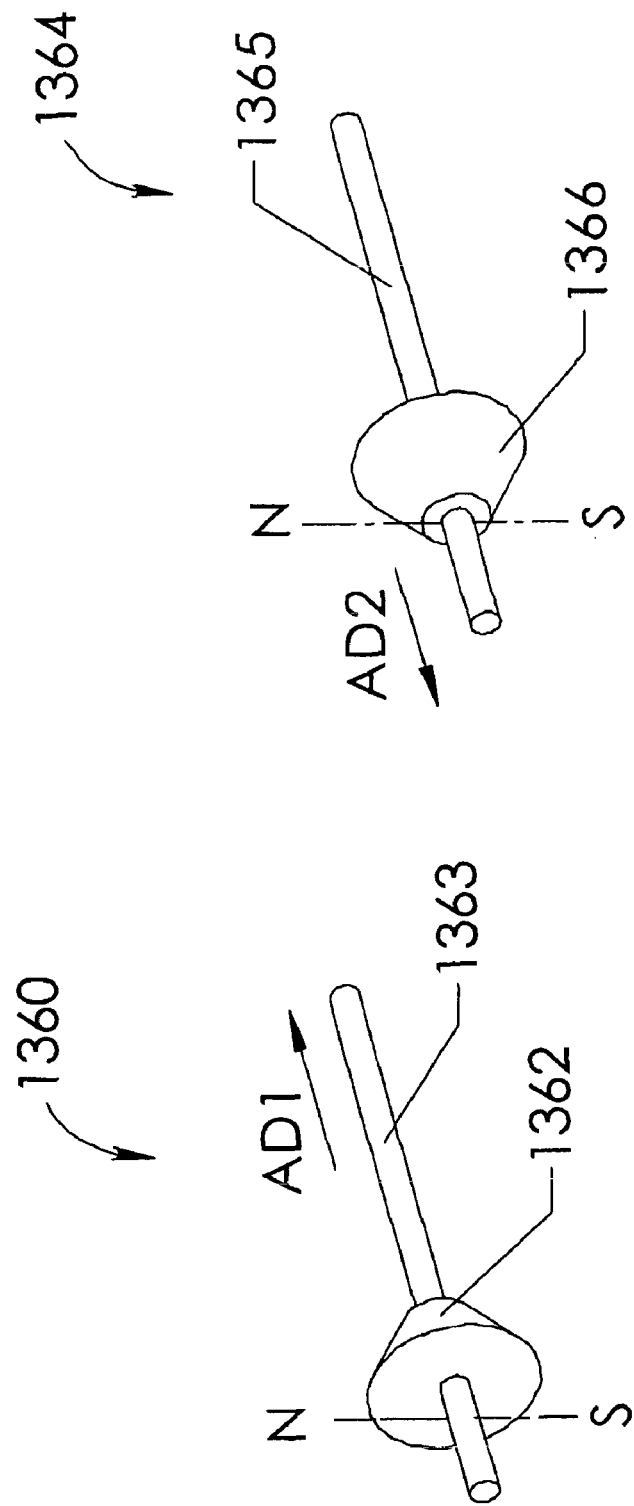
Figure 13D:
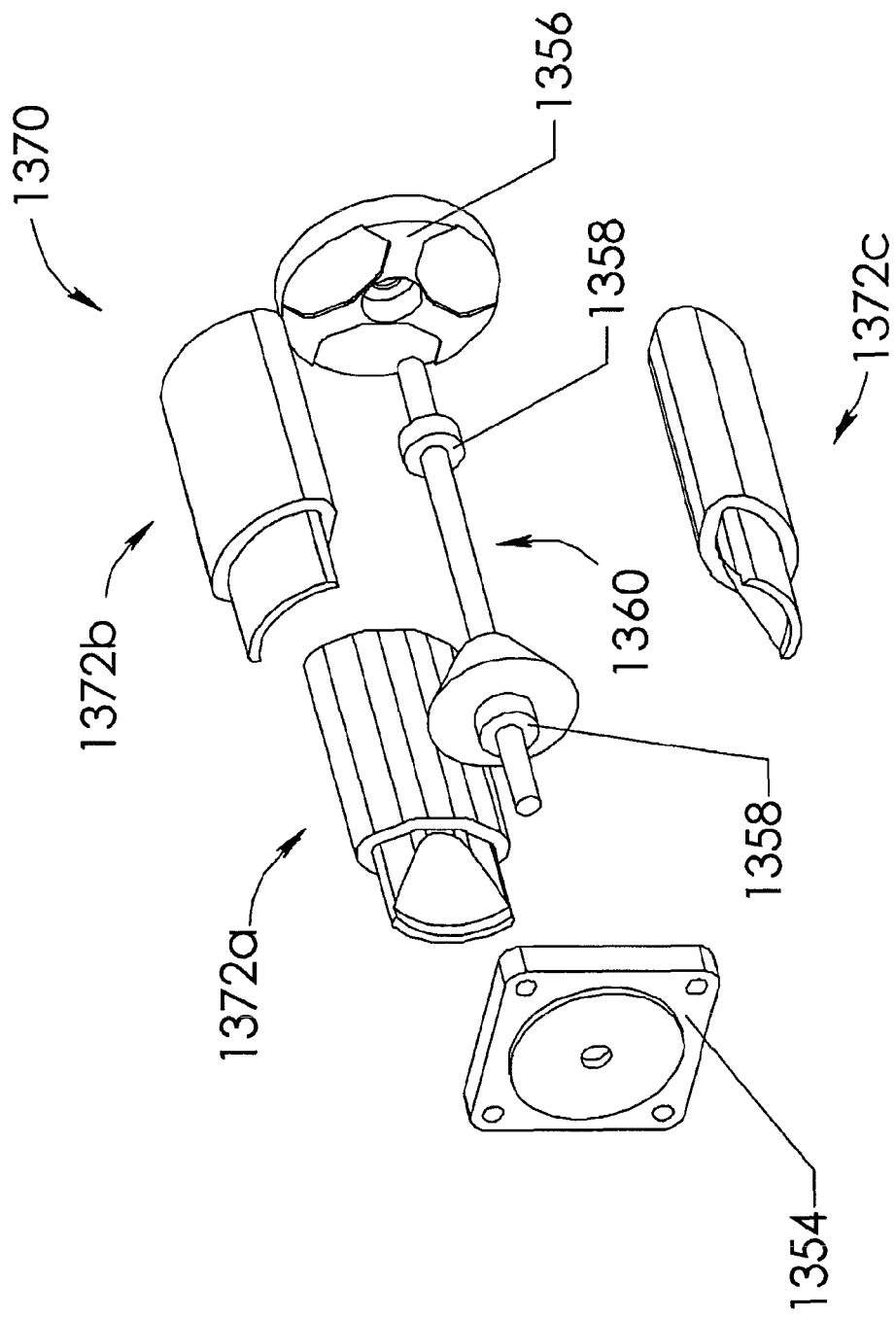

FIGS. 13C and 13D illustrate still yet another rotor-stator structure in accordance with at least one embodiment of the present invention. FIG. 13C depicts rotor assemblies 1360 and 1364 including only one conical magnet each. In particular, rotor assembly 1360 includes a conical magnet 1362 mounted on a shaft 1363 such that at least a portion of a conical surface for conical magnet 1362 faces a first axial direction ("AD1"). By contrast, rotor assembly 1364 includes a conical magnet 1366 mounted on a shaft 1365 such that at least a portion of a conical surface for conical magnet 1366 faces a second axial direction ("AD2"), where the second axial direction is opposite from the first axial direction. In at least one embodiment, the first axial direction is toward a flux-carrying member (not shown), such as a magnetically permeable end plate 1356 (FIG. 13B). While rotor assembly 1364 might generate relatively longer flux paths that are less straight than those produced with rotor assembly 1360, such differences can be negligible in certain applications (e.g., in those cases where motor performance is not a critical requirement). Note that the relative positions at which conical magnets 1362 and 1366 are mounted on respective shafts 1363 and 1365 are merely examples of some of the possible positions. As such, conical magnets 1362 and 1366 each can be positioned anywhere on a shaft, including the center of either shaft 1363 or shaft 1365. FIG. 13D is an exploded view of an exemplary rotor-stator structure in accordance with a specific embodiment of the present invention. As shown, rotor-stator structure 1370 includes rotor assembly 1360 (FIG. 13C), three active field pole members 1372 (i.e., 1372a, 1372b, and 1372c) each of which is similar in functionality as those similarly named in FIG. 13B. But three active field pole members 1372 of FIG. 13D include field pole members that each include only one pole face, whereby each of the single pole faces of three active field pole members 1372 are contoured to confront the conical magnet surfaces of rotor assembly 1360. Rotor-stator structure 1370 also includes end plates 1354 and 1356 as well as bearings 1358. Further, rotor-stator structure 1370 can additionally include other features of the various embodiments described herein.

Figure 14:
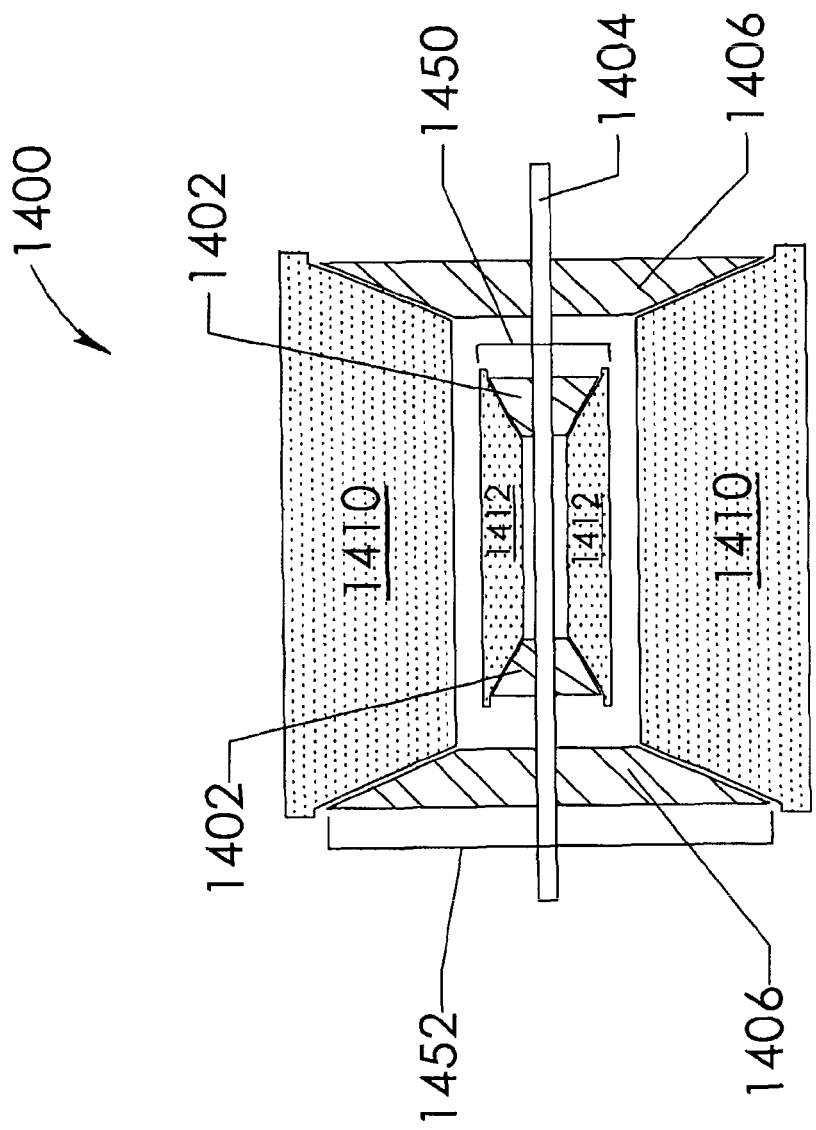
FIGS. 14 and 15 depict examples of implementations of more than two magnets in accordance with various embodiments of the present invention.
Figure 15:
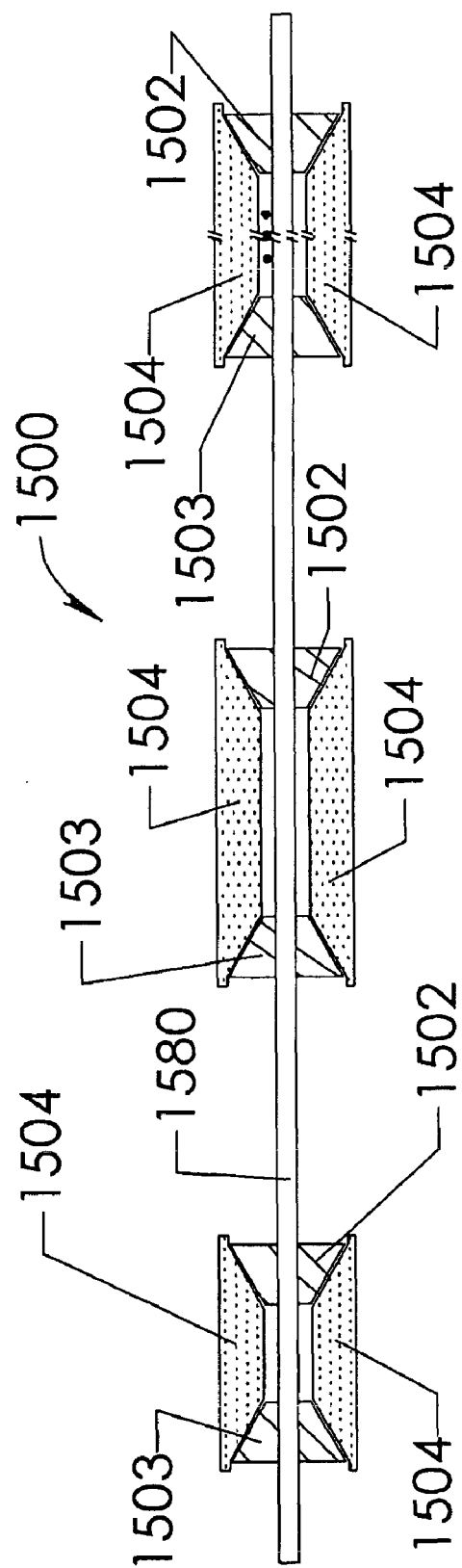

FIGS. 14 and 15 depict exemplary implementations of more than two conical magnets in accordance with various embodiments of the present invention. FIG. 14 shows that both sets of conical magnets are arranged to face each other. A first set includes conical magnets 1402 and a second set includes conical magnets 1406, with both sets being affixed to a shaft 1404. In one embodiment, two sets of field pole members in cooperation with pairs of conical magnets of differing diameter can be used to form a compound motor 1400. In particular, compound motor 1400 is formed by integrating two or more motors in parallel, such as inner motor 1450 and outer motor 1452. In this example, an inner motor 1450 includes conical magnets 1402 and active field pole members 1412, conical magnets 1402 having smaller diameters than conical magnets 1406. Outer motor 1452 includes an inner motor 1450 as well as conical magnets 1406 and active field pole members 1410. In one embodiment, conical magnets 1402 and 1406 face away from each other and toward opposite axial directions. In alternate embodiments, other-shaped magnets, such as cylindrical, can be substituted for conical magnets 1402 and 1406.

FIG. 15 illustrates that any number of conical magnets 1502 and 1503 can be arranged on a shaft 1504. In particular, a first set of conical magnets 1502 has their conical surfaces facing one axial direction, and a second set of conical magnets 1503 are arranged to have each conical surface facing another axial direction, which is a direction 180 degrees different than that faced by conical magnets 1502. According to various embodiments of the present invention, any number of conical magnets (e.g., any even or odd number) can be arranged on a shaft, in many orientations or directions, with one or more active field pole members being adapted to interact with those conical magnets. In one embodiment, active field pole members 1504 are included with pairs of conical magnets 1502 and 1503 to form any number of motors in series with each other. For example, series motor 1500 includes three motors sharing the same shaft 1580. Each motor includes one conical magnet 1502, one conical magnet 1503, and any number of active field pole members 1504. Series motor 1500 is well suited for use in down-hole drills and pumps where high torque in a relatively small diameter is desired and axial length is of minimal significance. In alternate embodiments, other-shaped magnets, such as cylindrical, can be substituted for conical magnets 1502 and 1503

Figure 16:
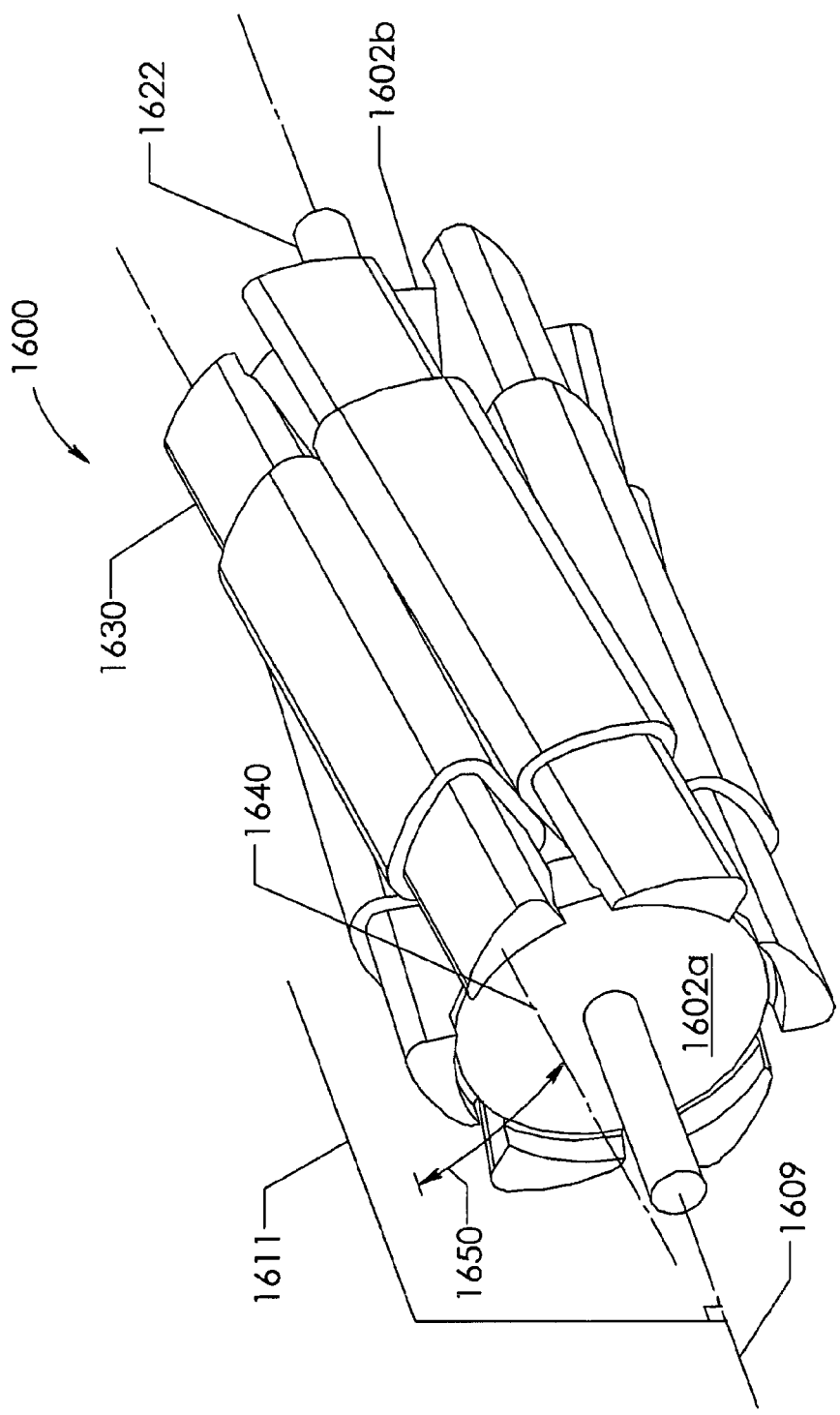
FIG. 16 depicts an alternative implementation of a rotor-stator structure having skewed orientations for its field pole members in accordance with one embodiment of the present invention.

FIG. 16 depicts an alternative implementation of a rotor-stator structure having skewed orientations for its field pole members in accordance with one embodiment of the present invention. Rotor-stator structure 1600 includes a number of field pole members 1630 arranged coaxially about an axis of rotation 1609 and configured to magnetically couple with magnets 1602a and 1602b, both of which are assembled on a shaft 1622. In one instance, magnets 1602a and 1602b can have conical surfaces facing toward each other. In at least one embodiment, each of field pole members 1630 is "skewed" in orientation to the axis 1609 such that a medial line 1640 passing through each field pole member 1630 is at a skew angle 1650 with a plane 1611 passing through axis 1609. By orienting field pole members 1630 at skew angle 1650 from the axis of rotation 1609, detent can be reduced. In one specific embodiment, the pole faces of each of field pole members 1630 can be contoured to confront the surfaces of magnets 1602a and 1602b. Note that one or more field pole members 1630 need not be active field pole members.

Figure 17A:
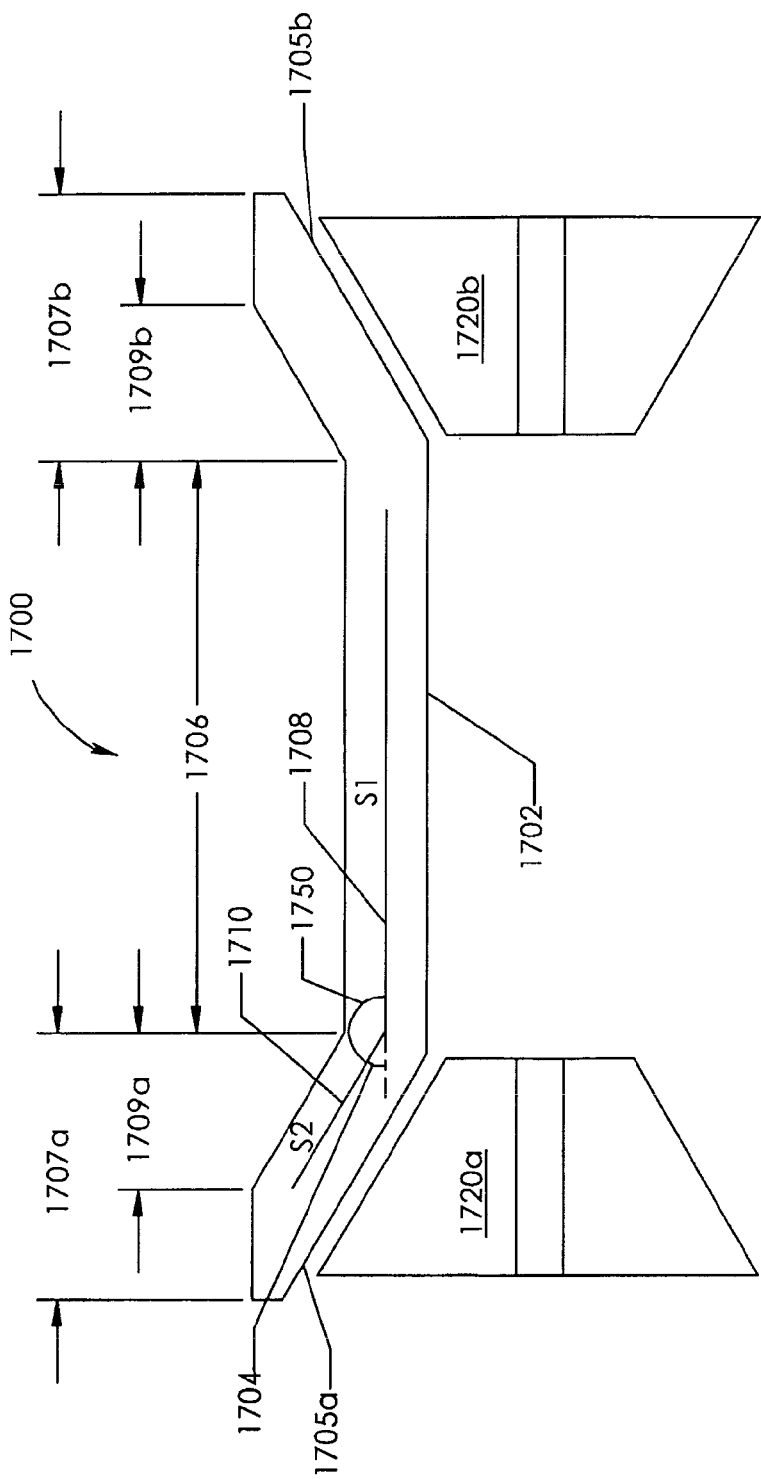
FIGS. 17A and 17B illustrate an example of a field pole member according to a specific embodiment of the present invention.

FIG. 17A is a cross-sectional view illustrating another rotor-stator structure in accordance with one embodiment of the present invention. In the cross-sectional view of FIG. 17A, which is similar to sectional view X-X of FIG. 5A, rotor-stator structure 1700 includes a field pole member 1702 and conical-shaped magnets 1720a and 1720b. Field pole member 1702 has a first pole shoe 1707a and a second pole shoe 1707b. First pole shoe 1707a is positioned adjacent to at least a portion (e.g., a confronting portion) of a surface of magnet 1720a so that a pole face 1705a can be used to form a first flux interaction region therewith. Similarly, second pole shoe 1707b is positioned adjacent to at least a portion of a magnet surface of magnet 1720b so that a pole face 1705b can be used to form a second flux interaction region therewith. Both of the flux interaction regions include air gaps having either a uniform thickness or a substantially uniform thickness. Field pole member 1702 also has a central field pole member portion 1706 around which one or more windings can be wound. Note that FIG. 17A distinguishes specific regions or portions of field pole member 1702 as pole shoes 1707a and 1707b, transition regions 1709a and 1709b, pole faces 1705a and 1705b, and central field pole member portion 1706, all of which are merely exemplary and are not to be construed as limiting. As such, other embodiments of the present invention can include regions and portions of field pole member 1702 that are of other sizes, lengths, proportions, dimensions, shapes, etc. than as described above.

Further, first pole shoe 1707a and second pole shoe 1707b include transition region 1709a and transition region 1709b, respectively, to offset first pole shoe 1707a and second pole shoe 1707b (as well as pole faces 1705a and 1705b) from central field pole member portion 1706. Each of transitions regions 1709*a* and 1709*b* is configured to reduce the reluctance for a flux path between pole faces 1705*a* and 1705*b*. For example, transition regions 1709*a* and 1709*b* provide for a decreased reluctance for flux paths through central field pole member portion 1706 and either first pole shoe 1707*a* or second pole shoe 1707*b*, as compared to traditional field poles that require transition regions to be orthogonal (i.e., ninety degrees) to either central field pole member portion 1706 or first pole shoe 1707*a* and second pole shoe 1707*b*. Generally, the sharper a flux path turns within a field pole member or any like "low reluctance member," such as at or near a ninety degree angle, the higher the reluctance is for that flux path. This in turn leads to increased magnetic losses.

To reduce magnetic losses associated with non-straight flux paths, exemplary field pole member 1702 implements transition regions, such as transition regions 1709*a* and 1709*b*, to provide a transitory flux path segment. Transitory flux path segment 1710 facilitates lowering the reluctance associated with the length of a flux path extending between pole faces, such as pole faces 1705*a* and 1705*b*. As shown in FIG. 17A, transitory flux path ("S2") 1710 provides for an acute angle 1704 (which can be described also by its complementary obtuse angle 1750) from a flux path segment ("S1") 1708 associated with central field pole member portion 1706 to transitory flux path ("S2") 1710. As shown, flux path segment ("S1") 1708 is in a same general direction indicated as transitory flux path ("S2") 1710, which deviates from the direction of that segment 1708 by acute angle 1704. Note that such a deviation can also be described in terms of an obtuse angle 1750, as should be apparent to ordinarily skilled artisans. In a specific embodiment, acute angle 1704 can be between approximately 0 and approximately 60 degrees (including both 0 and 60 degrees). Further, a "non-straight" flux path can be described as a path having two consecutive segments 1708 and 1710 at an angle 1704 between 60 degrees and 90 degrees. In a specific embodiment, a non-straight flux path includes those paths having a subsequent flux path segment deviating at an angle of about ninety degrees from a precedent flux path segment, where both the subsequent and the precedent flux path segments are consecutive. As such, segment 1708 is precedent to segment 1710 (from south to north magnetized flux path) and segment 1710 is subsequent to segment 1708. In some embodiments, the term "substantially straight" can refer to straight flux paths (e.g., paths that have no deviation from a straight line) as well as flux paths that are 60 degrees or less.

In at least one specific embodiment, the term "flux path segment" refers to a line segment extending from one end (or approximately therefrom) of a region or portion of field pole member 1702 to the other end (or approximately thereto), the flux path segment being representative of an approximate magnetic flux path and/or a portion of an interior flux line extending between magnetic poles (e.g., pole faces). For example, flux path segment ("S1") 1708 extends the approximate length of central field pole member portion 1706 and transitory flux path ("S2") 1710 extends the approximate length of transition region 1709*a*.

Figure 17B:
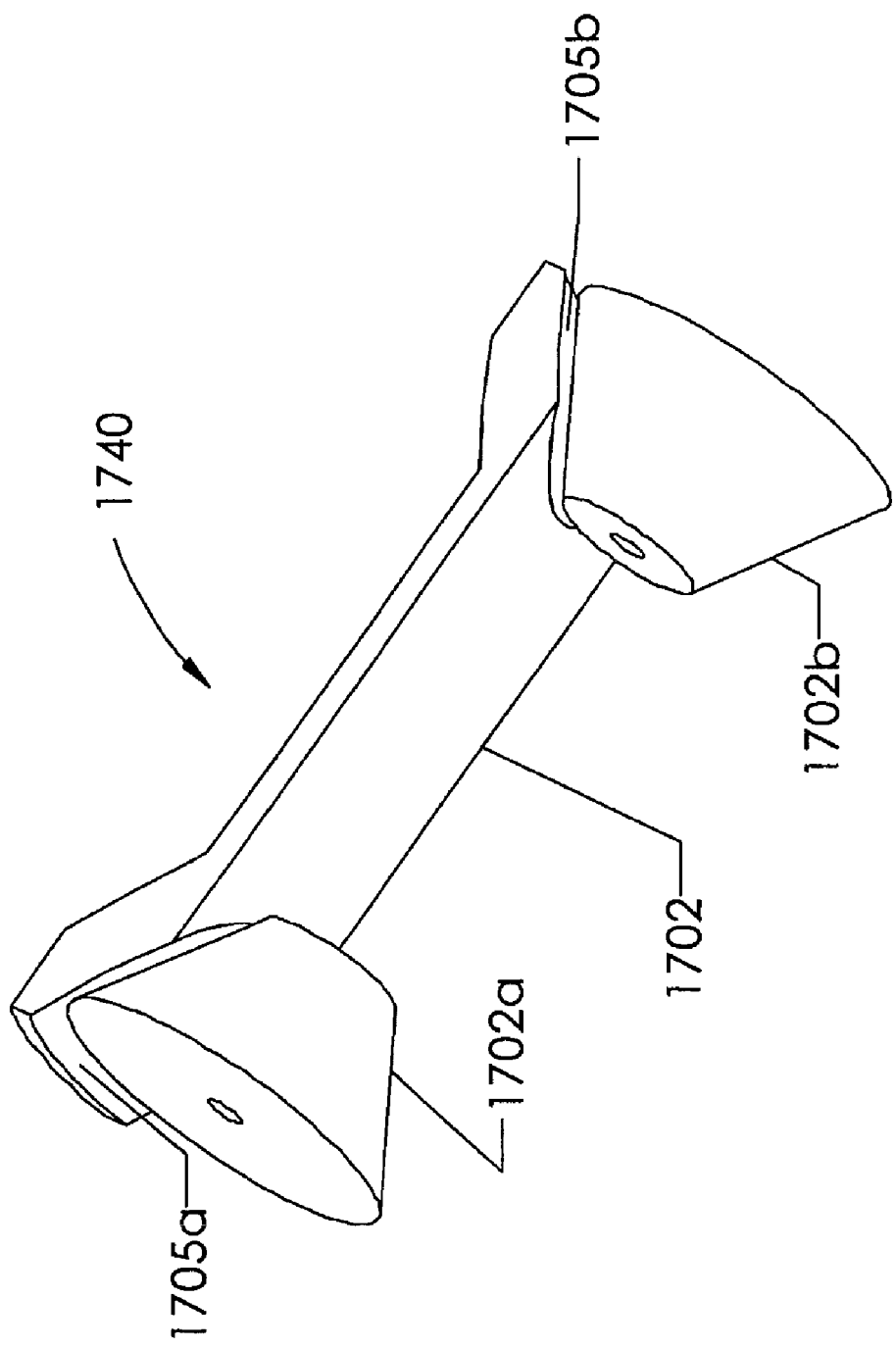

FIG. 17B illustrates a perspective view of a field pole member in accordance with a specific embodiment of the present invention. As shown, a field pole member 1702 (FIG. 17A) includes pole faces 1705*a* and 1705*b* contoured to confront the conical surfaces of conical magnets 1720*a* and 1720*b*. Note that in other embodiments, pole faces 1705*a* and 1705*b* need not be contoured. For example, pole faces 1705*a* and 1705*b* of FIG. 17A each can lay in a relatively flat plane perpendicular to the page on which FIG. 17A is illustrated.

Figure 18A:
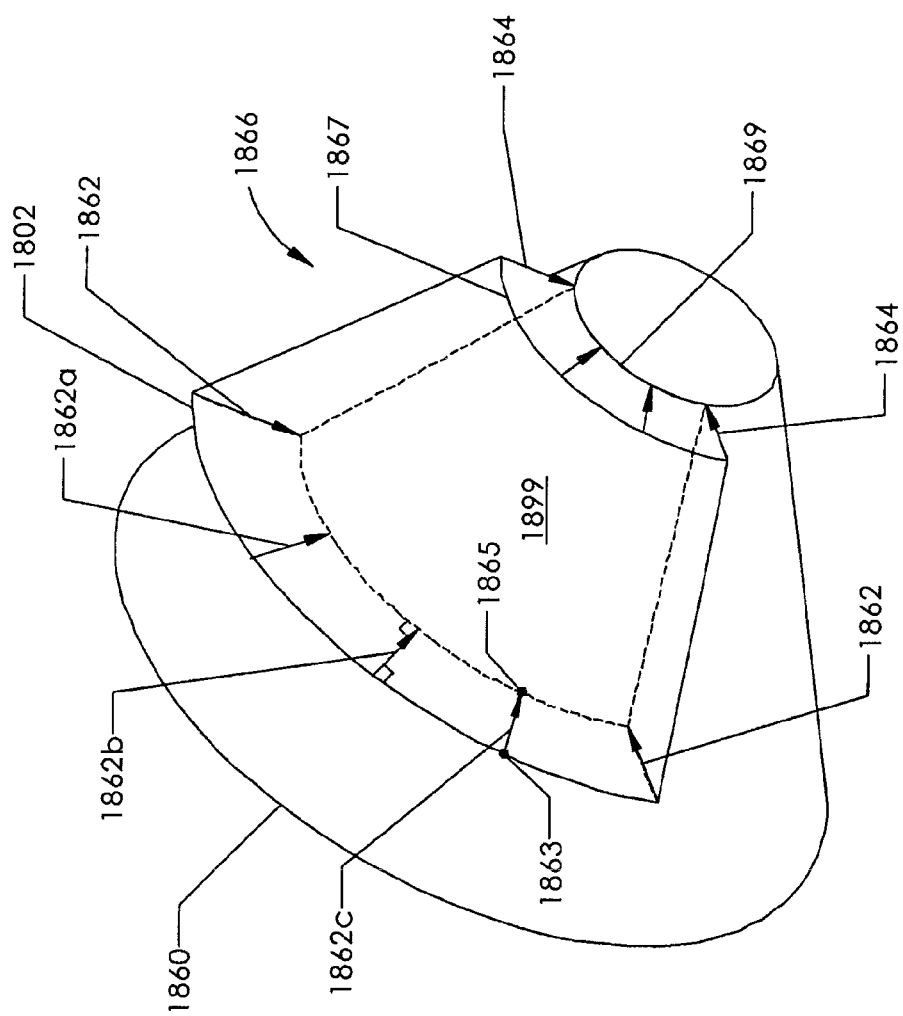
FIG. 18A depicts air gaps having various degrees of uniformity, according to at least one embodiment of the present invention.
Figure 18B:
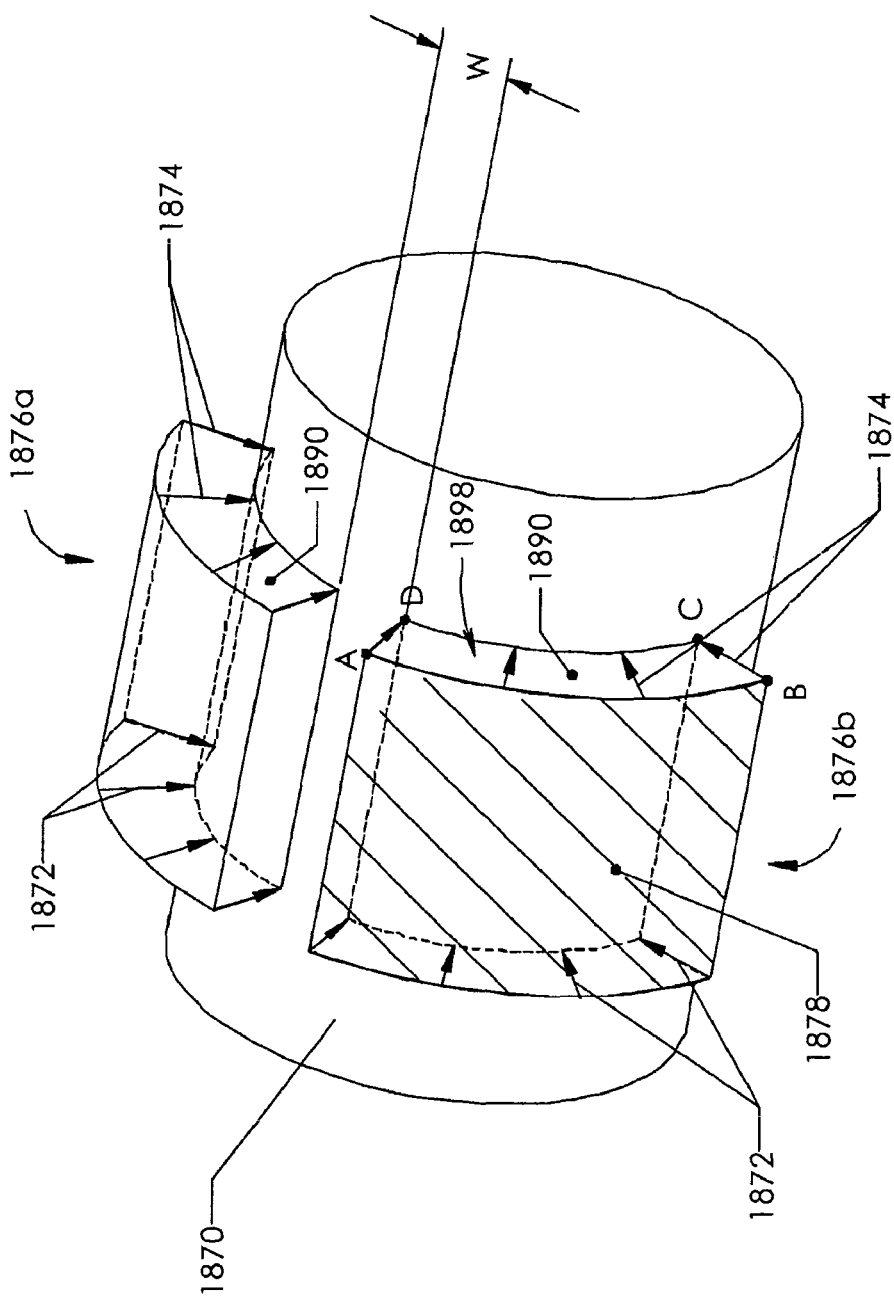
FIG. 18B depicts the configurability of air gaps according to embodiments of the present invention.

FIGS. 18A and 18B depict air gaps according to embodiments of the present invention. FIG. 18A illustrates an air gap 1866 shaped by a conical magnet 1860 and a corresponding pole face, which is not shown to avoid obscuring air gap 1866. In this example, each of normal vectors 1862 and 1864 originates from a surface portion on the pole face and terminates at a corresponding point on surface portion 1899 on conical magnet 1860. For example, a normal vector 1862*c* originates at a portion of the pole face, such as at point 1863, and extends to a point on portion 1899 of surface of conical magnet 1860, such as point 1865. In some embodiments, normal vectors 1862 and 1864 each have the same lengths.

But in some embodiments, lengths of normal vectors 1864 can differ from lengths of normal vectors 1862. As such, an arc-shaped cross-section 1867 defines a first uniform air gap cross-section at a first axial position, whereas an arc-shaped cross-section 1802 defines a second uniform air gap cross-section at a second axial position along the length of an axis (not shown). Normal vectors 1864 lie in the same plane perpendicular, for example, to surface portion 1899, whereas normal vectors 1862 lie in the same plane also perpendicular to surface portion 1899. But both planes are different and produce different cross-sections of air gap 1866, such as arc-shaped cross-sections 1802 and 1867.

In some embodiments, it may be advantageous to vary the air gap thickness to create, for example, a narrowed air gap at the small diameter end of conical magnet 1860 and a widened air gap at the large diameter end of conical magnet 1860 to better control flux conducted across air gap 1866 to the adjacent field pole (not shown). For example, the lengths of normal vectors 1862 can be longer than normal vectors 1864. Accordingly, this creates a wider air gap at arc-shaped cross-section 1802 and a narrower air gap at arc-shaped cross-section 1867. In another example, consider that a load line of conical magnet 1860 defines a ratio between the length of the air gap ("L_gap") to the length of the magnet ("L_magnet") as L_gap/L_magnet. To control this ratio or to prevent the ratio from changing, air gap 1866 can be made narrow at the small end of the conical magnet 1860, where magnet length L_magnet is relatively short, and can be wider at the large end of conical magnet 1860 where magnet length L_magnet is relatively longer. The length of the magnet ("L_magnet") describes a diameter of conical magnet 1860 along which magnetic flux traverses from one magnet surface to another.

Note that normal vectors originating from and/or terminating at a curved surface generally are not parallel to each other in a plane perpendicular to the surface of magnet 1860. For example, normal vector 1862*a* is not parallel to normal vector 1862*b*, both of which originate from a pole face surface having a curvature associated therewith. Air gap 1866 includes an outer boundary having an arc-shaped cross-section 1867 and an inner boundary having an arc-shaped cross-section 1869. Note that although only one air gap 1866 is shown, other similar air gaps can be formed by other pole face surfaces. Those air gaps have been omitted for sake of simplicity. Also note that normal vectors 1862 and 1864 do not necessarily represent magnetic flux lines in air gap 1866; their primary purpose is to describe the physical structure of the air gap.

FIG. 18B illustrates air gaps 1876*a* and 1876*b* shaped by a cylindrical magnet 1870 and corresponding pole faces, both of which are not shown to avoid obscuring those air gaps. In this example, each of normal vectors 1872 and 1874 originates from a point on a surface portion on the pole face (not shown) and terminates at a corresponding point on surface portion 1890 on conical magnet 1870. Generally, normal vectors 1872 and normal vectors 1874 lay within a first plane (not shown) and a second plane (not shown), respectively, where both planes are substantially perpendicular to an axis. Accordingly, normal vectors 1872 and normal vectors 1874 define a first and a second substantially uniform cross-section. The first and second substantially uniform cross-sections form arc-shaped cross-sections and can be of the same size or of a different size, depending on the lengths of normal vectors 1872 and 1874. For example, when each of normal vectors 1874 is of the same length, then they form an arc-shaped cross-section 1898 (e.g., having a perimeter defined by points A, B, C and D). In one case, arc-shaped cross-section 1890 provides uniformity in radial directions about an axis. In another case, when the lengths of normal vectors 1872 and 1874 are the same, then the arc-shaped cross-sections formed therefrom provides uniformity in an axial direction, thereby providing for uniform air gap thickness in whole or in part. Note that the normal vectors can also originate from a magnet surface (not shown) to describe air gaps. In at least one embodiment, surface areas of pole face surfaces can be dimensioned as a function of the peripheral distance, "W," between field pole members (not shown). FIG. 18B shows a surface area 1878 as a crosshatched outer boundary of air gap 1876b. Surface area 1878 is representative of other surface areas of other air gaps, all of which can be similarly dimensioned. The distance, "W," of FIG. 18B is selected to provide maximum magnetic coupling between cylindrical magnet 1870 and the field pole member by maximizing pole face surface areas 1878 while minimizing leakage between said field pole members associated with air gaps 1876a and 1876b by increasing distance, "W." An optimal value of "W" minimizes magnetic field leakage while providing an increased output torque.

Figure 19:
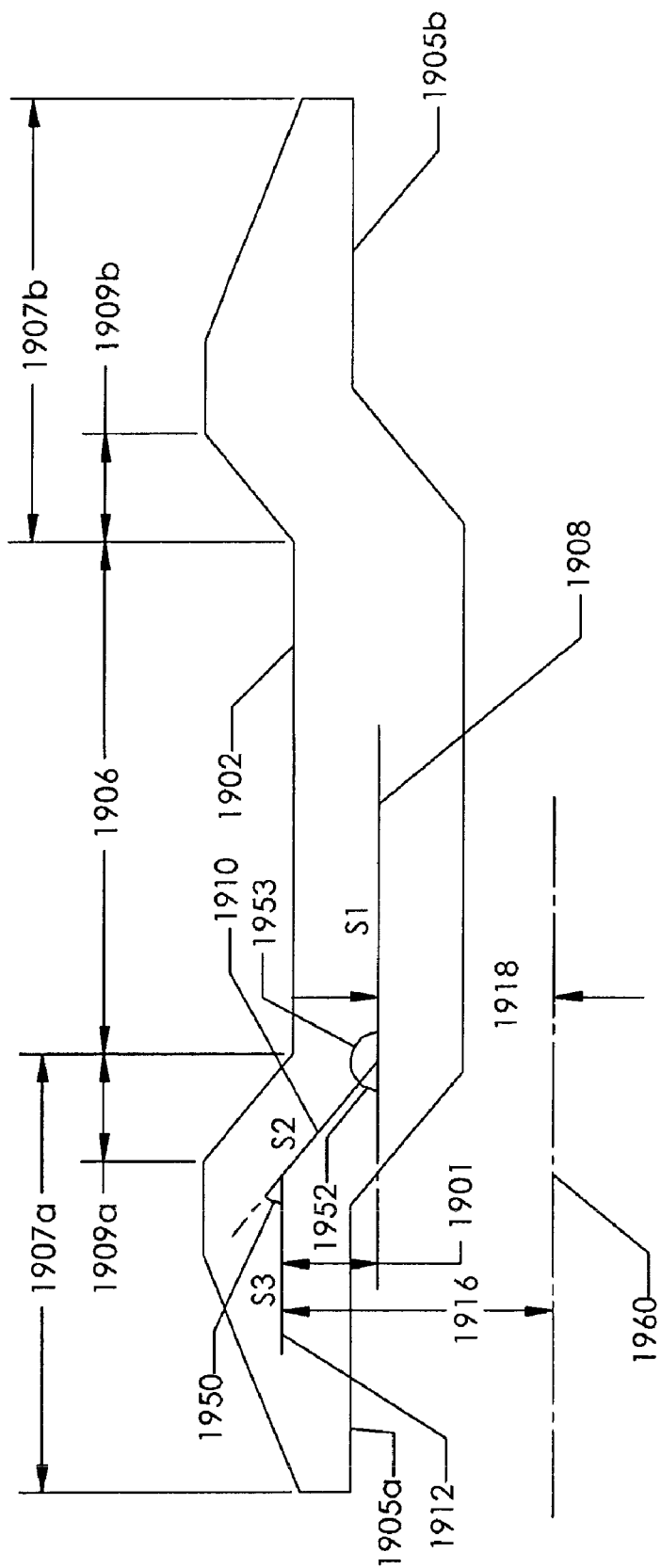
FIG. 19 is a cross-sectional view illustrating yet another general field pole member configuration in accordance with yet another embodiment of the present invention.

FIG. 19 is a cross-sectional view illustrating yet another general field pole member configuration in accordance with yet another embodiment of the present invention. In the cross-sectional view of field pole member 1902, which is similar to sectional view X-X of FIG. 5A, field pole member 1902 is shown to include similar regions or portions as field pole member 1702 of FIG. 17A. In this example, field pole member 1902 has a first pole shoe 1907a, a second pole shoe 1907b, a first pole face 1905a, a second pole face 1905b, and a central field pole member portion 1906, all of which have equivalent functionalities as those described above. Note that in other embodiments, the regions and portions of field pole member 1902 can be of other sizes, lengths, shapes, proportions, dimensions, cross-sectional areas, etc. than the above-mentioned.

As shown in FIG. 19, transition region 1909a includes a transitory flux path ("S2") 1910 for providing an acute angle 1952 from or to a first flux path segment associated with central field pole member portion 1906, such as flux path segment ("S1") 1908, and for providing the same or a different acute angle 1950 from or to a second flux path segment, such as flux path segment ("S3") 1912, that is associated with first pole shoe 1907a. In some instances, the angle at which transitory flux path ("S2") 1910 deviates from flux path segments 1908 and 1912 can also be defined by an obtuse angle 1953, which is complementary to acute angle 1952. In some cases, flux path segment ("S1") 1908 and flux path segment ("S3") 1912 are at respective distances 1918 and 1916 from an axis of rotation defined by shaft 1960, both segments 1908 and 1912 being substantially parallel to shaft 1960. In FIG. 19, flux path segment ("S1") 1908 and transitory flux path ("S2") 1910 extend the approximate length of central field pole member portion 1906 and transition region 1909a, respectively, whereas flux path segment ("S3") 1912 extends the length of first pole shoe 1907a (or a portion thereof).

Consider that transition region 1909a provides a transitory flux path portion for gently transitioning flux from flux path segment 1908 (which is at a distance 1918 from an axis 1960 of rotation) to flux path segment 1912 (which is at a distance 1916 from axis 1960). Or consider that transition region 1909a provides a transitory flux path portion for gently transitioning flux a radial distance 1901 from axis 1960 without 90 degree bends.

Figure 20:
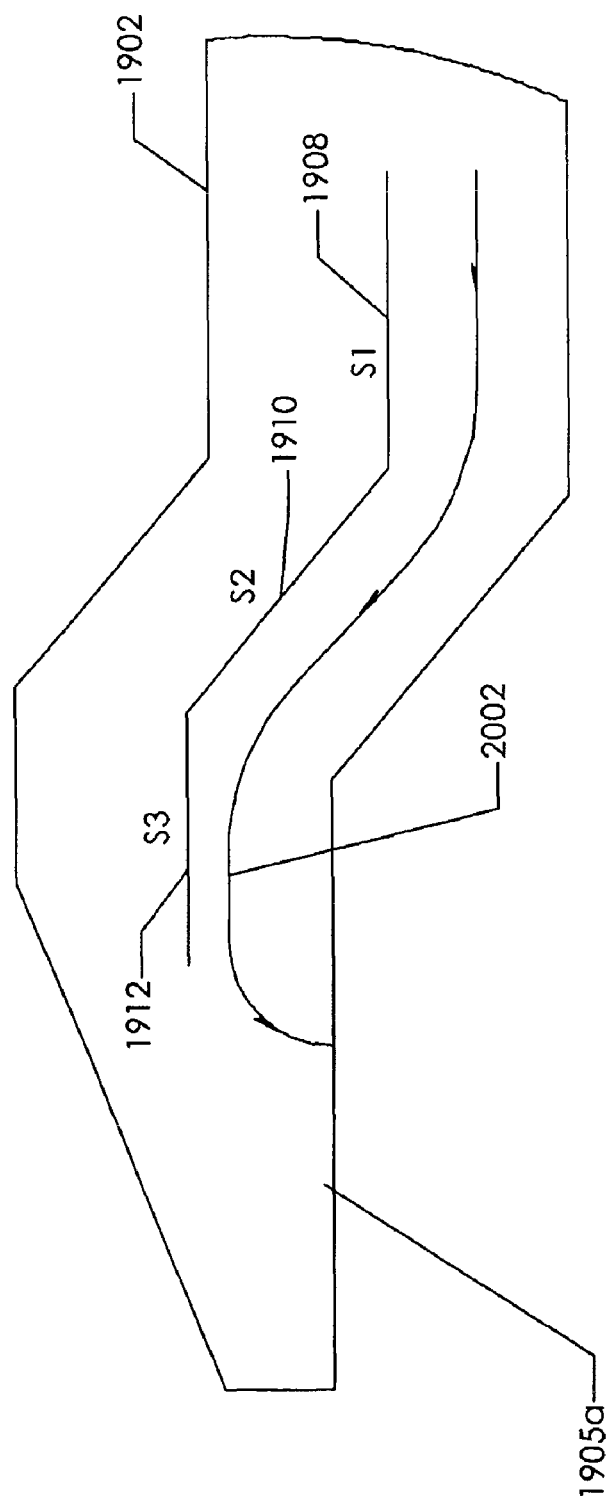
FIG. 20 illustrates an exemplary flux line to represent an instance of magnetic flux between pole faces of a field pole member, according to one embodiment of the present invention.

FIG. 20 illustrates a flux line 2002 as an example of a portion of magnetic flux extending to a pole face 1905a of field pole member 1902, according to one embodiment. Flux line 2002 is shown to be approximately incident to a flux path including flux path segment ("S1") 1908, transitory flux path ("S2") 1910 and flux path segment ("S3") 1912.

Generally, the motor constant (Km) for an electric motor implementing rotor-stator structure 200 (FIG. 2B), or the like, can be set by varying the length of the field pole member's core (i.e., the winding region) without materially affecting the other motor characteristics, other than for motor length and weight in some cases. For example, by doubling the winding length while keeping an outside diameter constant, the winding volume can also be doubled so the number of turns that can be wound within the motor doubles. Since motor performance is set by ampere-turns, in whole or in part, when the number of turns doubles, the current can be cut approximately in half and still achieve the same performance. So, doubling the number of turns of same wire size can cause the winding resistance to increase by a factor of two or so. Since the power lost in a motor can be determined by a square of the current times the winding resistance, a reduction in current by a factor of two and a doubling of the resistance can lead to a halving of the power loss in the winding.

An exemplary method of converting electrical energy to mechanical torque by using a rotor-stator structure of at least one embodiment of the present invention is described as follows. A first element magnetic flux is produced by an even number of poles of two permanent magnets, whereby those magnets substantially direct the first element magnetic flux in a radial direction inside and to the pole surfaces of the magnets. The permanent magnets are separated axially, but are connected along a common axis such that the magnet poles are substantially aligned in planes that include the axis. The magnet poles in the two permanent magnets are substantially oppositely directed in magnetization when viewed along the axis, thus completing a magnetic circuit. The first element flux is directed in a substantially axial direction through a plurality of low reluctance path elements, the paths being substantially parallel to the axis, thus aiding the magnetic flux density in the magnetic circuit. At least one of the low reluctance path elements is substantially surrounded by a second magnetic flux-producing element composed of current-carrying means surrounding the low reluctance path element. The current in the second flux element, when energized, is selectively switchable so as to produce magnetic potentials in regions of flux interaction at the axial ends of the low reluctance path elements, such as at the stator surfaces. The switchable magnetic potentials, when energized, either aid or oppose magnetic flux from the first element flux source, thereby producing torque in the permanent magnets in planes perpendicular to the axis. The magnitude of the torque produced is a function of the angle between the direction of the first element flux and the second element flux. In some embodiments, the regions of flux interaction at the axial ends of the low reluctance path elements form air gap surfaces that are at an angle relative to the axis. In alternative embodiments, the regions of flux interaction at the axial ends of the low reluctance path elements form air gap surfaces that are parallel to the axis. In a specific embodiment, the coercivity of the permanent magnets as measured by the relative recoil permeability is less than 1.3 in CGS units, for example.

As rotor-stator structures and electrical motors can be designed such that their functionalities can be simulated and modeled using computing devices, at least an embodiment of the present invention relates to a computer-readable medium having computer code thereon for performing various computer-implemented operations, such as modeling the conversion of electrical energy to mechanical torque (or the generation of electrical energy from mechanical torque). In particular, control strategies of the invention may be implemented in software associated with a processor. The media and computer code may be those specially designed and constructed for the purposes of the present invention, or they may be of the kind well known and available to those having skill in the computer software arts. Examples of computer-readable media include hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions. Further, other embodiments of the present invention include motors using rotor-stator structures of the present invention that are electrically driven by well known drive technology, as would be appreciated by those ordinarily skilled in the art.

According to various embodiment of the present invention, a rotor-stator structure for electrodynamic machines has an axis and includes a rotor assembly in which is mounted at least two substantially cylindrical magnets arranged axially on the axis and being spaced apart from each other, the cylindrical magnets having regions of predetermined magnetic polarization and each having confronting cylindrical magnetic surfaces of principal dimension substantially parallel to the axis, with the magnetic polarizations being in substantially opposite direction. The rotor-stator structure can also include field pole members arranged coaxial to the axis and having flux interaction surfaces formed at the ends of the field pole members and located adjacent the confronting magnetic surfaces, which are generally coextensive with the principal dimension thereof, defining functioning air gaps therewith. Each of the field pole members is magnetically permeable. Each of the field pole member is substantially straight. The flux interaction surfaces are configured to magnetically couple the field pole members to the cylindrical magnets.

In some embodiments, the rotor-stator structure can further comprise a shaft on which the at least two substantially cylindrical magnets are affixed, the shaft defining the axis and extending through each of the at least two substantially cylindrical magnets. The flux interaction surfaces can be shaped to maintain a substantially uniform cross-section for each of the air gaps, the substantially uniform cross-section being an arc-shaped cross-section in a plane substantially perpendicular to the axis. The flux interaction surfaces can also be shaped to maintain at least two different cross-sections for each of the air gaps to form substantially non-uniform cross-sections for each of the air gaps, the at least two different cross-sections each having arc-shaped cross-section of different dimensions in at least two different planes that are substantially perpendicular to the axis. The substantially uniform cross-section is configured to increase flux interaction between the cylindrical magnets and the field pole members, thereby increasing output torque. The shape of each of the air gaps can be commensurate with the substantially uniform cross-section and another substantially uniform cross-section, both of which have similar sizes to provide a substantially uniform thickness for each of the air gaps. The flux interaction surfaces each can have a surface area dimensioned to generate maximum torque output.

In various embodiments, each of the flux interaction surfaces can further include a skewed flux interaction surface to skew field pole gaps between adjacent field pole members, thereby minimizing detent torque. The rotor-stator structure can be configured to limit magnetic flux paths to traverse only through two of the cylindrical magnets, the field pole members, the flux interaction surfaces, and the air gaps. Further, the rotor-stator structure can include a coil wound about one or more of the field pole members to form active field pole members each of which excludes back-iron, thereby decreasing magnetic losses as well as decreasing an amount of materials used to manufacture an electrodynamic machine. In some embodiments, either the field pole members are configured to rotate about the axis relative to the cylindrical magnets or the cylindrical magnets are configured to rotate about the axis relative to the field pole members. Each of the substantially straight field pole members can be configured to minimize linear deviations in a flux path extending between a surface portion of a first flux interaction surface and a surface portion of a second flux interaction surface, the path segment terminating at the surface portions.

In at least one embodiment, a rotor-stator structure for electrodynamic machines can include a shaft defining an axis of rotation and having a first end portion, a central portion and a second end portion. The rotor-stator structure can also include at least a first magnet structure and a second magnet structure, each having one or more magnet surfaces. The first magnet structure and the second magnet structure each is affixed coaxially on the shaft so that the direction of polarization of the one or more magnet surfaces for the first magnet structure are in substantially opposite directions than the direction of polarization of the one or more magnet surfaces for the second magnet structure. The rotor-stator structure includes a plurality of sets of windings and a number of field pole members arranged substantially coaxial to the shaft, each of the field pole members including a number of laminations. Each of the field pole members can have a first pole shoe at a first field pole member end and a second pole shoe at a second field pole member end. The first pole shoe is positioned to be adjacent to a portion of the first magnet structure to form a first flux interaction region and the second pole shoe is positioned to be adjacent to a portion of the second magnet structure to foam a second flux interaction region. Both of the first flux interaction region and the second flux interaction region include air gaps, each of which can have an arc-shaped cross section in a plane perpendicular to at least one magnet surface from the one or more magnet surfaces. In some cases, the arc-shaped cross section establishes a substantially uniform thickness for each of the air gaps and increases flux interaction between the one or more magnet surfaces and the field pole members, thereby increasing output torque.

In one embodiment, the first pole shoe and the second pole shoe each further include flux interaction surfaces having a surface area dimensioned to generate maximum torque output, the surface area being dimensioned as a function of at least the distances between the field pole members to provide maximum magnetic coupling between the one or more magnet surfaces and the field pole members while at least minimizing leakage between the field pole members. In some cases, at least one of the field pole members is a substantially straight field pole member configured to provide a substantially straight flux path between the first flux interaction region and the second flux interaction region. The first pole shoe and the second pole shoe each can further include a skewed flux interaction surface to skew field pole gaps between adjacent field pole members, thereby minimizing detent torque. Each of the field pole members can also have at least a central field pole member portion around which a set of the plurality of sets of windings is wound.

In one embodiment, each of the first and the second pole shoes can include a transition region connecting each of the first field pole member end and the second field pole member end at a nonorthogonal angle with the central field pole member portion to reduce reluctance for a flux path between the central field pole member portion and either the first or the second pole shoe, or both. The transition region includes a transitory flux path for providing an acute angle from or to a first flux path segment associated with the central field pole member portion and for providing at the same or a different acute angle from or to a second flux path segment associated with either of the first and the second pole shoes. In some instances, both of the acute angles are between approximately 0 and 60 degrees. The first magnet structure and the second magnet structure can each be dipole magnets. As such, one magnet surface of the first magnet structure has a north pole pointing in a first direction and one magnet surface of the second magnet structure has a north pole pointing in a second direction. The first and the second directions can differ by an angle between 150 to 180 degrees.

In one embodiment, the rotor-stator structure can be configured to either receive electrical power as an electrical current into the at least one coil for implementing an electric motor or to receive mechanical power as rotational motion about the shaft for implementing an electric generator. In a specific embodiment, the rotor-stator structure can be configured to implement either a compound motor or a series motor, or both, if the rotor-stator structure is implemented within the electric motor, and is further configured to implement either a compound generator or a series generator, or both, if the rotor-stator structure is implemented within the electric generator.

In alternative embodiments, the first magnet structure and the second magnet structure each are multipole magnets, where the one or more magnet surfaces of the first magnet structure include a plurality of north poles and south poles, one of which is pointing in a first direction. The one or more magnet surfaces of the second magnet structure can also include a plurality of north poles and south poles, one of which is pointing in a second direction. The first and the second directions can differ by an angle between 150 to 180 degrees. In some cases, the first magnet structure and the second magnet structure include separate magnets, each of which has interfaces contiguous with other separate magnets without any intervening structure. In other cases, the first magnet structure and the second magnet structure include either one or more cylinder-shaped magnets each having a cylindrical surface or one or more cone-shaped magnets each having a conical surface, or both. Note that the one or more magnet surfaces can each include discrete regions of magnetization. Also, the first magnet structure and the second magnet structure each can include a magnet support configured to support the regions of magnetization at principal dimensions either at an acute angle to the axis or parallel to the axis, the magnet support being affixed to the shaft.

A rotor-stator structure in various embodiments can be implemented as a single magnet motor, which can include a shaft and a single magnet structure having one or more magnet surfaces and being affixed coaxially on the shaft so that the direction of polarization of the one or more magnet surfaces extend in one or more planes that each are substantially perpendicular to the axis. The rotor-stator structure for the single magnet motor also can include field pole members arranged coaxially to the axis. The field pole members can have flux interaction surfaces formed at one end of each of the field pole members and positioned adjacently to portions of the one or more magnet surfaces that confront the flux interaction surfaces, the flux interaction surfaces and the portions of the one or more magnet surfaces defining air gaps. The rotor-stator structure for the single magnet motor includes a flux-carrying member to complete a magnetic circuit through one or more of the field pole members and the single magnet structure. In some embodiments, the flux interaction surfaces are contoured to maintain a substantially uniform cross-section for each of the air gaps. For example, the substantially uniform cross-section can be an arc-shaped cross-section in a plane substantially perpendicular to the one or more magnet surfaces. The substantially uniform cross-section provides a substantially uniform thickness for each of the air gaps and increases flux interaction between the one or more magnet surfaces and the field pole members, thereby increasing output torque.

In a specific embodiment, the flux interaction surfaces each have a surface area dimensioned to generate maximum torque output, the surface area being dimensioned as a function of at least the distances between the field pole members to provide maximum magnetic coupling between the one or more magnet surfaces and the field pole members while at least minimizing leakage between the field pole members. In one embodiment, at least one of the field pole members is a substantially straight field pole member configured to provide a substantially straight flux path between the one end of each of the field pole members and the flux-carrying member. In some cases, each of the flux interaction surfaces further comprises a skewed flux interaction surface to skew field pole gaps between adjacent field pole members, thereby minimizing detent torque. In one embodiment, the single magnet structure is a cylindrical permanent magnet and the one or more magnet surfaces are cylindrical surface portions. In another embodiment, the single magnet structure is a conical permanent magnet and the one or more magnet surfaces are conical surface portions, wherein the conical permanent magnet is affixed on the shaft to face either one axial direction or the other axial direction.

A rotor-stator structure in various embodiments can be implemented as either a compound or series motor or generator that includes a first subset of conical magnets having first conical surfaces arranged axially on an axis of rotation such that the first conical surfaces face each other, and a first subset of first field pole members arranged coaxially to the axis and having flux interaction surfaces formed at the ends of the first field pole members and adjacent to portions of the first conical surfaces that confront the flux interaction surfaces, the flux interaction surfaces and the portions of the first conical surfaces defining first air gaps. The rotor-stator structure further includes a second subset of conical magnets having second conical surfaces arranged axially on the axis of rotation such that the second conical surfaces face each other, and a second subset of second field pole members arranged coaxially to the axis and having flux interaction surfaces formed at the ends of the second field pole members and adjacent to portions of the second conical surfaces that confront the flux interaction surfaces, the flux interaction surfaces and the portions of the second conical surfaces defining second air gaps. It also includes a shaft on which the first and the second subsets of conical magnets are affixed, the shaft defining the axis of rotation and extending through each of the first and the second subsets conical magnets. In one embodiment, the first subset of conical magnets is disposed in parallel with (e.g., are disposed within) the second subset of conical magnets to form either a compound motor or a compound generator. For example, the first subset of conical magnets can be disposed within the second subset of conical magnets. In another embodiment, the first subset of conical magnets is disposed in series with the second subset of conical magnets to form either a series motor or a series generator.

A rotor-stator structure in various embodiments can include one or more field pole members each including a central field pole member portion configured to accept one or more sets of windings, a first pole shoe coupled to the central field pole member portion, the first pole shoe including a first pole face configured to confront a first magnet, and a second pole shoe coupled to the central field pole member portion, the second pole shoe including a second pole face configured to confront a second magnet. The first pole face and the second pole face each include a flux interaction surface contoured to form an air gap having a substantially uniform cross-section. In one embodiment, the flux interaction surface is configured to form the substantially uniform cross-section as an arc-shaped cross-section in a plane substantially perpendicular to at least a surface portion on either the first magnet or the second magnet. In some cases, a number of normal vectors in the plane extend orthogonally between points on the flux interaction surface and points on the surface portion to define the arc-shaped cross-section, the normal vectors each having a substantially uniform length. In at least one instance, the substantially uniform cross-section provides a substantially uniform thickness for the air gap, the uniform thickness increasing flux interaction either between the first pole face and the first magnet or between the second pole face and the second magnet, or both, thereby increasing output torque.

In a specific embodiment, the flux interaction surface comprises a surface area dimensioned to generate maximum torque output, the surface area being dimensioned as a function of at least the distances between the field pole member and another field pole member to provide maximum magnetic coupling between the first magnet and the second magnet and the field pole member while at least minimizing leakage between the field pole member and the other field pole member. In an embodiment, at least one of the field pole members is a substantially straight field pole member configured to provide a substantially straight flux path between the first pole shoe and the second pole shoe. The flux interaction surface can further include a skewed flux interaction surface to skew a field pole gap between the field pole member and the other field pole member, thereby minimizing detent torque. The skewed flux interaction surface includes a first edge defining a first side of the field pole gap and a second edge defining a second side of another field pole gap, whereby the first edge and the second edge maintain angles that do not align with a direction of polarization of at least one of either the first magnet or the second magnet, wherein one first edge of the field pole member and one second edge of the other field pole member form the field pole gap. The flux interaction surface can be shaped to confront at least a portion of either a cylindrical permanent magnet or a conical permanent magnet.

A field pole member in various embodiments can be configured to either reduce or eliminate back-iron between the first pole shoe and the second pole shoe when a coil is wound about the field pole member, thereby decreasing magnetic losses as well as decreasing an amount of materials used to manufacture an electrodynamic machine. In at least one case, each of the first and the second pole shoes further comprises a transition region coupling each of the first and the second pole shoes at a nonorthogonal angle with the central field pole member portion to reduce reluctance for a flux path between the central field pole member portion and either the first or the second pole shoe, or both. The field pole member can further include laminations. For example, the field pole member can further include laminations such that a medial plane extending in an axial direction divides a quantity of the laminations approximately in half so that on one side of the medial plane, laminations generally decrease in at least one dimension as the laminations are positioned farther from the medial plane. The laminations can be formed from a substrate composed of a magnetically permeable material in configurations that reduce wastage of the magnetically permeable material. In at least one embodiment, the central field pole member portion further comprises an outer peripheral surface coextensive with a portion of a circle about an axis of rotation to decrease a volumetric dimension of the field pole member.

Figure 21A:
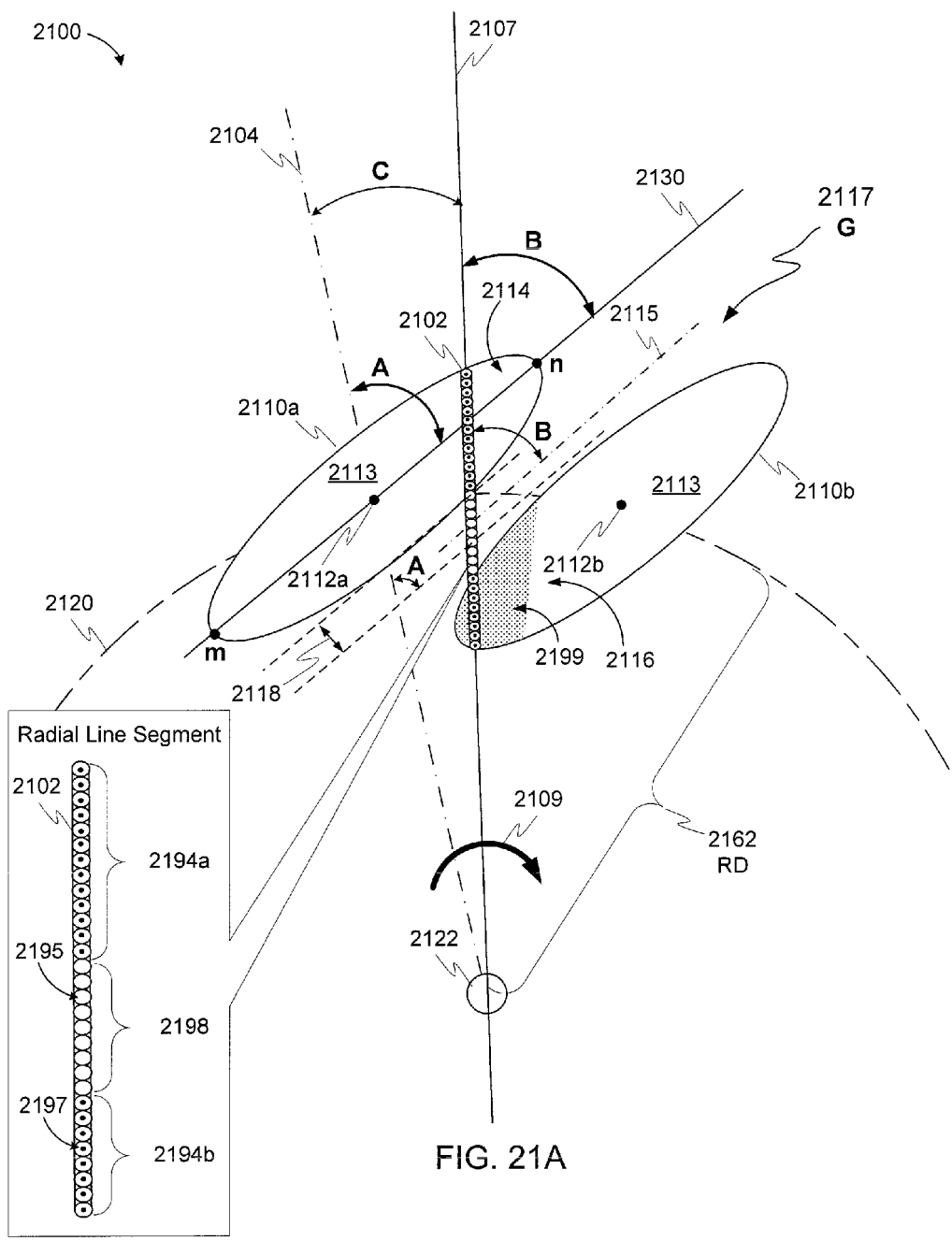
FIG. 21A illustrates an example of one implementation of an arrangement of field pole members to form a stator structure for electrodynamic machines, according to at least one embodiment of the invention.

FIG. 21A illustrates an example of one implementation of an arrangement of field pole members to form a stator structure for electrodynamic machines, according to at least one embodiment of the invention. Here, diagram 2100 is an end view showing a portion of a stator structure including field pole member 2110a and field pole member 2110b, both of which are coaxially positioned about a line, such as an axis 2122 of rotation for an axial-based electrodynamic machine. Further, field pole member 2110a and field pole member 2110b can include an exterior portion 2114 and an interior portion 2116, respectively. In at least one case, exterior portion 2114 can be an outer-most region of a field pole member, and can be located, for example, external to an arc 2120 and/or at a radial distance farthest from axis 2122, whereas interior portion 2116 can be an inner-most region of a field pole member that can be located, for example, internal to arc 2120 and/or at a radial distance nearest to axis 2122. In one embodiment, field pole member 2110b can be oriented with respect to field pole member 2110a to form an overlap portion, an example of which can be illustrated as overlap region 2199, whereby the overlap portion can be configured to include (e.g., intercept) a plane 2107, such as a reference plane, passing through axis 2122 of rotation. In a specific embodiment, field pole member 2110a can be oriented to intercept plane 2107 simultaneous (or substantially simultaneous) to the overlap portion associated with field pole member 2110b intercepting by plane 2107.

In view of the foregoing, a stator structure including field pole member 2110a and field pole member 2110b can be oriented to provide for a skewed field pole gap ("G") 2117, whereby one or more portions of skewed field pole gap 2117 can be formed at an angle "B" between plane 2107 and line 2115, as shown in FIG. 21A. Further, angle "B" of skewed field pole gap 2117 can be configured, for example, to form a skewed field pole gap 2117 that can reduce or prevent the number of rotation angles over which a plane 2107 extends from axis 2122 to an exterior boundary, without intercepting one or more field pole members. Further, the arrangement of field pole member 2110a and field pole member 2110b can ensure that radial line segment 2102 passes at least through overlap region 2199.

As shown, plane 2107 can include a radial line segment 2102. As used herein, the term "radial line segment" can generally refer, at least in one embodiment, to a portion of a plane, such as a line segment, that represents an orientation of a portion of the surface of a magnet, such as a conical magnet, in relation to field pole members, such as field pole members 2110a and 2110b. A radial line segment, such as radial line segment 2102, can represent a number of incremental magnet elements, which can be depicted as elements 2195 and 2197. Each of these elements can be composed of a volume, a surface area, or the like, of a surface of a magnet, such as a conical magnet surface. In at least one embodiment, the incremental magnet elements can each be composed of infinitesimally small units of volume or surface area that, for example, confront one or more pole face portions. The incremental magnet elements can have the same polarization, with at least a proportion of which being oriented toward pole faces (not shown) of the field pole members. Such pole faces, or portions thereof, can be formed in surfaces 2113. For example, one pole face (or a portion thereof) can be formed at or near exterior portion 2114 and another pole face (or a portion thereof) can be formed at or near interior portion 2116. In at least one embodiment, the incremental magnet elements, such as elements 2195 and 2197, can represent—conceptually or otherwise—a region of peak or highest magnet flux (e.g. relative to other parts of a magnet) that can be associated with, for example, a pole of a magnet. In at least one example, the peak amounts of magnet flux can originate from a magnet having symmetrical properties adjacent to a line segment on the magnet that corresponds to radial line segment 2102. Note that the various embodiments are not limited to symmetric magnets. As is shown, radial line segment 2102 includes elements 2195 and 2197. Here, elements 2195 represent incremental magnet elements that do not face magnetically permeable material (e.g., they do not face a field pole member and/or pole face), whereas elements 2197 (shown with "centered dots") represent incremental magnet elements that face magnetically permeable material (e.g., magnetic flux can emanate from elements 2197 at a direction normal to the surface of each element 2197). As such, a group 2194 of elements 2197 face field pole member 2110a, a group 2198 of elements 2195 face skewed field pole gap 2117, and a group 2194b of elements 2197 faces field pole member 2110b.

Accordingly, the portion of the stator structure shown in FIG. 21A can reduce detent, according to at least one embodiment. In a specific embodiment, the portion of the stator structure shown in FIG. 21A can also reduce the peak magnitudes of detent (e.g., detent torque), and can optionally distribute the detent torque over rotational positions. Note, too, that skewed field pole gap 2117 can be configured to have a width 2118, such as a uniform width or the like, so that the leakage across gap "G" between field pole member 2110a and field pole member 2110b is at or near a sufficiently reduced amount for a specific performance of an electrodynamic machine.

In the example shown, field pole member 2110a and field pole member 2110b can conceptually include respective medial lines 2112a and 2112b, both of which can be positioned to coincide (or substantially coincide) on an arc 2120 located at a radial distance ("RD") 2162 from axis 2122. In this example, medial lines 2112a and 2112b can be parallel (or are substantially parallel) to axis 2122 and lie in a medial plane, such as medial plane 2130, which includes medial line 2112a. Here, medial lines 2112a and 2112b each appear as a point in FIG. 21A, as these lines extend out of the page in a parallel to axis 2122 at least in one embodiment. Note that, in some embodiments, medial plane 2130 (as well as other medial planes not shown) can be positioned to exclude axis 2122 of rotation. Field pole member 2110a and field pole member 2110b can be positioned with respect to a reference plane, such as planes 2104 and 2107. Here, field pole member 2110a can be oriented so that medial plane 2130 and planes 2104 form an angle A (or an equivalent angle), which is sufficient to form skewed field pole gap 2117 at angle B, where B is equal to (or is substantially equal to) the angle of A minus the angle of C (e.g., B=A−C). C represents the angle between planes 2104 and 2107.

To illustrate the functionality of the stator structure portion shown in FIG. 21A, consider that radial line segment 2102 represents a series of magnet elements along a line segment that are associated with a large amount of magnet flux (e.g., a peak amount of magnet flux generated by each magnet element) that originates from a magnet (not shown). Further consider that radial line segment 2102 sweeps in an angular direction 2109, which is shown to be clockwise. At a first point in time, radial line segment 2102 coincides with plane 2104, and, thus, is intercepted by field pole member 2110a. In this case, group 2194b of elements 2197 is absent from the radial line segment (not shown), and these elements can be illustrated as elements 2195. At a second point in time, radial line segment 2102 sweeps clockwise, transitioning from intercepting both field pole members 2110a and 2110b, as shown, to intercepting field pole member 2110b. In this case, group 2194a of elements 2197 is absent from the radial line segment (not shown), and these elements can be shown as elements 2195. Overlap region 2199 can thereby ensure that radial line segment 2102 does not fall within a field pole gap, which otherwise might contribute to detent. That is, overlap region 2199 can be configured to position magnetically permeable material of field pole members 2110a and 2110b to face no less than one or more elements 2197 as radial line segment 2102 sweeps an entire revolution, so long as other field pole member similar to 2110a and 2110b are similarly situated about axis 2122. Note that surfaces 2113 can include portions that constitute pole faces (not shown), or portions thereof, which can be configured to confront a surface of a magnet, such as a conical magnet or a cylindrical magnet. For example, at least one of surfaces 2113 can be configured to be coextensive with an acute angle (e.g., an angle less than 90 degrees) in accordance with at least one embodiment. Note, too, that radial line segment 2102 is not limited to being orthogonal to axis 2122. In at least one instance, radial line segment 2102 can be at an angle to axis 2122 such that rotation in direction 2109 sweeps out a conical sectional (e.g., in association with the conical surface portion of a conical magnet).

As used herein, the term "overlap" can generally refer, at least in one embodiment, to a portion of a second field pole member that can interpose between, for example, an axis 2122 of rotation and a first field pole member. In one instance, a portion of field pole member 2110b that is positioned within a conceptual triangular area defined by point "m," point "n," and the axis of rotation can form an overlap portion. An overlap portion can prevent a plane 2107 that includes radial line segment 2102 from extending beyond an exterior boundary of, for example, the stator structure without intercepting a field pole member. As used herein, the term "medial" can generally refer, at least in one embodiment, to a plane (i.e., a medial plane) that longitudinally divides a field pole member into two parts, whereby the two parts can be equivalent (or substantially equivalent) parts. For example, a medial plane can bisect the field pole member into two halves. In at least one instance, a medial plane can extend longitudinally in parallel (or substantially parallel) to a height dimension of a field pole member (see e.g., FIG. 21E), or along (e.g., within 45 degrees) the same dimension. In a specific embodiment, a medial line can be coincident with a centerline passing lengthwise through an approximate center of a field pole member, regardless of whether the field pole member is straight. An approximate center of a field pole member can be determined by the center of a cross-sectioned area that is perpendicular to, for example, a longitudinal dimension (e.g., a length of a field pole member extending from pole face to pole face). In a specific embodiment, the approximate center of a field pole member can be an aggregate of the centroids of each of the cross-sectioned areas.

In various embodiments, other attributes of field pole members 2110a and 2110b can be modified to influence the functionality and/or structure of a stator structure to form a suitable skewed field pole gap. For example, while field pole members 2110a and 2110b are represented as having elliptical cross-sections, field pole members 2110a and 2110b can have other cross-sectional shapes. For instance, field pole members 2110a and 2110b can have triangular cross-sections, rectangular cross-sections, rhomboidal cross-sections, trapezoidal cross-sections, crescent-shaped cross-sections and/or surfaces, and any other shape or modification thereof. Further, while field pole members 2110a and 2110b are represented as having symmetrical sides and/or lateral portions, field pole members 2110a and 2110b can have asymmetrical sides and/or lateral portions. In one example, the sides and/or lateral portions of field pole members 2110a and 2110b can have sides shaped to have different dimensions, such as different height dimensions. As another example, one side can be convex while another side can be concave. In various embodiments, field pole members 2110a and 2110b can be formed as monolithic components composed of magnetic permeable material, or can be formed of constituent elements, such as laminates. In some embodiments, field pole members 2110a and 2110b can be formed in accordance with U.S. Nonprovisional application Ser. No. 11/707,817, entitled "Field Pole Members and Methods of Forming Same for Electrodynamic Machines," published on Sep. 6, 2007 as U.S. Publication No. 20070205675 A1. In at least one embodiment, field pole members 2110a and 2110b can be formed to have uniform cross-sections extending, for example, along a length dimension from pole shoe to pole shoe. In a specific embodiment, field pole members 2110a and 2110b can be formed to have substantially uniform cross-sections extending, for example, along a length dimension (e.g., an axial length) from pole face to pole face. In at least one embodiment, different field pole members can be positioned at different radial distances from an axis of rotation (not shown). In one embodiment, field pole members 2110a and 2100b can be referred to as adjacent field pole members, the structure of which can be replicated about axis of rotation 2122.

Figure 21B:
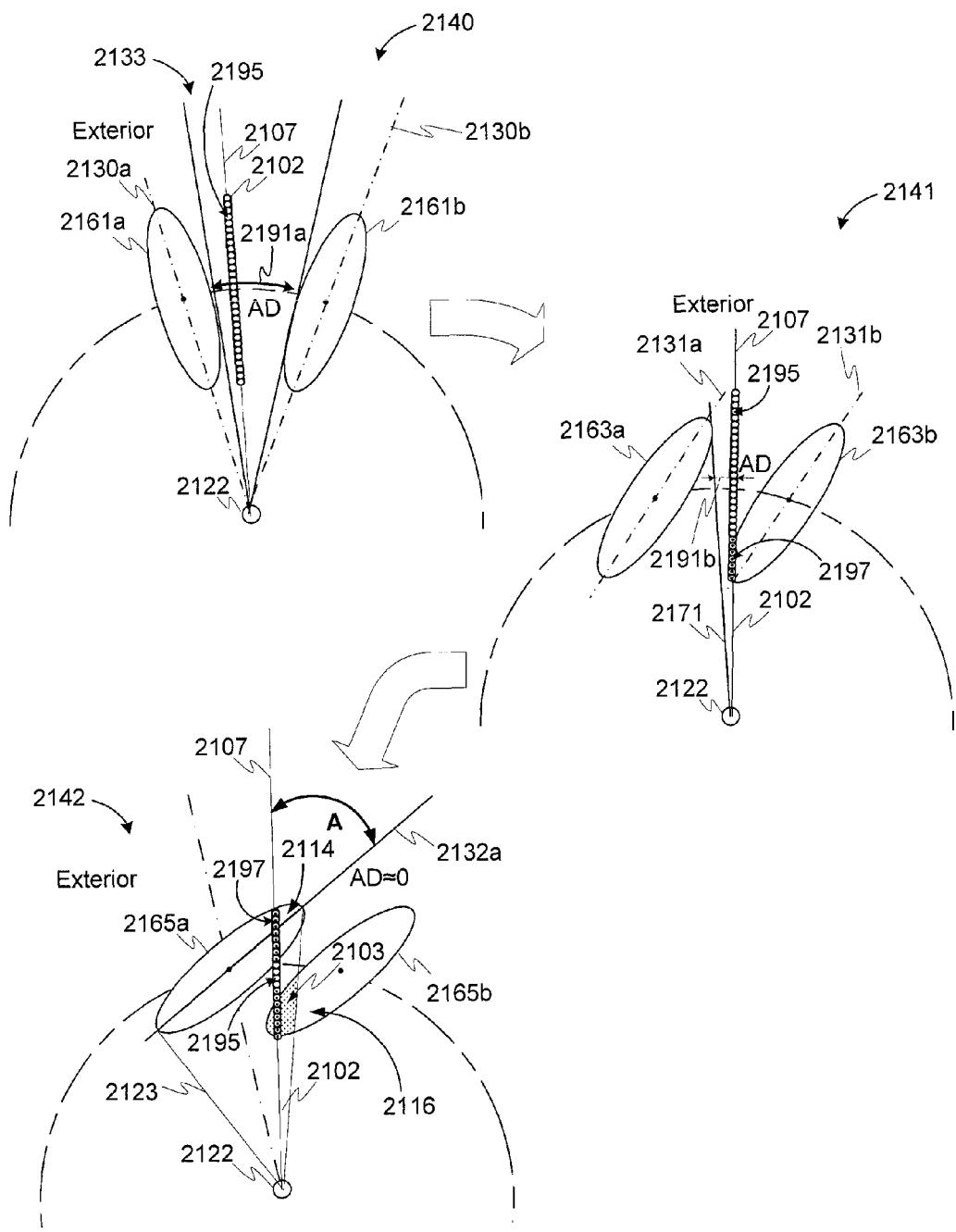
FIG. 21B illustrates examples of various implementations of field pole members to form various stator structures for electrodynamic machines, according to various embodiments of the invention.

FIG. 21B illustrates examples of various implementations of field pole members to form various stator structures for electrodynamic machines, according to various embodiments of the invention. Here, diagram 2140 is an end view showing a portion of a stator structure including field pole member 2161a and field pole member 2161b, both of which are coaxially positioned about axis 2122 of rotation. Further, field pole member 2161a and field pole member 2161b can respectively include medial planes 2130a and 2130b. As shown, medial planes 2130a and 2130b extend through and include axis 2122 of rotation. As such, the portion of a stator structure that is shown in diagram 2140 can establish an effective field pole gap 2133 in which a plane 2107, which includes radial line segment 2102, can extend through an arc segment, as shown by an angular distance ("AD") 2191a, to an exterior region or boundary. As used herein, the term "an effective field pole gap" can generally refer, at least in one embodiment, to a gap as determined by an angular distance of an arc segment (or an arc length) in the context of a radial line segment extending into an exterior boundary. In some embodiments, an effective field pole gap can be refer to a sector of a circle bounded by two radii and an arc segment, such as 2191a, whereby a radial line segment, such as radial line segment 2102, can extended without intersecting a field pole member (i.e., no incremental magnet elements associated with the radial line segment confront a pole face, or portion thereof). Note that in this example, each of the incremental magnet elements of radial line segment 2102, such as elements 2195, is attracted toward field pole 2161a (e.g., due to the illustrated proximity of radial line segment 2102), and, thus, can contribute to a torque in that direction. Since radial line segment 2102 can represent the highest flux region of, for example, a symmetric magnet (not shown), when the torque contributions (e.g., the incremental torque magnitudes and directions) of each of the magnet incremental elements over the entire surface of the magnet (or series of magnets in rotor hub structure) are summed, the net torque can be in a direction toward field pole 2161a. The peak amplitude of the torque increases as radial line segment 2102 rotates toward the center of the angular distance ("AD") 2191a, and, then changes to zero when radial line segment 2102 is at (½)AD (i.e., half the angular distance 2191a). This torque profile continues to a similar peak amplitude, with the torque being directed toward field pole 2161b as it continues to rotate (e.g., in the clockwise direction).

Diagram 2141 is an end view showing a portion of another stator structure that includes field pole member 2163a and field pole member 2163b, both of which are coaxially positioned about axis 2122 of rotation. Further, field pole member 2163a and field pole member 2163b can respectively include medial planes 2131a and 2131b, neither of which is configured—at least in this example—to extend through and include axis 2122 of rotation. As such, the portion of the stator structure that is shown in diagram 2141 can form an effective field pole gap width, as defined by a plane that includes radial line segment 2102 and a plane 2171. Note that radial line segment 2102 and plane 2171, and arc segment 2191b establish a sector of a circle representative of the effective field pole gap. As such, plane 2107, which includes radial line segment 2102, can extend through an arc segment, as shown by an angular distance ("AD") 2191b, to an exterior region or boundary from axis 2122. Accordingly, field pole member 2163a and field pole member 2163b can be oriented to form a skewed field pole gap. Note that angular distance ("AD") 2191b is less than angular distance ("AD") 2191a, which can reduce detent (i.e., the incremental magnet elements 2195 face no field pole members for a shorter duration of time (and/or over fewer rotational positions) in diagram 2141 than in diagram 2141). Thus, the orientation of a skewed field pole gap (and/or a skewed field pole gap angle)—in whole or in part—can be configured to modify the angular distance of an arc segment through which radial line segment 2102 can extend to an exterior boundary to, for example, reduce detent. Further, skewed field pole gap (and/or a skewed field pole gap angle) can be configured to include an overlap region, as is shown next in diagram 2142, to reduce peak detent torque amplitudes. Note that the incremental magnet elements 2195 that face the field pole gap (e.g., do not confront a field pole face) can generate a radial torque. As such, these magnet elements can be attracted to the nearest high permeability surface (i.e., the nearest field pole member). Note, too, that the detent peak amplitude can be reduced if a sufficient quantity of incremental magnet elements is attracted to field pole 2163b sooner (e.g., in few rotation angles) than in the arrangement shown in diagram 2141. In this field pole member arrangement, the detent torque amplitude may spread out, thereby distributing detent torque, as well as elements 2195, over more rotational positions. In some cases, this is because the skewing of field pole members can enable the incremental magnet elements to face the field pole gap at angles of rotation different than in the arrangement shown in diagram 2141. The portion of the stator structure shown in diagram 2141 can thereby reduce the peak amplitude of detent and "smear out the waveform" (i.e., distribute detent torque amplitude over more rotational positions than is the case with the in the arrangement shown in diagram 2141).

Diagram 2142 is an end view showing a portion of yet another stator structure that includes field pole member 2165*a* and field pole member 2165*b*, both of which are coaxially positioned about axis 2122. Further, field pole member 2165*a* includes medial planes 2131*a*, which is not configured—at least in this example—to extend through and include axis 2122. The portion of the stator structure that is shown in diagram 2142 does not form an effective field pole gap width as a result—in whole or in part—of the forming an overlap portion 2103. Thus, the angular distance ("AD") of an arc segment is zero or approximately zero. In this example, overlap portion 2103 is formed by interposing an interior portion 2116 between exterior portion 2114 and axis 2122, for example, within a triangular-shaped area 2123. Thus, overlap portion 2103 provides for transitioning radial line segment 2102 from field pole member 2165*a* to field pole member 2165*b* without a plane 2107, which includes radial line segment 2102, extending to an exterior boundary. In the example shown in diagram 2142, incremental magnet elements that overlap either field pole face, such as elements 2197, do not generate incremental torque. Rather, other incremental magnet elements that face the gap between the field poles members, such as elements 2195, can contribute to the generation of incremental torques. Again, the incremental torques from incremental magnet elements can be summed to determine the net detent torque. The result of this summation can depend on the shape of the field pole face (not shown), the total magnet size (not shown), and the like. Generally, at least in some embodiments, the peak amplitude of the detent waveform can decrease for the field pole member arrangement in diagram 2142, at least in comparison with the arrangement in diagram 2140, which includes non-skewed field pole members.

Figure 21C:
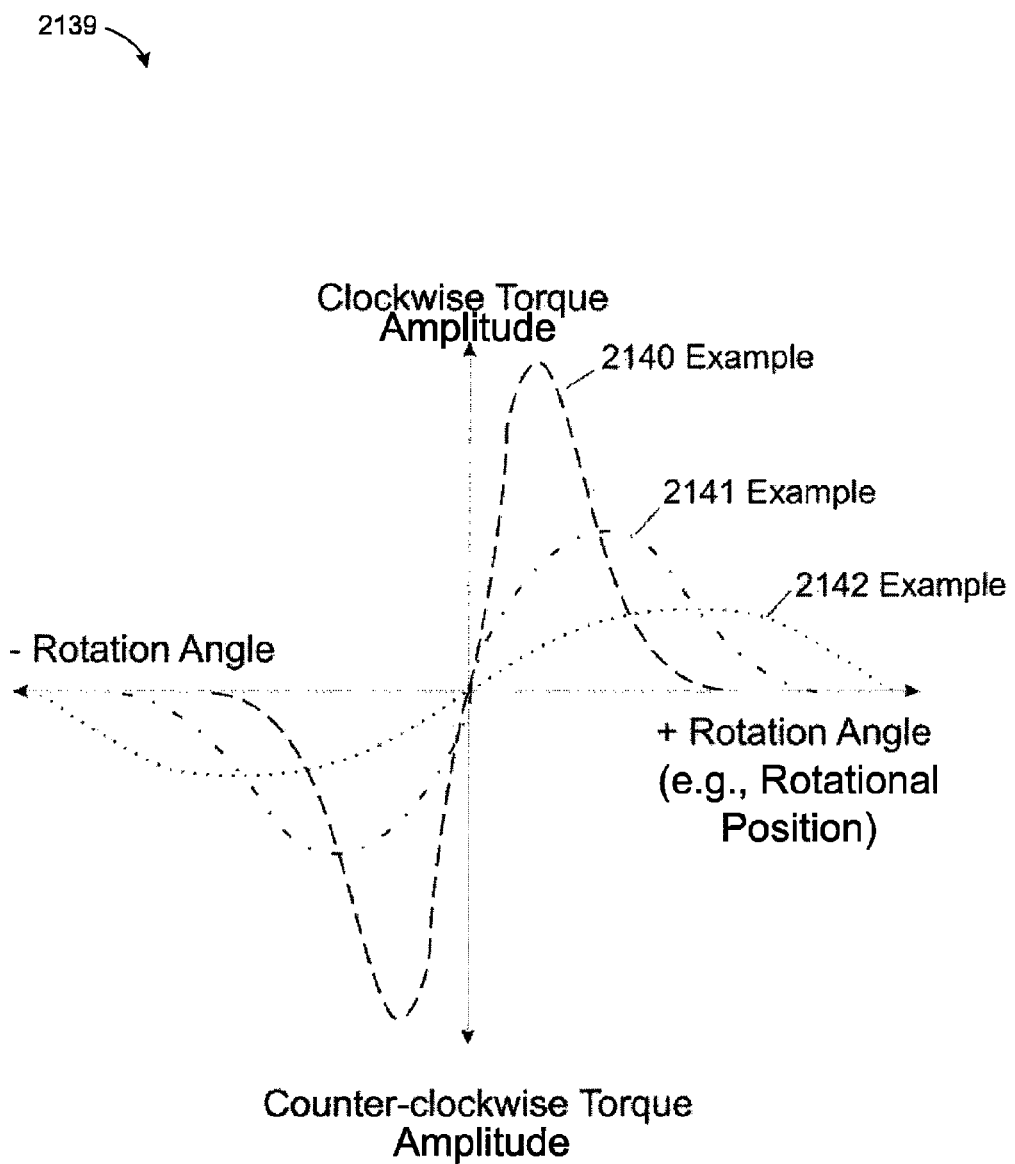
FIG. 21C depicts approximate detent torque amplitudes as a function of various rotation angles for the field pole arrangements shown in FIG. 21B, according to at least one embodiment of the invention.

FIG. 21C depicts approximate detent torque amplitudes as a function of various rotation angles for the field pole arrangements shown in FIG. 21B, according to at least one embodiment of the invention. Diagram 2139 illustrates that the field pole member arrangement in diagram 2140, for example, can produce higher torque amplitudes due to detent than the other field pole member arrangements in diagrams 2141 and 2142. In at least one embodiment, the other field pole member arrangements in diagrams 2141 and 2142 can respectively reduce the detent torque amplitudes for a given rotation angle (or a range of rotation angles). In one or more embodiments, the other field pole member arrangements in diagrams 2141 and 2142 also can respectively distribute elements 2195, which do not face a field pole member, over an increased number of rotation angles (or rotational positions), which, in turn, can facilitate the reduction in detent torque amplitude.

FIG. 21D illustrates an example of a field pole arrangement that can facilitate the distribution of incremental magnet elements over additional rotation angles, according to at least one embodiment of the invention. Diagrams 2140*a* and 2142*a* represent at least a portion of field pole member arrangements in diagrams 2140 and 2142, respectively, in FIG. 21B. As shown in diagram 2140*a*, radial line segment 2102 of FIG. 21B can sweep through rotational positions RP1, RP2, and RP3 as radial line segments 2102*a*, 2102*b*, and 2102*c*, respectively. Similarly, radial line segment 2102 of FIG. 21B can sweep through rotational positions RP1, RP2, and RP3 as radial line segments 2102*d*, 2102*e*, and 2102*f*, respectively, as shown in diagram 2142*a*. The field pole arrangement in diagram 2140*a* shows that rotational position RP2 includes all of the elements 2197 that face a field pole member, such as field pole member 2161*a*, for the three rotational positions. As such, the elements 2195 at rotational positions RP1 and RP3 can contribute to a corresponding amount of detent torque amplitudes. By contrast, the orientation of field pole member 2165*a* distributes elements 2195 and 2197 over more rotational positions, which, in turn, can correspond to a distribution of detent torque amplitudes over a larger range of rotational positions (rotation angles). Diagram 2142*b* illustrates a variant of diagram 2142*a* in which the cross section of the field pole members is triangular (or substantially triangular), such as field pole members 2189*a* and 2189*b*. Here, radial line segment 2102 of FIG. 21B can sweep through rotational positions RP1, RP2, and RP3 as radial line segments 2102*g*, 2102*h*, and 2102*i*, respectively, as shown in diagram 2142*b*. The field pole arrangement in diagram 2142*b* shows that the triangular cross sections and/or the positioning of field pole members 2189*a* and 2189*b* can increase the number of elements 2197 for individual rotational positions, which, in turn, can correspond to a distribution and/or a reduction of detent torque amplitudes over a larger range of rotational positions (rotation angles).

Figure 21E:
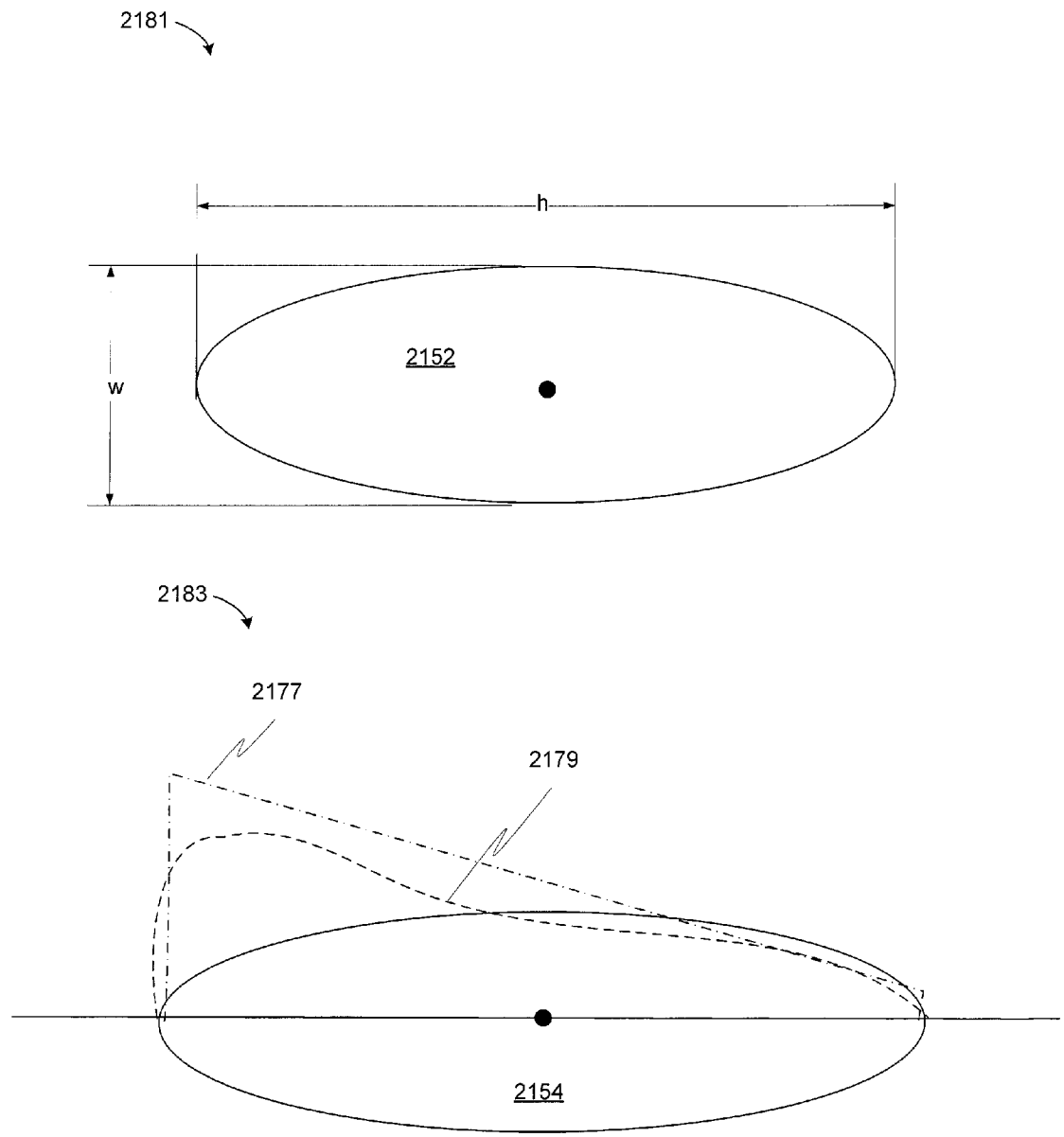
FIG. 21E depicts attributes that can influence detent reduction by a stator structure, according to various embodiments of the invention.
Figure 23:
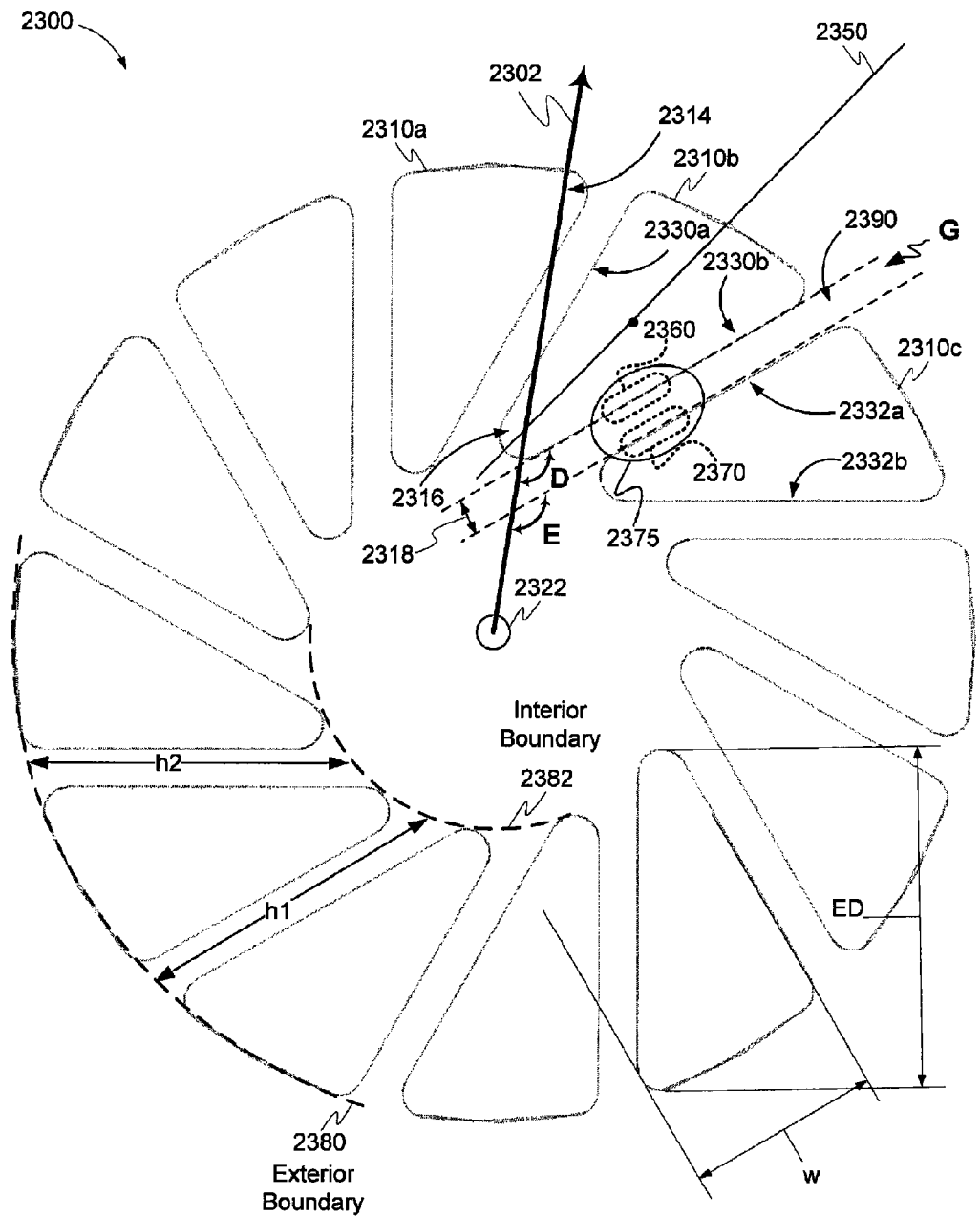
FIG. 23 illustrates an example of an implementation of field pole members for forming a stator structure, according to at least one embodiment of the invention.
Figure 24:
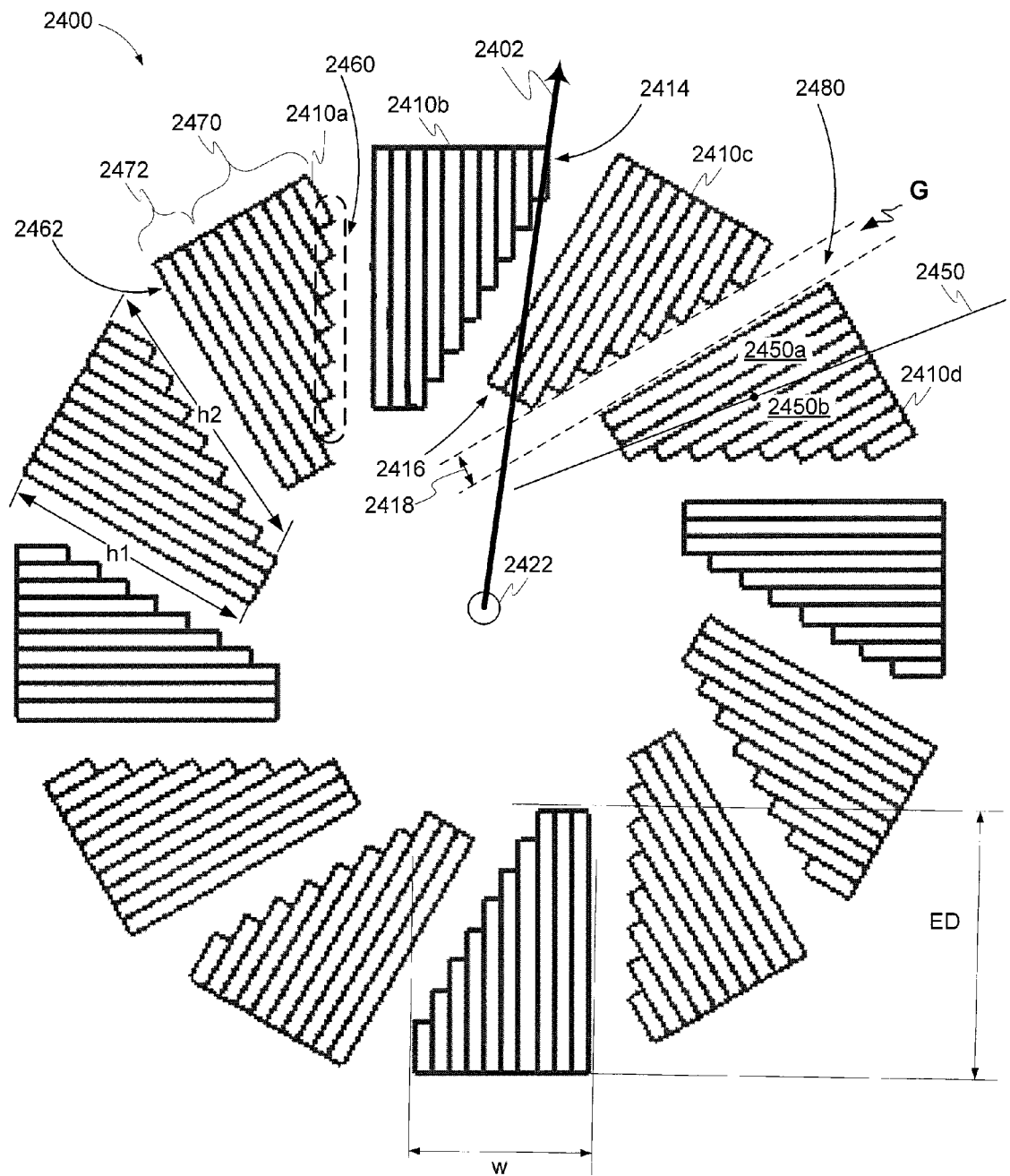
FIG. 24 illustrates an example of another implementation of field pole members for forming a stator structure, according to another embodiment of the invention.

FIG. 21E depicts attributes that can influence detent reduction by a stator structure, according to various embodiments of the invention. Here, diagram 2181 depicts a cross-section 2512 of a field pole member having a height dimension, h, which characterizes an elongated dimension ("ED") of cross section 2512. Cross-section 2152 also has a width dimension, w, where w<h. Other examples of elongated dimensions ("ED") and widths ("w") are depicted in FIGS. 23 and 24. Both the height and width dimensions can be modified to, for example, form an overlap portion and/or a skewed field pole gap, at least according to one embodiment. In at least some embodiments, an elongated dimension can be positioned to confront an area on a surface that is coextensive (or is substantially coextensive) with an acute angle with an axis of rotation so as to confront, for example, a conical magnet structure. To illustrate, consider that the line segment between point m and point n for field pole member 2210 (FIG. 21) coincides with an elongated dimension. Further, the elongated dimension can be positioned at an angle, such as angle A, with a plane that includes the axis of rotation, such as plane 2104. In at least one example, the angle can be configurable to modify a number of rotational positions over which the elongated cross section confronts a pole region of a conical magnet. The pole region can be oriented parallel (or substantially parallel) to the plane that includes the axis of rotation. In another example, the angle can be configurable to distribute detent torque over the number of rotational positions.

Diagram 2183 depicts a cross-section 2514 of a field pole member being configurable to include asymmetric sides. For example, a side 2177 of cross-section 2154 can have triangular shape, whereas a side 2179 of cross-section 2154 can have a contoured shape that can either be convex or concave. Note that modifying either side of cross-section 2154 can influence the formation of an overlap portion and/or a skewed field pole gap, at least according to one embodiment.

Figure 22:
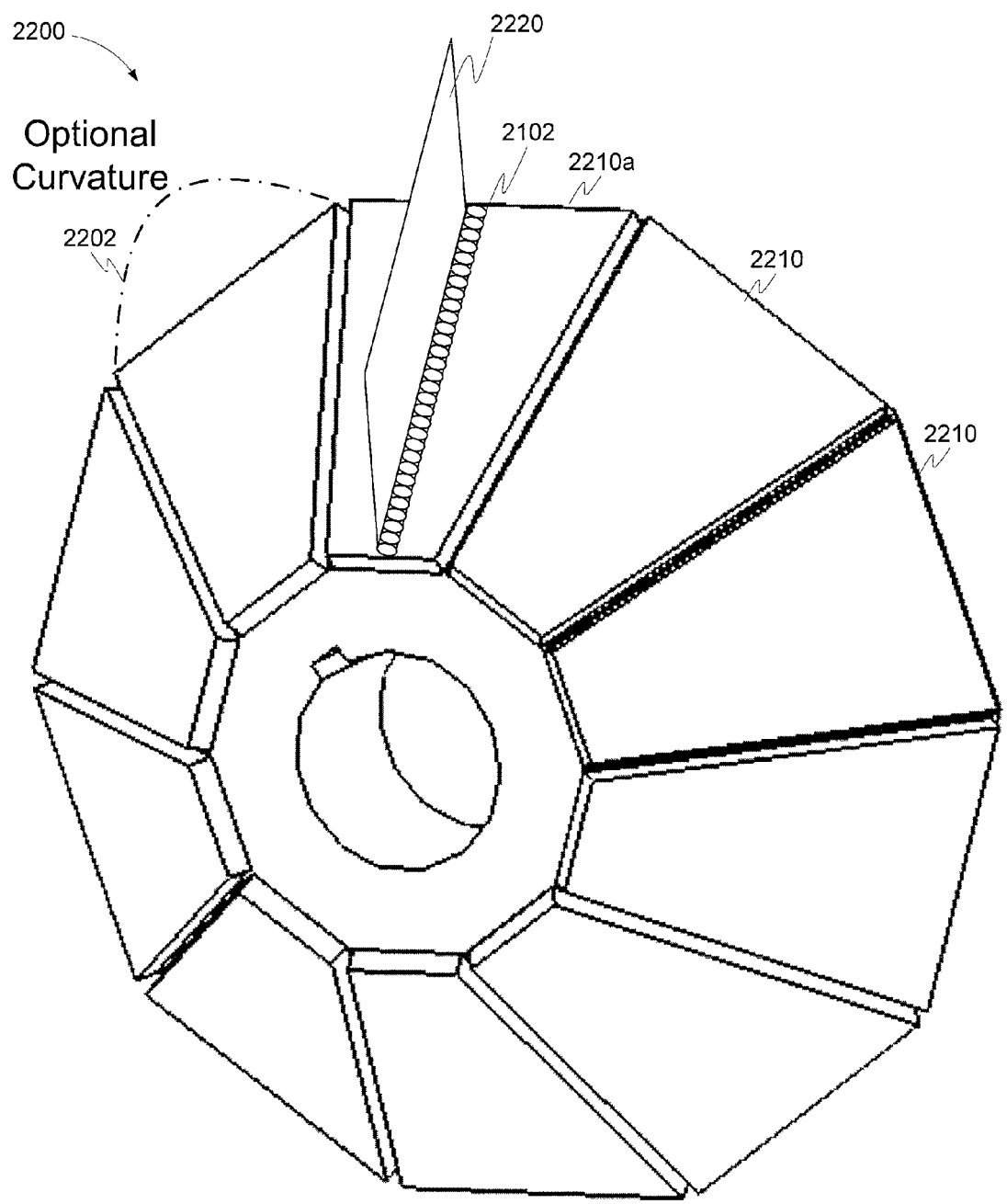
FIG. 22 depicts an example of a conical magnet that a stator structure can be configured to confront, according to at least one embodiment of the invention.

FIG. 22 depicts an example of a conical magnet that a stator structure can be configured to confront, according to at least one embodiment of the invention. Here, conical magnet 2200 is shown to be composed of magnet portions 2210, which can be substantially flat or can have a bevel or curvature, such as shown by arc 2202. As shown, a reference plane 2220 can include or coincide with a radial line segment 2102 of FIG. 21A, which can be representative of incremental magnet elements disposed, for illustration purposes, within a pole region associated with a surface of conical magnet 2200, such as magnet portion 2210a, with polarization (e.g., flux) in the direction away from the surface of the magnet. When conical magnet 2200 is integrated as a rotor that operates with a stator structure, the incremental magnet elements represented by radial line segment 2102 can be configured so that some portion of the elements confront pole faces of one or more field pole members (e.g., including an overlap portion) during rotation.

FIG. 23 illustrates an example of an implementation of field pole members for forming a stator structure, according to at least one embodiment of the invention. Here, diagram 2300 is an end view showing a portion of a stator structure including field pole members, including field pole members 2310a, 2310b, and 2310c, each of which can be coaxially positioned about axis 2322 of rotation. Field pole members 2310a, 2310b, and 2310c can have substantially triangular-shaped cross-sections having differently-shaped sides, as shown. Further, field pole member 2310a and field pole member 2310b can include an exterior portion 2314 and an interior portion 2316, respectively. In one embodiment, field pole member 2310b can be oriented with respect to field pole member 2310a to form an overlap portion (not shown) of field pole member 2310b at interior portion 2316. The overlap portion can be configured to include (e.g., intercept) a plane 2302, such as a reference plane, and/or a radial line passing through axis 2322 of rotation. In a specific embodiment, field pole member 2310a can be oriented to intercept plane 2302 simultaneous (or substantially simultaneous) to the overlap portion (not shown) of field pole member 2310b intercepting plane 2302. Medial plane 2350 is representative of an example of a medial plane that passes through a field pole member, such as field pole member 2310b, to form a first part and a second part. In various embodiments, medial plane 2350 excludes axis 2322. In at least one embodiment, one or more of the field pole members shown in diagram 2300 can be active field pole members.

Field pole members 2310a, 2310b, and 2310c are each shown in this example to include asymmetric sides. For example, field pole member 2310b can include a first side 2330a and a second side 2330b, and field pole member 2310c can include a first side 2332a and a second side 2332b. Here, first sides 2330a and 2332a are associated with a first dimension, and second sides 2330b and 2332b are associated with a second dimension. In the example shown, the first dimension can be represented by a first height, "h1," which extends between an exterior boundary 2380 and an interior boundary 2382, whereas the second dimension can be represented by a second height, "h2," which extends between exterior boundary 2380 and interior boundary 2382. The first height, h1, is less than the second height, h2, thereby making first sides 2330a and 2332a asymmetric to second sides 2330b and 2332b. Note that field pole members 2310a, 2310b, and 2310c can each be associated with an elongated dimension, ED, and a width, w, according to one embodiment of the invention.

In at least one embodiment, the field pole members shown in FIG. 23 can be oriented to form a skewed field pole gap ("G") 2390. In particular, an active field pole member 2310b can include a side surface portion 2360 oriented at a first angle, D, from a reference plane 2302, and another active field pole member 2310c can include a side surface portion 2370 being oriented at a second angle, E, from reference plane 2120. Thus, side surface portion 2360 and side surface portion 2370 can form, for example, a skewed field pole gap portion 2375. Note that skewed field pole gap portion 2375 can extend a distance equivalent to either the first height or the second height, or both. In a specific embodiment, skewed field pole gap portion 2375 can have a uniform width 2318. In one embodiment, first angle, D, and second angle, E, are the same (or are substantially equivalent) to form skewed field pole gap angle, which can be shown as either angle D or E. Regardless, skewed field pole gap portion 2375 and/or skewed field pole gap 2390 can be located at an angle that prevents a plane or a radial line 2302 from extending from axis 2322 to exterior boundary 2380. Note that each of the sides of the triangular-shaped cross-sections shown in FIG. 23 can be sized differently, according to one embodiment.

FIG. 24 illustrates an example of another implementation of field pole members for forming a stator structure, according to one embodiment of the invention. FIG. 24 illustrates an example of another implementation of field pole members to form a stator structure for electrodynamic machines, according to another embodiment of the invention. Here, diagram 2400 is an end view showing a portion of a stator structure including field pole members, including field pole members 2410a, 2410b, 2410c, and 2410d, each of which are coaxially positioned about axis 2422 of rotation. The field pole members shown in FIG. 24 can have substantially triangular-shaped cross-sections having differently-shaped sides, as shown, and can be composed of any number of laminates. Further, field pole member 2410b and field pole member 2410c can include an exterior portion 2414 and an interior portion 2416, respectively. In one embodiment, field pole member 2410c can be oriented with respect to field pole member 2410b to form an overlap portion (not shown) of field pole member 2410b at interior portion 2416. The overlap portion can be configured to include (e.g., intercept) a plane and/or a radial line 2402, such as a reference plane, passing through axis 2422 of rotation. In a specific embodiment, field pole member 2410b can be oriented to intercept a radial line 2402 simultaneous (or substantially simultaneous) to the overlap portion of field pole member 2410b intercepting radial line 2402. Medial plane 2450 is representative of an example of a medial plane that passes through a field pole member, such as field pole member 2410d, to divide field pole member 2410d into a first part 2450a and a second part 2450b. In various embodiments, medial plane 2450 excludes axis 2422. In at least one embodiment, one or more of the field pole members shown in diagram 2400 can be active field pole members. Medial plane 2450 can be at angle (e.g., with respect to a radial line) that does not include axis 2422. Note that field pole members 2410a, 2410b, 2410c, and 2410d can each be associated with an elongated dimension, ED, and a width, w, according to one embodiment of the invention.

Field pole members 2410a, 2410b, 2410c, and 2410d are each shown in this example to include asymmetric sides. For example, field pole member 2410a can include a first side 2462 and a second side 2460. Here, first side 2462 can be represented by a first height, "h1," and second side 2460 can be represented by a second height, "h2." As shown, the first height, h1, is shorter than the second height, h2, thereby making first side 2462 asymmetric to second side 2460. Further, field pole member 2410a can include first side 2462 composed of a first subset 2472 of laminates, each laminate having substantially uniform heights (e.g., extending between an exterior boundary and an interior boundary). Field pole member 2410a can also include second side 2460 composed of a second subset 2470 of laminates having multiple heights (e.g., extending between an exterior boundary and an interior boundary). In at least one embodiment, the field pole members shown in FIG. 24 can be oriented to form a skewed field pole gap ("G") 2480. In particular, an active field pole member 2410c can include a first side oriented to confront an adjacent second side of another active field pole member 2410d. Note that skewed field pole gap 2480 can have a uniform width 2418. In at least one embodiment, first subset 2472 of laminates need not include laminates of uniform height, and second subset 2470 of laminates need not include different heights for the laminates.

Figure 25:
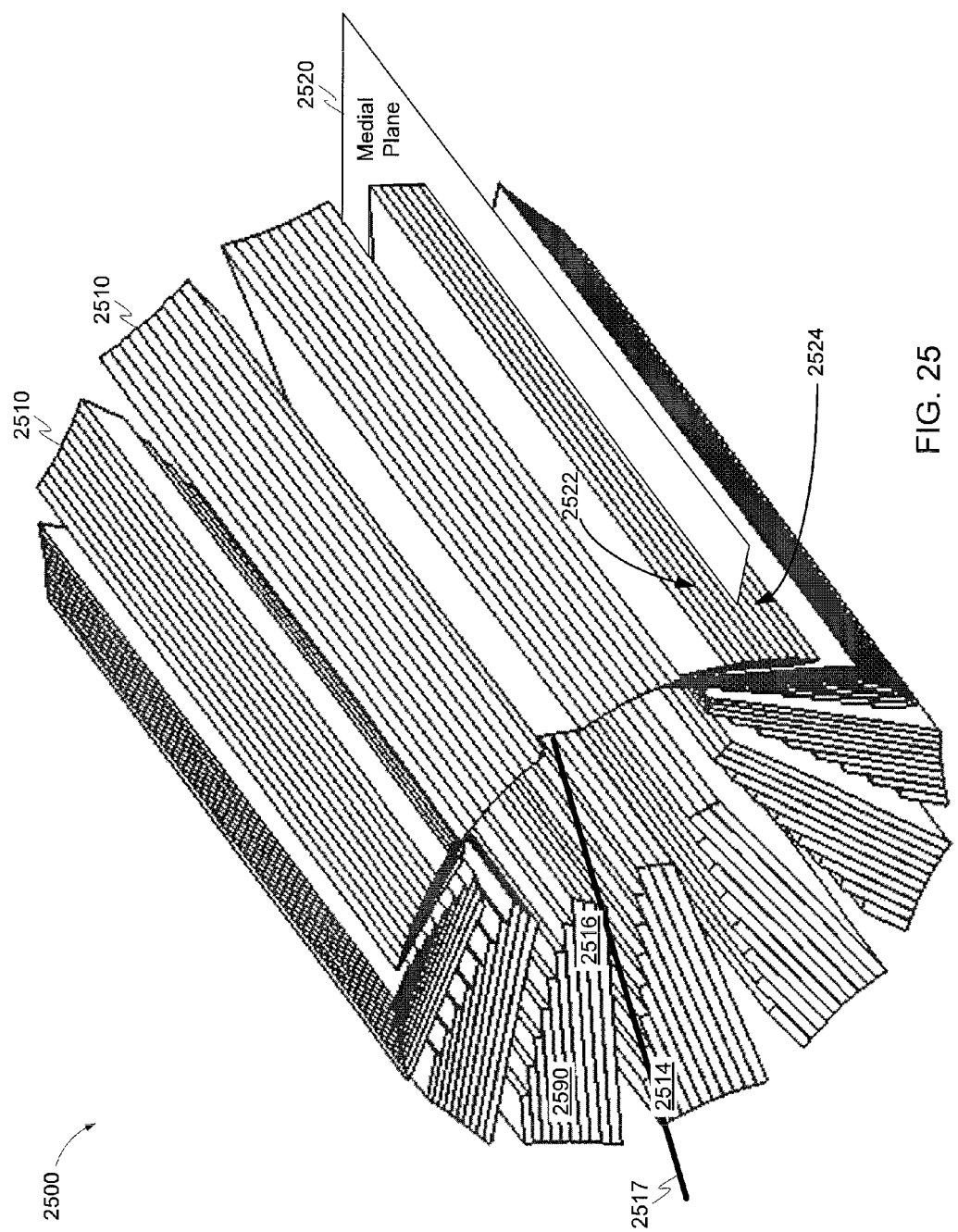
FIG. 25 is a perspective view of a stator structure for electrodynamic machines, according to one embodiment of the invention.

FIG. 25 is a perspective view of a stator structure for electrodynamic machines, according to one embodiment of the invention. Here, diagram 2500 is an perspective view showing a stator structure including field pole members, including field pole members 2510, each of which are coaxially positioned about axis of rotation (not shown). The field pole members shown in FIG. 25 can have substantially triangular-shaped cross-sections composed of a number of laminates. Further, field pole members 2510 can include pole faces 2590 configured to confront a conical magnet. As shown, medial plane 2520 can be representative of an example of a medial plane that passes through a field pole member 2510 to form a first part 2522 and a second part 2524. Also shown, is a radial line 2517 associated with a plane passing through the axis of rotations, whereby the radial line 2517 intercepts a first pole face portion 2516 and a second pole face portion 2514.

Figure 26:
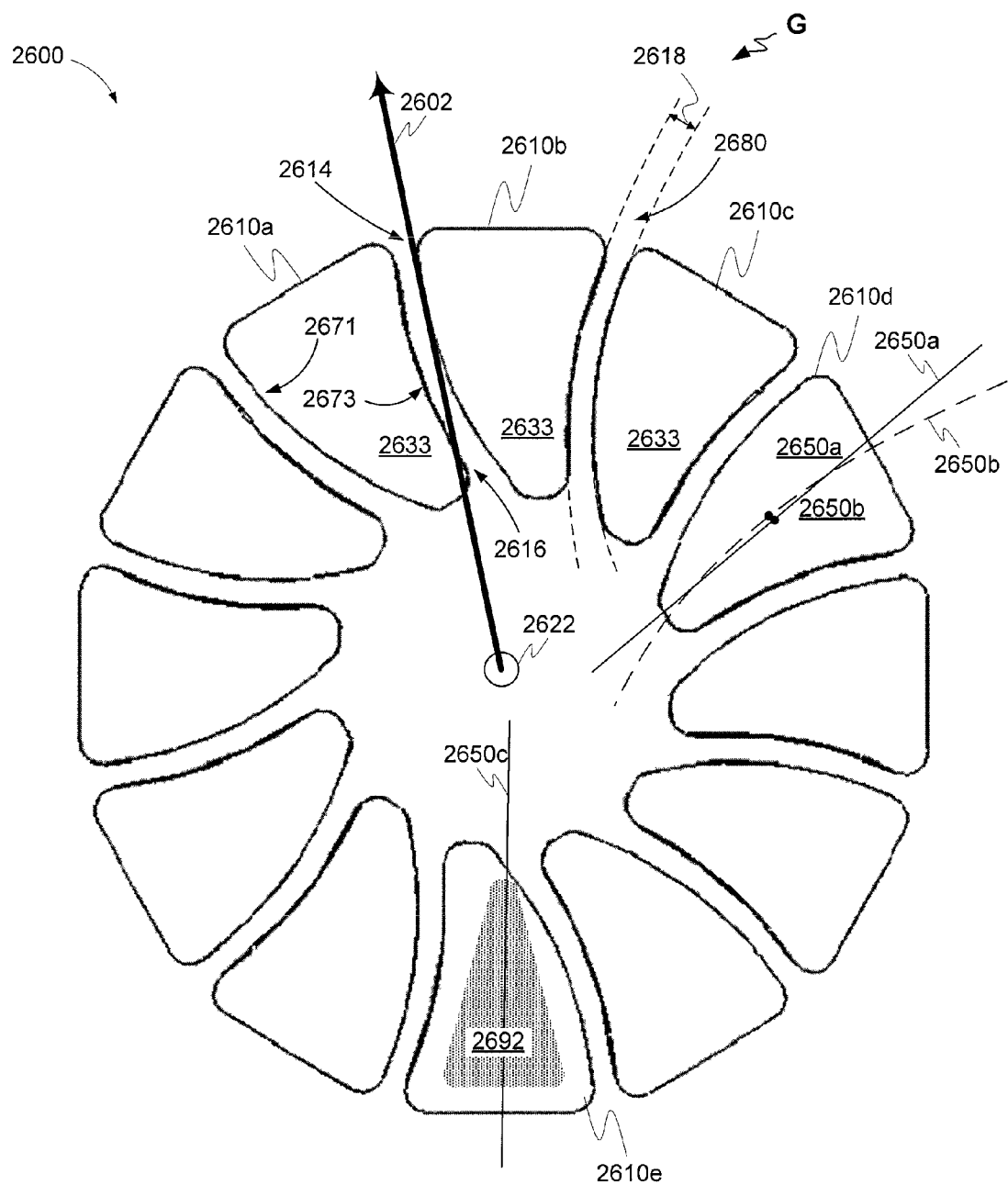
FIG. 26 illustrates an example of yet another implementation of field pole members for forming a stator structure, according to yet another embodiment of the invention.

FIG. 26 illustrates an example of yet another implementation of field pole members for forming a stator structure, according to yet another embodiment of the invention. Here, diagram 2600 is an end view showing a portion of a stator structure including field pole members, each of which can be coaxially positioned about axis 2622 of rotation. The field pole members for FIG. 26 can include substantially triangular-shaped cross-sections.

In a specific embodiment, surfaces 2633 can be pole faces (or portions thereof) associated with pole shoe members, such as pole shoe members 2610a, 2610b, 2610c, 2610d, and 2610e, that can be integrated with field pole member cores (not shown). Further, pole shoe member 2610a and pole shoe member 2610b can include an interior portion 2616 and an exterior portion 2614, respectively. In one embodiment, pole shoe member 2610a can be oriented with respect to pole shoe member 2610b to form an overlap portion (not shown) of field pole member 2610a at interior portion 2616. The overlap portion can be configured to include (e.g., intercept) a plane and/or a radial line 2602, such as pole shoe member 2610b can be oriented to intercept plane 2602 simultaneous (or substantially simultaneously) to the overlap portion of field pole member 2610a intercepting plane 2602. Medial plane 2650a is representative of an example of a medial plane that passes through a pole shoe member, such as pole shoe member 2610d, to form a first part 2650a and a second part 2650b. In another example, medial plane 2650b can be representative of a contoured medial plane. In various embodiments, medial plane 2650 excludes axis 2622.

Pole shoe members 2610a, 2610b, 2610c, 2610d, and 2610e are shown in this example to each include asymmetric sides. For example, pole shoe member 2610a can include a first side 2671 and a second side 2673. Here, first side 2671 can be formed to include a side portion having a first contoured surface, such as a convex surface, whereas second side 2673 can be formed to include a side portion having a second contoured surface, such as a concave surface. In the example shown, a convex surface of pole shoe member 2610a and a concave surface of pole shoe member 2610b can include or intercept plane 2602 simultaneously (or substantially simultaneously). In at least one embodiment, the pole shoe members shown in FIG. 26 can be oriented to form a skewed pole shoe gap ("G") 2680. Note that skewed pole shoe gap 2680 can have a uniform width 2618. In a specific embodiment, pole shoe members 2610a, 2610b, 2610c, 2610d, and 2610e can be formed on field pole cores or members 2692 that include a medial plane 2650c that intercepts axis 2622.

Figure 27:
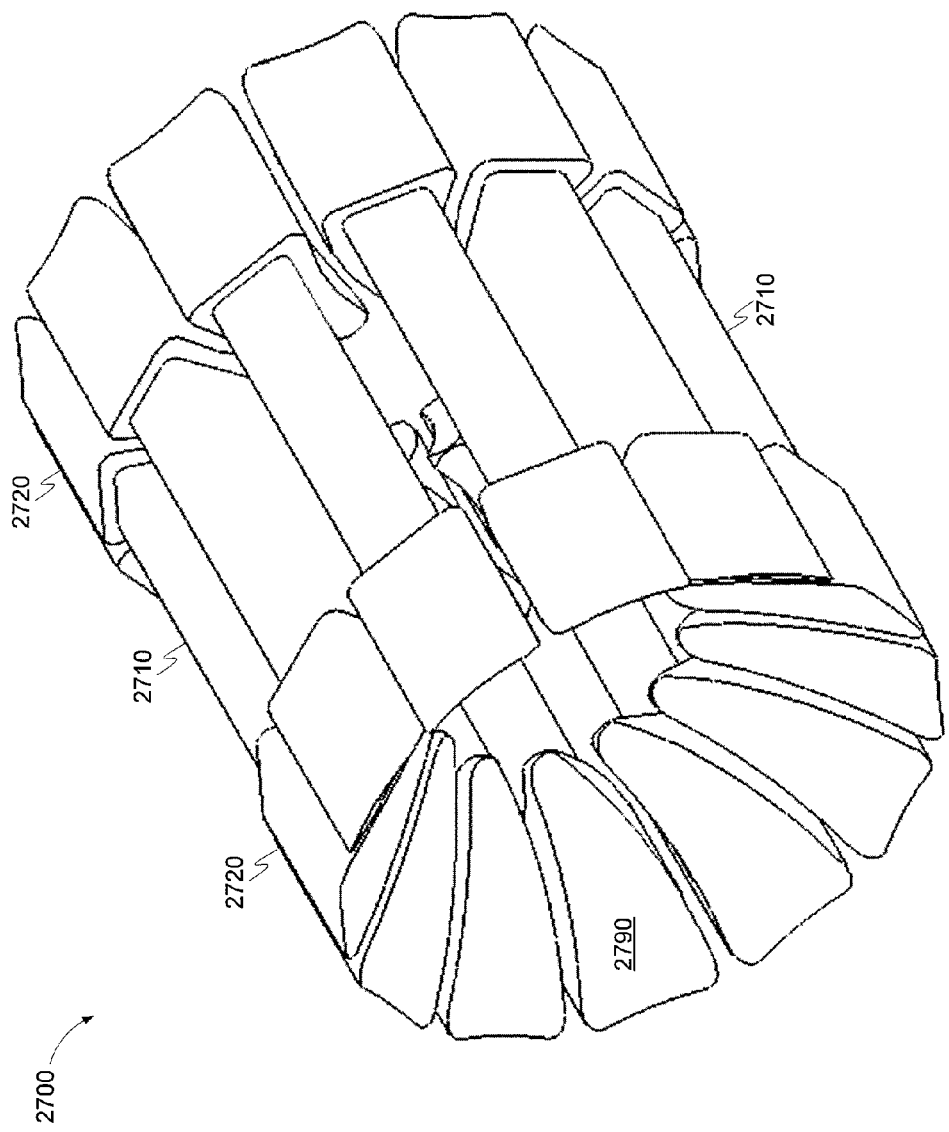
FIG. 27 is a perspective view of a stator structure for electrodynamic machines, according to one embodiment of the invention.

FIG. 27 is a perspective view of a stator structure for electrodynamic machines, according to one embodiment of the invention. Here, diagram 2700 is a perspective view showing a stator structure including field pole members each composed of a field pole core 2710 and pole shoe members 2720. The field pole members can be arranged coaxially about axis of rotation (not shown). The field pole members shown in FIG. 27 can have substantially triangular-shaped cross-sections. Further, the field pole members can include pole faces 2790 configured to confront a conical magnet.

A practitioner of ordinary skill in the art requires no additional explanation in making and using the embodiments of the rotor-stator structure described herein but may nevertheless find some helpful guidance by examining the following references in order from most to least preferred: "IEEE 100: The Authoritative Dictionary of IEEE Standard Terms," Institute of Electrical and Electronics Engineers (Kim Breitfelder and Don Messina, eds., 7th ed. 2000), "General Motor Terminology," as defined by the Small Motor and Motion Association ("SMMA"), and "Standard Specifications for Permanent Magnet Materials: Magnetic Materials Producers Association ("MMPA") Standard No. 0100-00," International Magnetics Association.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather any one feature or aspect of one embodiment can be readily interchanged with another feature or aspect in any of the other embodiments. While the above description of the embodiments relates to a motor, the discussion is applicable to all electrodynamic machines, such as a generator. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. As used herein, the term exemplary is used to describe one of the many examples of the various implementations and/or embodiments of the invention. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A stator structure for electrodynamic machines comprising:
   a plurality of field pole members being arranged coaxial to an axis of rotation, the plurality of field pole members comprising:

adjacent field pole members being disposed to intersect a common plane that includes the axis of rotation, the adjacent field pole members comprising:
  a first field pole member including a first pole face portion; and
  a second field pole member including a second pole face portion,
    wherein the first pole face portion and the second pole face portion are substantially coextensive with an acute angle to the axis.

2. The stator structure of claim 1 wherein at least one of the adjacent field pole members includes a medial plane positioned at an angle to the common plane.

3. The stator structure of claim 1 wherein the adjacent field pole members comprise:
  a first field pole member including a first field pole member portion; and
  a second field pole member including a second field pole member portion,
  wherein the first field pole member portion and the second field pole member portion are positioned to include the common plane.

4. The stator structure of claim 1 wherein
  the first pole face portion and the second pole face portion are configured to respectively confront a first radial line segment portion and a second radial line segment portion at substantially the same time, the first radial line segment portion and the second radial line segment portion being associated with a magnet having a curved surface, whereby the first radial line segment portion and the second radial line segment portion rotate in non-planar space.

5. The stator structure of claim 1 wherein the adjacent field pole members comprise:
  a first field pole member; and
  a second field pole member positioned with respect to the first field pole member to form an overlap portion in association with the second field pole member,
  wherein the overlap portion of the second field pole member is configured to include the common plane that includes the axis of rotation.

6. The stator structure of claim 5 wherein the position of either the first field pole member or the second field pole member, or both, are configurable to form an effective field pole gap between the first field pole member and the second field pole member.

7. The stator structure of claim 1 wherein the adjacent field pole members each comprise a field pole member having a substantially triangular cross section.

8. The stator structure of claim 1 wherein the adjacent field pole members are formed to have asymmetric sides.

9. The stator structure of claim 1 wherein at least one adjacent field pole member of the adjacent field pole members comprises:
  a medial line extending along the axial length of the one adjacent field pole member, the medial line being either parallel to the axis or at a skew angle to the axis.

10. The stator structure of claim 1 wherein the adjacent field pole members are active field pole members, and each has substantially uniform cross sections along an axial length.

11. A stator structure for electrodynamic machines comprising:
  a plurality of active field pole members being arranged coaxial to an axis of rotation, at least one of the plurality of active field pole members comprises:
    at least a portion that includes an elongated cross section having an elongated dimension positioned to confront an area on a surface of a magnet that is substantially coextensive with an acute angle with the axis of rotation,
    wherein the elongated dimension is positioned at an angle with a plane including the axis of rotation.

12. The stator structure of claim 11 wherein the angle is configurable to modify a number of rotational positions over which the elongated cross section confronts a pole region of a conical magnet, the pole region being oriented substantially parallel to the plane including the axis of rotation.

13. The stator structure of claim 11 wherein the angle is configurable to distribute detent torque over curved surfaces of the plurality of active field pole members in three-dimensions for the number of rotational positions.

14. The stator structure of claim 11 wherein the plurality of active field pole members further comprises:
  a first active field pole member including a first side surface portion positioned at a first angle from the plane that includes the axis; and
  a second active field pole member including a second side surface portion being positioned at a second angle from the plane,
  wherein the first side surface portion and the second side surface portion form a skewed field pole gap portion having a skewed field pole gap angle that is equivalent to either the first angle or the second angle, or both.

15. The stator structure of claim 14 wherein the skewed field pole gap angle can be modified to determine a number of rotational positions over which another plane including a radial line segment can extend to an exterior boundary.

16. The stator structure of claim 15 wherein the number of rotational positions includes zero.

* * * * *